(12) United States Patent
Catlin

(10) Patent No.: US 8,102,071 B2
(45) Date of Patent: Jan. 24, 2012

(54) RIVER AND TIDAL POWER HARVESTER

(76) Inventor: Christopher S. Catlin, Malibu, CA (US)

( * ) Notice: Subject to any disclaimer, the term of this patent is extended or adjusted under 35 U.S.C. 154(b) by 273 days.

(21) Appl. No.: 12/420,748

(22) Filed: Apr. 8, 2009

(65) Prior Publication Data

US 2009/0230686 A1 Sep. 17, 2009

Related U.S. Application Data

(63) Continuation-in-part of application No. PCT/US2007/022252, filed on Oct. 18, 2007.

(51) Int. Cl.
*F03B 13/00* (2006.01)
(52) U.S. Cl. .............................. 290/54; 290/43; 415/3.1
(58) Field of Classification Search .................... 290/43, 290/54–55; 60/398, 325, 641.7; 415/3.1, 415/906; 416/85
See application file for complete search history.

(56) References Cited

U.S. PATENT DOCUMENTS

| | | | |
|---|---|---|---|
| 669,852 A | 3/1901 | Peterson | |
| 882,694 A | 3/1908 | Kirschweng | |
| 2,501,696 A | 3/1950 | Souczek | |
| 3,978,345 A | 8/1976 | Bailey | |
| 3,986,787 A | 10/1976 | Mouton, Jr. et al. | |
| 4,095,421 A | 6/1978 | Silcox | |
| 4,205,943 A | 6/1980 | Vauthier | |
| 4,206,601 A | 6/1980 | Eberle | |
| 4,219,303 A * | 8/1980 | Mouton et al. | 415/7 |
| 4,281,257 A | 7/1981 | Testa | |
| 4,316,704 A | 2/1982 | Heidt | |
| 4,345,434 A | 8/1982 | Nedyalkov | |
| 4,368,392 A | 1/1983 | Drees | |
| 4,383,182 A | 5/1983 | Bowley | |
| 4,398,095 A | 8/1983 | Ono | |
| 4,524,285 A | 6/1985 | Rauch | |
| 4,598,210 A | 7/1986 | Biscomb | |
| 4,717,831 A | 1/1988 | Kikuchi | |
| 4,722,665 A * | 2/1988 | Tyson | 416/84 |
| 4,737,070 A | 4/1988 | Horiuchi | |
| 4,754,157 A | 6/1988 | Windle | |
| 4,864,152 A | 9/1989 | Pederson | |
| 4,868,408 A | 9/1989 | Hesh | |
| 5,946,909 A | 9/1999 | Szpur | |
| 6,091,161 A | 7/2000 | Dehlsen et al. | |
| 6,531,788 B2 | 3/2003 | Robson | |
| 6,647,716 B2 | 11/2003 | Boyd | |
| 6,652,221 B1 | 11/2003 | Fraenkel | |
| 6,935,832 B1 | 8/2005 | Platt et al. | |
| 6,963,802 B2 | 11/2005 | Enis et al. | |

(Continued)

FOREIGN PATENT DOCUMENTS

JP 56113065 9/1981

(Continued)

*Primary Examiner* — Michael Zarroli
(74) *Attorney, Agent, or Firm* — Cislo & Thomas, LLP; Kelly W. Cunningham

(57) ABSTRACT

An energy module comprising an energy absorber; and a mooring system, comprising a wing-shaped polymer shell attached to the energy absorber, the wing-shaped polymer shell designed to utilize the force of a passing current to create a downward force and thereby reduce any upward motion in the energy module; and a mooring cable housed inside the wing-shaped polymer shell and anchored to maintain the energy module in a fore and aft and a side-to-side position to provide stability, and to negate a rotational force on the energy module.

25 Claims, 24 Drawing Sheets

U.S. PATENT DOCUMENTS

| | | |
|---|---|---|
| 6,968,683 B2 | 11/2005 | Shields |
| 7,155,912 B2 | 1/2007 | Enis et al. |
| 7,199,484 B2 | 4/2007 | Brashears |
| 7,254,944 B1 | 8/2007 | Goetzinger |
| 7,307,356 B2 | 12/2007 | Fraenkel |
| 7,331,762 B2 | 2/2008 | Fraenkel |
| 7,541,688 B2 * | 6/2009 | Mackie ............................ 290/54 |
| 7,682,126 B2 * | 3/2010 | Parker ............................ 415/3.1 |
| 2006/0125242 A1 | 6/2006 | Fraenkel |
| 2008/0012345 A1 | 1/2008 | Parker |
| 2008/0018115 A1 * | 1/2008 | Orlov ............................ 290/54 |

FOREIGN PATENT DOCUMENTS

| | | |
|---|---|---|
| JP | 57028875 | 2/1982 |
| WO | WO 89/11592 | 11/1989 |

\* cited by examiner

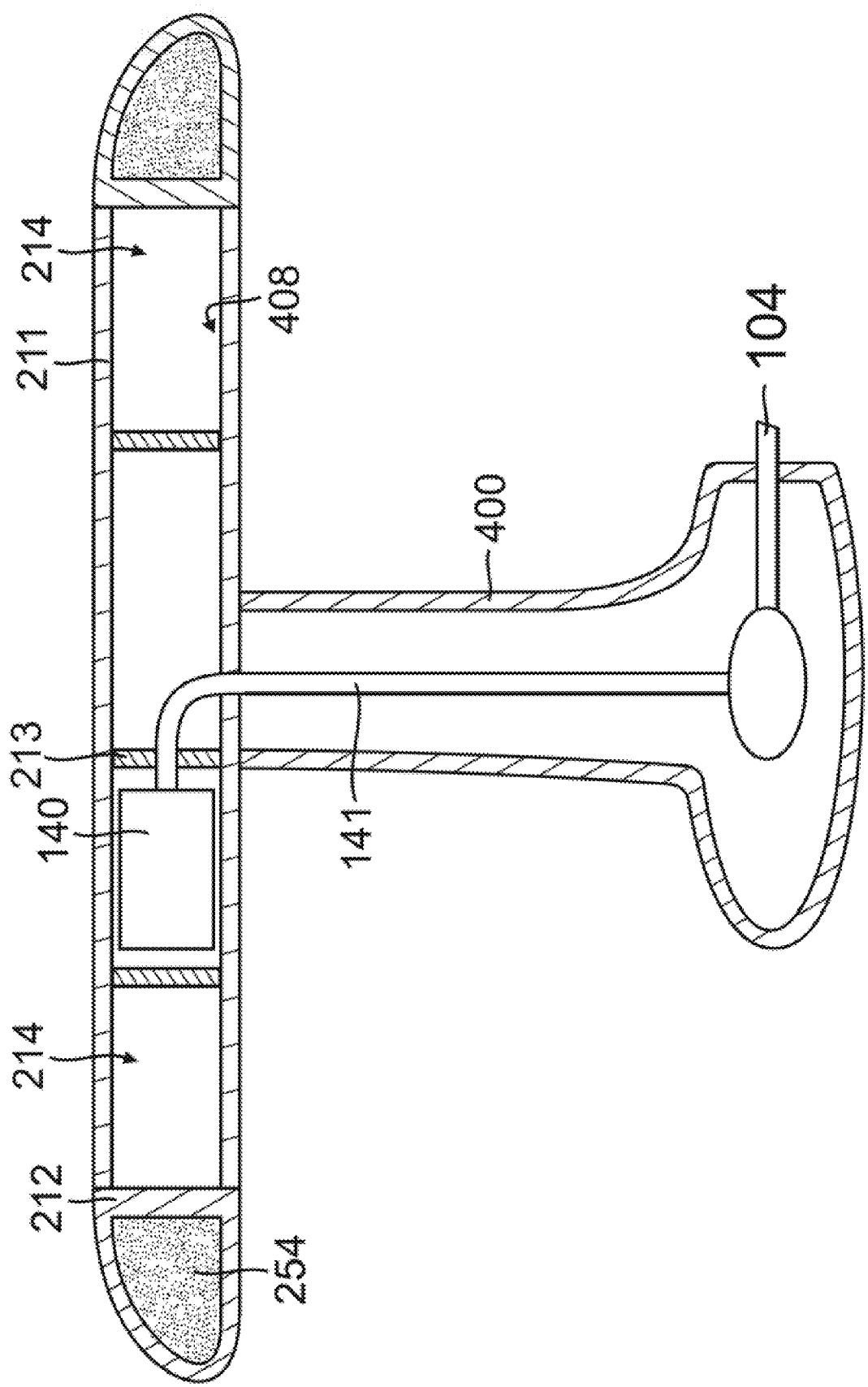

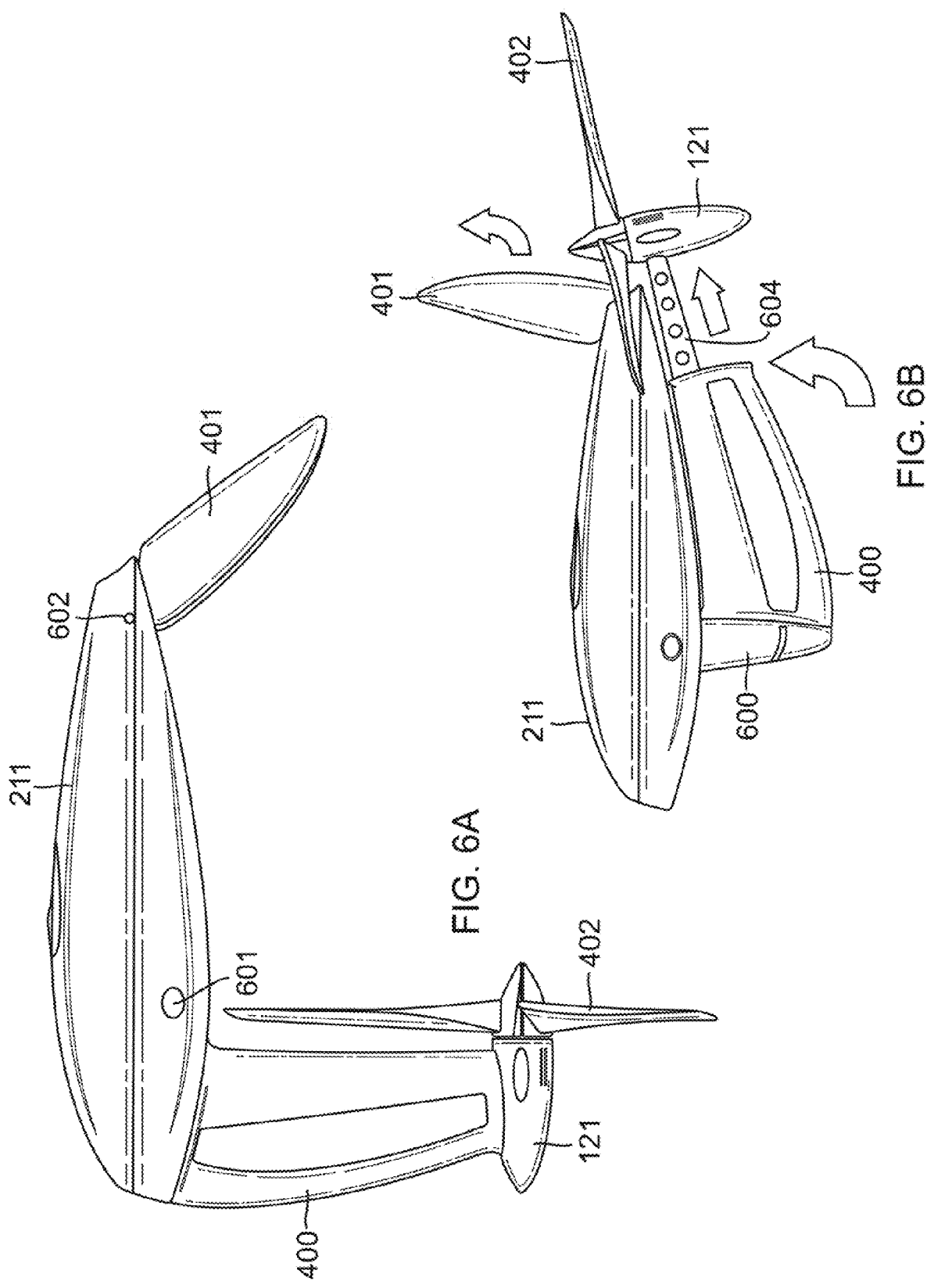

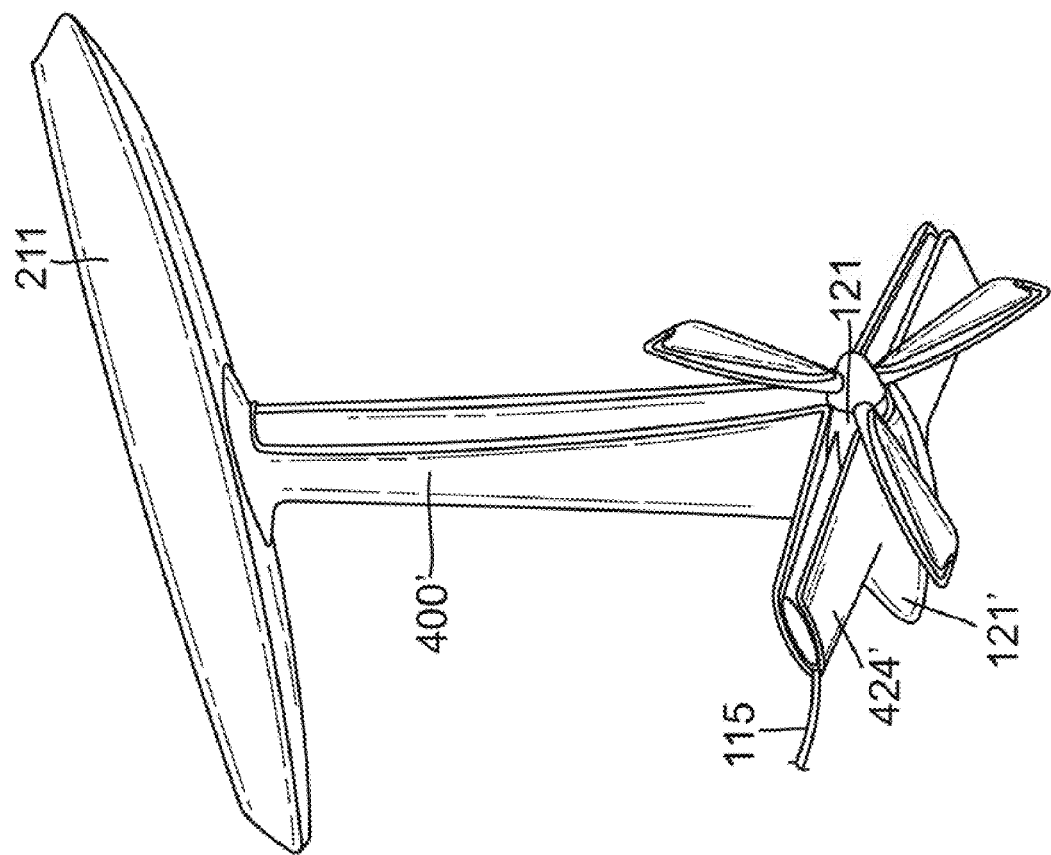

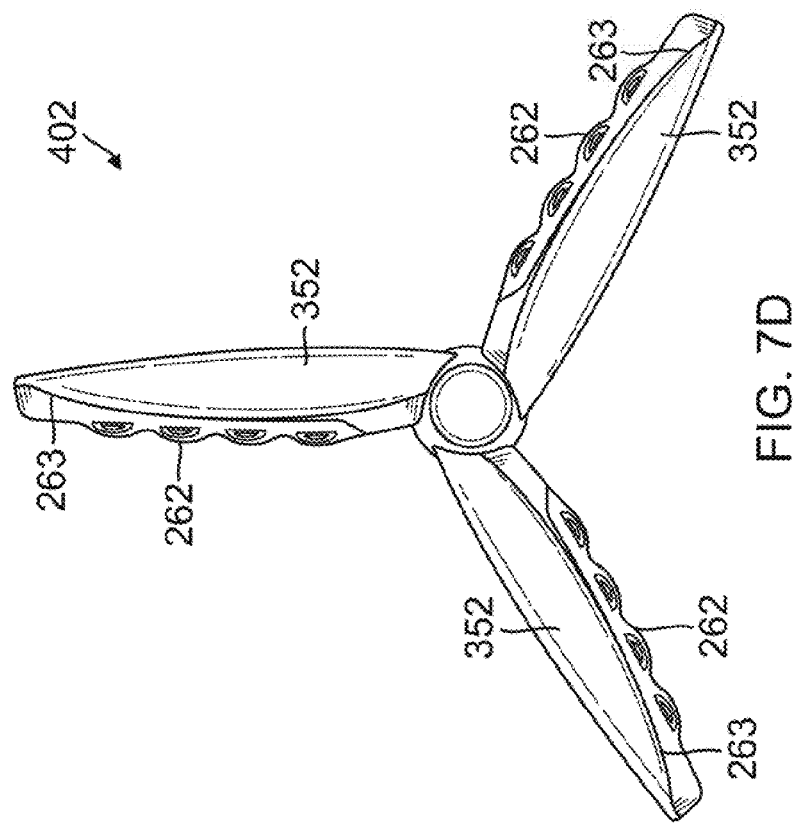
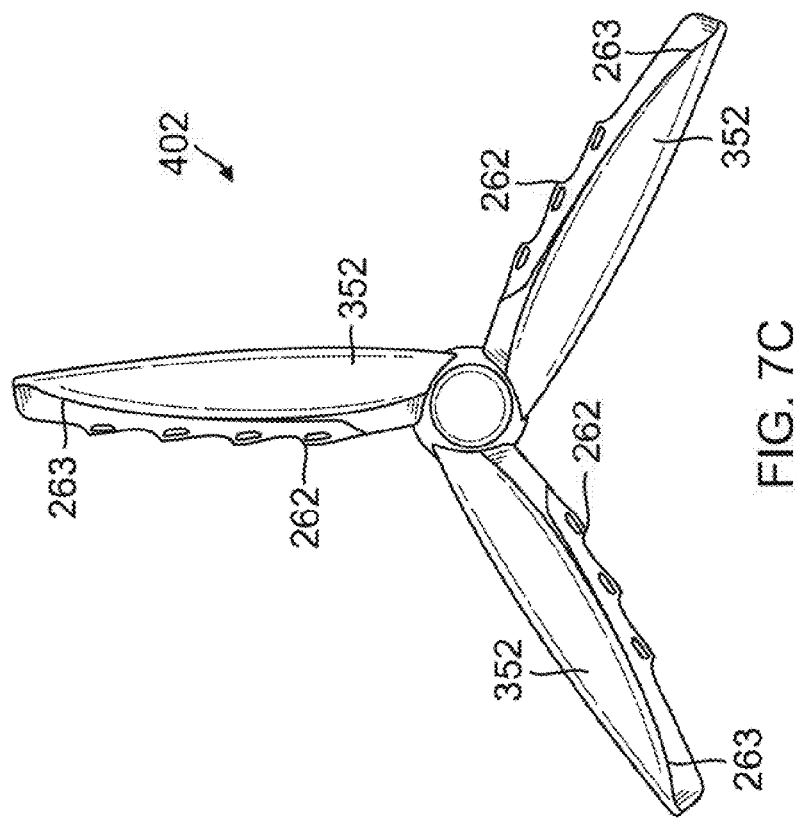
FIG. 7C
FIG. 7D

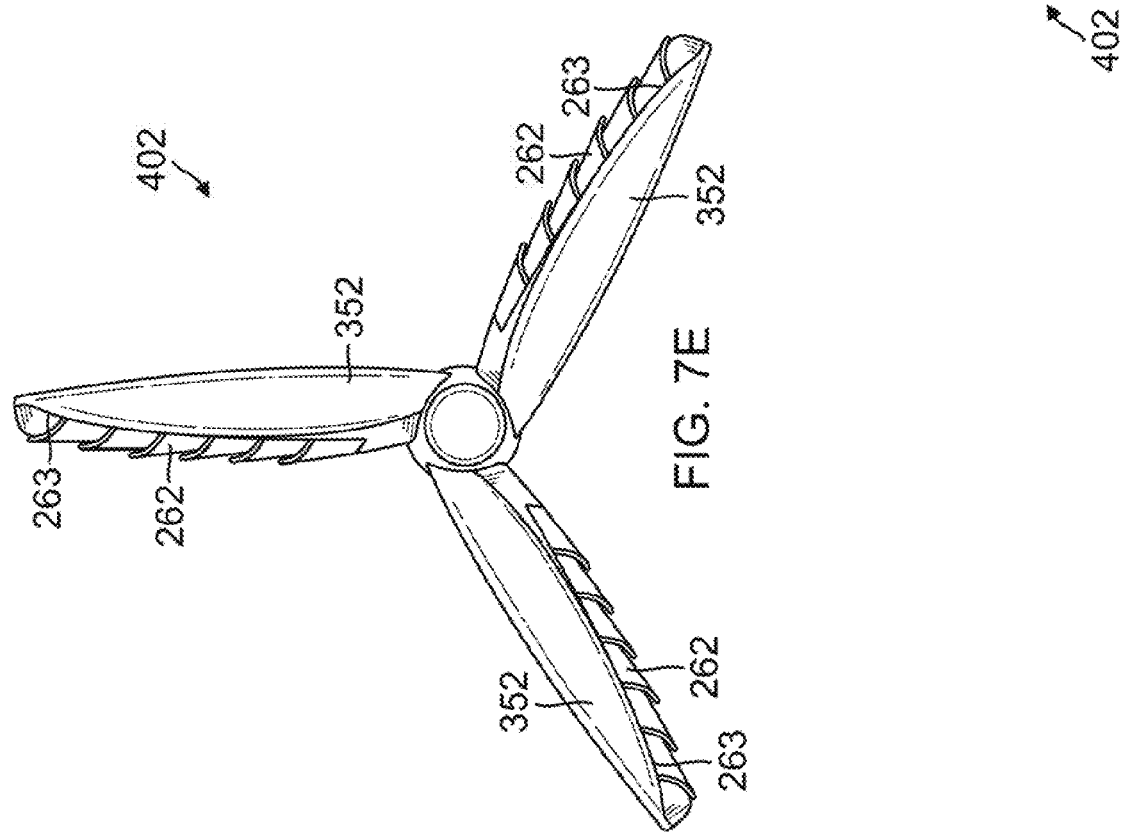
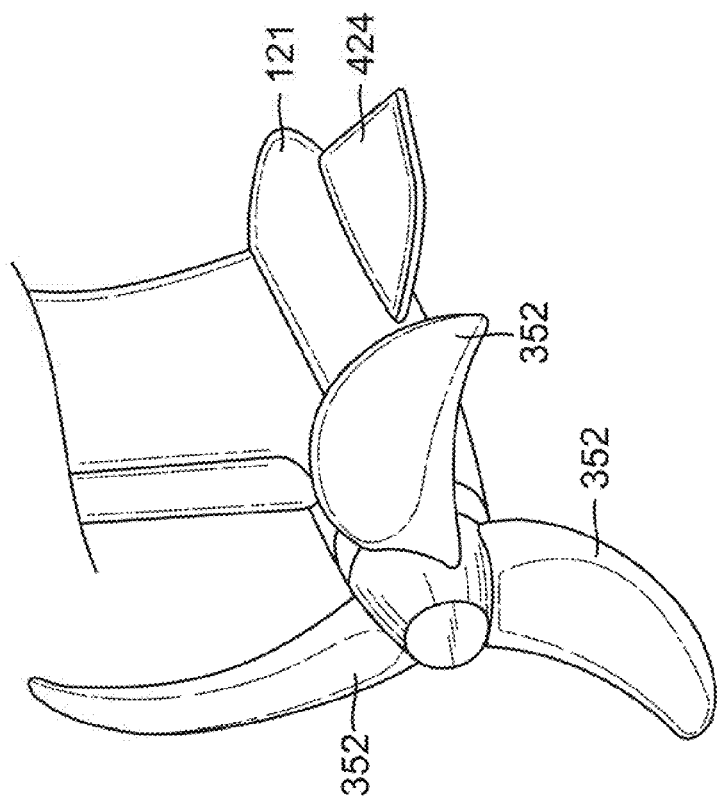
FIG. 7E
FIG. 7F

RIVER AND TIDAL POWER HARVESTER

CROSS-REFERENCE TO RELATED APPLICATIONS

This patent application is a continuation-in-part of International Application No. PCT/US2007/022252 filed Oct. 18, 2007, which claims the benefit of priority to U.S. application Ser. No. 11/585,722 filed Oct. 24, 2006, which are incorporated herein by this reference.

TECHNICAL FIELD

This invention relates to the field of energy, specifically, to a device that can produce mechanical and electric energy from river and tidal sources with improved efficiency, minimum cost and maintenance, and without producing any greenhouse gases (GHG) emissions, directly or indirectly.

BACKGROUND OF THE INVENTION

The world's energy appetite is growing fast and energy production capacity is being rapidly devoured. A fundamental shift in global demand has begun accompanied by a slow supply response, given the long lead-time required to rebuild surplus fossil fuel capacity. While the major renewables, solar and wind power, are growing they still make up a very small amount of the country's total energy output.

The cost of discovering oil in remote foreign countries, drilling offshore in deep water, transportation across oceans and more rigorous refining to meet more stringent environmental laws has made oil far less energy "profitable" than it once was.

In response, billions of dollars have been invested in renewable energy over the past decade. The primary renewables that have received the most funding are wind, solar and biofuels. But even with all this rapid growth, wind, solar and biofuels, all together, make up less than 1% of global electricity production. The single greatest challenge to growth of renewable energy is its inability to compete with traditional energy sources without subsidies or market preferences. If these technologies cannot surmount transitional economic challenges, they can never become a "mainstream" component of the maturing energy sector. Renewable energy can only compete effectively with traditional energy sources if they achieve similar economies of scale. Whether they can meet this challenge depends both on these technologies' physical attributes and on the legal environment. Two key challenges will affect this attempted transition: (1) financial feasibility of large-scale projects and (2) surmounting environmental siting and operation challenges for broad-scale use of these technologies.

A key issue for renewable energy development is whether a natural energy source has enough energy in it to pay for the energy of manufacturing, transport, construction and services it consumes over its lifetime.

It is believed that the present invention challenges even that number. It is believed that the invention requires less than half the weight of similar materials used to build a wind generator of the same capacity rating while its capacity utilization rate is three to four times greater. Its manufacturing process is less energy intensive while its installation, removal and recycling also consumes less energy. Following wind power's example, the invention system's high expected return on investment ("EROI") should drive its early adoption worldwide.

Wide use of the invention will protect consumers from increases in electricity costs due to volatile fuel prices and supply disruptions by reducing the use of natural gas and other fuels used for electricity generation, and lowering the pressure on their price.

The invention has many environmental advantages over fossil fuels the most important being a zero carbon footprint.

The inventor focused his efforts on the development of zero-carbon energy and the most likely clean energy source to develop on a global scale and also able to challenge coal on a global basis.

Through the centuries hydropower has been dominated by the dam and reservoir configuration. But these large dam and reservoir projects, many built fifty or more years ago, are land intensive, environmentally unfriendly, and are no longer cost-competitive to replicate today.

Although hydropower is a clean and unlimited source of energy, it often comes with a high price. It is currently dominated by huge expensive dams, which displace people, flood vast areas and wipe out fish populations that need open rivers to spawn. Holding back further use of hydropower has been the lack of an efficient, inexpensive and environmentally friendly technology to extract energy from water.

Current river and tidal energy systems are limited in the following way: The devices are not be removable without damage to site. The devices reduce downstream sediment layering. Some devices require significant elevation change. Many devices reduce aeration of water. Some devices emit noise and vibration. Many devices require costly heavy load capacity roads to be built to site. Some devices cannot be fabricated of recycled materials that decrease their total life-cycle energy costs. Many devices cannot be developed to a global scale energy source because such global scale use requires an ease of transportability across national border.

Some devices create pollutant accumulation. Many devices have low capacity utilization. Some devices have high build cost/MW. Many devices have high operating costs/MW. Some devices have high visibility. Some devices have poor operational safety. Some devices have complex, weak structures because they have major load areas spread out over the device, which does not allow overall unit size and weight to be reduced. Some devices have many working parts, parts count and a large complex electrical harness.

Many devices are large so they cannot be applied to many smaller sites and easily expanded in number when needed. Some have turbine blade tip speeds are higher than other axial flow turbines, which increases wear and tear, noise, vibration and the potential for impacts on sea life. Some devices have a high vertical profile and cannot be configured to fit a variety of project sites.

Many devices have a major impact on the seabed because they utilize deep-sea moorings, mono-piles, and foundations to be held in place. The mooring system of some devices make them more difficult and more expensive to install and maintain. Some devices have significant built-in resistance to high stress shocks from debris and high flow rates. Many devices require lengthy waiting for permits, surveying, designing, breaking roads into site, designing, excavating, hauling in tons of rock, concrete and equipment for years.

Some devices require to be manufactured only in a technologically advanced country which makes its application more expensive to spread globally. Many devices have large numbers of working parts, parts count and large electrical harness. The overall size of some devices are so large they cannot be applied to many smaller sites and not easily expanded in number when needed. Some devices have a high vertical profile and cannot be "stackable" down a section of the river limiting their ability to be configured to fit a variety of project sites. The mooring system features make some devices more difficult and more expensive to install and maintain. Some devices do not provide a variety of deployment configurations, thus they can not be installed in a wide range of sites.

The major components of some of the devices cannot be mass manufactured thus they will always remain expensive to produce in large numbers. Some devices and their major components are difficult to ship. Many devices' installation require foundations or mono-piles which adds cost and install time as well as considerable field work. Some devices are such large project requiring large amounts of up-front funding they are difficult to find funding. Many devices have high turbine tip speeds, major impact of water surface (high view shed issue) and have major impact on the sea bed, the potential environmental impacts are substantial, which should increase the schedule and cost and decrease the likelihood for obtaining permits and local community acceptance.

Because of the complexity of the many devices with high number of moving parts, the life-cycle operating and maintenance costs will be higher than the other less mechanically complex technologies. The breakeven cost of power (calculated without consideration of any subsidies or incentives and it includes amortization of capital invested but no return on invested capital) delivered from some devices is not competitive with today's power supply systems, including electricity generated from fossil fuels, nuclear, wind, solar and biomass. Thus, there is still a need for an efficient, economical, easy-to-install, easy-to-maintain, unintrusive device that can harness energy from the river and tides with minimal disturbance to the environment, while maintaining versatility and customizability.

SUMMARY OF INVENTION

The invention's advantages over current state of the art hydrokinetic devices are numerous and include lower build, install and service costs. Minimal upfront funding required compared to other renewable energy inventions. This allows the units to be funded and built in stages as each stage pays itself back in around a year's time.

The invention is small and easy to truck to site, unlike the shipping limitations required of wind turbines with their long blades and tower sections which can require roads to their sites to be modified. Wind turbines also require complex onsite construction and manpower. Due to their complex mechanisms they also use large number of suppliers unlike the invention.

It also includes a shorter installation timeline as well as easier in/out for service requiring less support equipment and manpower. The invention can be installed in many more potential hydropower because it does not require special equipment and highly trained manpower to drill and construct foundations in the river bottom. They offer safer operation because the area of operation is clearly marked and its turbine operates at lower revolutions per minute ("RPM"). It has higher efficiency because of the lower RPM turbine which operates in the higher current speeds near the surface. The inventor's flexible mooring harness reduces stress and shock on the turbine module lengthening its service life. The invention's turbines can be flipped up to clean and repair. While other hydrokinetic devices would have to install twenty foundations for a 20-unit array, the invention requires only two easy-to-build trench foundations along the shore for each array. Instead of twenty electrical harnesses along the river bottom, the invention needs only one, which is part of the mooring harness.

The invention has many variables built in so it can be customized for each site to maximize its performance and minimize its presence.

A number of large and intensive studies have confirmed the many environmental advantages of the invention over conventional hydropower dams and other hydrokinetic systems. The first is an estimated 1 MW of invention power arrays can save the atmosphere from over 1,600 tons of $CO_2$ emissions, every year. Next, the invention does not require riverbed foundations including site preparation (drilling and piling of foundations), installing foundations, cable installation and spoil disposal. Thus the installation and decommissioning of a river or tidal project has no effect on the seabed. The invention does not need the various types of Tidal In-Stream Energy Conversion (TISEC) device foundations including: piled foundation (e.g., mono-pile tripod), gravity foundation (typically, unit is mounted directly to large concrete block), suction cup foundation, and moored (typically dead-weight or embedded).

Hydrokinetic devices have not been held back by their ability to produce significant amounts of power. Their primary problem has been the limitations of installing them in moving water, a difficult and expensive environment for any task. The invention incorporates the transmission cable into the suspension cable mooring system thus eliminating the need for burial of the cable by plowing, drilling or jetting and its effect on the seabed. The invention dramatically reduces the effects of the marine construction, noise and vibration in particular the impulse (hammering); and construction of device foundations. This eliminates the risk of a release of oils or other pollutants or that of the pile driving associated with deployment of the tidal structures or trenching associated with deploying the transmission cable could result in sediment suspension and increased turbidity. At some sites, in particular industrial zones, there is the possibility that the disruption of bottom sediments may result in dispersal of contaminated sediment (Mercury, Lead, PCBs) into the water column, thus potentially causing secondary pollution. This risk is eliminated by the use of the invention.

Mechanical and flow-related injuries to fish are typically associated with conventional high RPM hydropower facilities, and because of fundamental differences in every aspect of tidal power project design, the potential for many of the effects would be expected to be much less for hydrokinetic than for conventional hydro projects. The invention has no physical blockages to inhibit movement of fish and marine life such as a hydropower dam's confined forebay or penstock into which fish may be drawn into. The invention turbines are open on all sides. Fish may be attracted to the accelerating flows that often occur in the forebay or penstock of a conventional hydropower turbine. In contrast, the invention actually repels them. Flow directly in front of an open "Windmill"—type turbine is slowed by the backwater effect of the blades on the river and tidal current. A slight pressure wave forms in front of the turbine, which will likely direct fish outward and away from the turbine. Fish and other marine life are likely to be exposed to less danger because they can move to avoid the turbine. And it must be noted that there are far bigger hazards to worry about including: underwater power cables, pesticide runoff, liquid waste runoff, marine vessel props, cable and rope moorings, hydropower dam turbines, bridges, abutments, docks, fences, floating debris and various other man-made structures.

Rotor and blade tip speeds of the invention's turbines are much slower than conventional hydropower turbines reducing both the probability of contact, and the probability of injury or mortality. The solidity of the invention's turbine (i.e., the percentage of the rotor swept area occupied by the blades) is typically less than for conventional hydropower turbines. As a result, fish passing through the rotor-swept area of the invention's turbine have a much lower probability of contacting a blade. Due to the openness of the invention, there is limited potential for injuries due to abrasion, pinching, or grinding.

Changes in water pressure across the invention's turbine are typically orders of magnitude less than those that occur in many conventional hydropower turbines, greatly reducing the potential for fish injuries. The invention's turbines lack draft tubes and wicket gates, confined areas, and gaps through which water flows, which are the causes of many of the shear stresses that occur in conventional hydropower and cooling water systems. Turbulence associated with the invention's turbines is orders of magnitude below that of conventional hydropower turbines. For example, in a conventional hydropower system, the pressure differential can range from about 380 kilopascals ("kPa") in a vertical Kaplan turbine to 55 kPa in a horizontal bulb turbine. For example, Verdant's Instream Energy Generation Technology (IEGT) turbine, a maximum pressure differential of 2 kPa was calculated. For another example, a Marine Current Turbine (MCT) Seagen turbine rotates at 10 to 20 RPM, a ship propeller that is 6 to 9 meters in diameter typically turns at 80 to 100 RPM, and a conventional hydropower Kaplan or fixed-propeller turbine typically operates at 100 to 200 RPM. Conventional hydropower turbines may have solidity up to 90 percent, while the TISEC turbines have the following approximate solidity: Verdant Power's IEGT—10 percent; MCT Seagen—4 percent; and Lunar—30 percent.

There is no change in habitat associated with inundating terrestrial areas or wetlands. The invention causes no or comparably little effect on water temperatures and dissolved gases (as can be an issue in reservoirs) and altered sediment movement. The invention has minimal visual effects. The invention does not affect habitat. There are no pilings and tower structures that would support the colonization by sessile marine life. The above-water portions of the invention can support plants and nesting areas for wild birds. The invention does not require a large displacement barge to perform major maintenance, which could create localized disturbance.

Entanglement is not expected to be an issue with the invention because fixed gear associated with this device would not risk entanglement of passing sea life. And there is no risk of entrapment due to transmission cables running along the seabed surface. Operation of the invention will result in a minimum of noise and vibration. A noise absorption liner built into the power cartridge isolates noise. The unit's low RPM lowers the noise source. Vibration is not transmitted to the river bottom because the units are isolated from the bottom by water and the suspension cable mooring system. Both sources of electromagnetic fields produced by the invention including the generator and the suspension cable mooring transporting the generated electricity to shore are minimized by the use of shielding.

The heat emissions associated with the transmission of electricity through cables are on the order of fractions of a degree and as such would represent negligible effects to the aquatic community. The invention maintains the river and tidal units efficiency free of fouling marine growth with EPA and U.S. Coast Guard (USCG) approved anti-fouling coatings. The invention is designed to be failsafe in the event of a cable mooring failure. The individual units, which are interconnected, fold back into the river shore leaving an unimpeded riverbed unlike bottom mounted systems which if broken will leave their foundations sticking up above the river floor as a serious threat to river traffic.

In conclusion, the invention offers a dramatic reduction of complexity by producing energy without the current complex fuel supply infrastructure, electric transmission system, and more. It is capable of placing self-sufficient (an important aspect of resilience) power networks near dense power consumption areas. This creates a simpler form of energy generation that addresses most of the major stress points-energy depletion, declining EROI, environmental degradation, climate change and financial instability.

Accordingly, several objects and advantages of my invention areas follows: The device can be removable without damage to site. The device does not reduce downstream sediment layering. The device does not require significant elevation change. The device increases aeration of water. The device does not emit noise or vibration. The device does not require costly heavy load capacity roads to be built to site. The device can be fabricated of recycled materials that decrease their total lifecycle energy costs. The device can be the successfully commercialization as a global energy source because it includes an ease of transportability across national border. The device does not create pollutant accumulation. The device has high capacity utilization. The device has low build cost/MW. The device has low operating costs/MW. The device has low visibility. The device has good operational safety. The device has a rugged, simple structure because all major loads area have been concentrated in one point on the device, which does allows overall unit size and weight to be reduced. The device has few working parts, parts count and a simple electrical harness. The device is small enough to be applied to many smaller sites and easily expanded in number when needed. The device's turbine blade tip speeds are lower than other axial flow turbines, which reduces wear and tear, noise, vibration and the potential for impacts on sea life. The device has a low vertical profile and can be configured to fit a variety of project sites. The device does not have an impact on the seabed because the inventor modules do not utilize deep-sea moorings, mono-piles, and foundations to be held in place. The mooring system of the device makes it easier and less expensive to install and maintain. The device has significant built-in resistance to high stress shocks from debris and high flow rates. The device requires shortened waiting periods for permits, surveying, designing, breaking roads into site, designing, excavating, hauling in tons of rock, concrete and equipment for years. The device can be manufactured in many countries which makes its application less expensive to spread globally. The device has a low vertical profile and can be "stackable" down a section of the river can be configured to fit a variety of project sites. There is low impact on the seabed because the device does not utilize deep-sea moorings, mono-piles, and foundations to be held in place. The mooring system is less difficult and less expensive to install and maintain.

The device provides a variety of deployment configurations, thus it can be installed in a wide range of sites. The major components of some of the devices can be mass manufactured thus they will always low cost expensive to produce in large numbers. The device and its major components are easy to ship. The device's installation does not require foundations or mono-piles which adds cost and install time as well as considerable field work. The device are such small units requiring small amounts of up-front funding they are easier to fund. The device has low turbine tip speeds, minor impact of water surface (low view shed issue) and have minor impact on the sea bed, the potential environmental impacts are minimal, which should decrease the schedule and cost and increase the likelihood for obtaining permits and local community acceptance.

Because of the simplicity of the device with low number of moving parts, the life-cycle operating and maintenance costs will be lower than the other more mechanically complex technologies. The breakeven cost of power (calculated without consideration of any subsidies or incentives and it includes amortization of capital invested but no return on invested capital) delivered from the device is very competitive today with any new power supplies, including electricity generated from fossil fuels, nuclear, wind, solar and biomass.

The invention offers a dramatic reduction of complexity by producing energy without the current complex fuel supply infrastructure, electric transmission system, etc. The invention is self-sufficient, an important aspect of resilience, power networks near dense power consumption areas. This creates a simpler form of power generation that addresses most of the major stress points-energy depletion, declining EROI, environmental degradation, climate change and financial instability. The invention has minimal working parts, parts count and size of the electrical harness. The invention is modular and stackable, it provides a variety of deployment configurations, the invention can be installed at a wider range of sites than other technologies of the same scale.

Because the major components will be mass manufactured, collapsible into shippable modules and during installation requires no foundations or mono-piles, the invention can be installed quickly (minimal field work) and total project costs will be less than alternatives. This allows a large project to be built in stages using the profits generated to fund the next stage. The invention has low turbine tip speeds, minimal impact of water surface (low view shed issue) and have minimal impact on the sea bed, the potential environmental impacts are minimal, which should reduce the schedule and cost and likelihood for obtaining permits and local community acceptance.

Because of the simplicity of the invention with low number of moving parts, the life-cycle operating and maintenance costs will be lower than the other more mechanically complex technologies. In larger rivers used by shallow draft pleasure craft, the invention is placed in deeper higher speed areas and let the traffic use the shallower low power areas. Rather than waiting for permits, surveying, designing, breaking roads into site, designing, excavating, hauling in tons of rock, concrete and equipment for years; the invention can be up and operating in a week. The invention can be operating in weeks and removed in days.

The entire configuration is designed to be mass manufactured in the host country which makes its application much more widespread. The invention has a significant economic advantage over other river and tidal energy technologies. The breakeven cost of power delivered from the invention is projected to be approximately five cents per kilowatt-hour, making it very competitive today with any new power supplies, including electricity generated from fossil fuels, nuclear, wind, solar and biomass. The breakeven cost of power was calculated without consideration of any subsidies or incentives and it includes amortization of capital invested but no return on invested capital.

Because of their predictability compared with winds and waves, the maximum velocities of river and tidal currents at any site will be known before installing the plant. Compared to other projects, like solar and wind, hydrokinetic energy projects benefit from well-documented collections of global tide, current, and wave data that provide would-be developers with significant advantages in the planning phases. Moreover, these data collections provide operators with advanced notice of fluctuations in the power levels so that preparations can be made to provide consistent power levels to users. Load factors for river and tidal energy projects are also higher than wind and solar, ranging between 60% for tidal to 100% for river—40%, where's wind is between 25 (onshore) and 35% (offshore) and solar is between 10 and 20%. These higher load factors translate to more efficient and higher output projects.

River and tidal devices will be subjected to known stresses and will be designed to operate at all current velocities.

The river power invention and tidal power invention have important attributes that make them excellent candidates for finance leasing which is a key determinant to their mass marketing capability and therefore their global impact. Each is a self-contained unit that can be rapidly installed and removable without major construction. Leasing offers tax benefits with the payments which are often fully deductible, if it avoids technology obsolescence. The interest portion of the payment is typically tax deductible while the principal portion of the payment can often be depreciated. Greentech lease finance payment options can often lower payments when you need them, graduated payments based on your growth plans, seasonal payments based on your revenues during different times of the year and skip payments when it helps you most, and allows you to conserve your cash.

The invention is a multi-function renewable energy platform. It is designed to incorporate the maximum number of various types of stabilizers, struts, power cells, mooring systems and plug-in systems such as Reverse Osmosis water making systems and marine attachments to stabilizers and struts to offer maximum flexibility in operation.

DRAWINGS

The present invention may be better understood, and its numerous features and advantages made apparent to those skilled in the art by referencing the accompanying drawings. For ease of understanding and simplicity, common numbering of elements within the illustrations is employed where an element is the same in different drawings.

FIG. 4 is a cross-sectional side view of an embodiment of the energy module;

FIG. 6A is a side view of another embodiment of the energy module;

FIG. 6B is a side view of the energy module in FIG. 6A in a different configuration;

FIG. 6C is a perspective view of another embodiment of the energy module;

FIGS. 7A-7F illustrate different embodiments of the propeller;

DETAILED DESCRIPTION OF THE INVENTION

The present invention relates to a river and tidal energy generation system. The invention is of an inexpensive, rugged and mobile design that is low cost and energy efficient. An array of interconnected energy devices designed for both river and tidal flow siting are arrayed across the path of the direction of the primary current so as to absorb the largest spectrum of river current energy. The invention has a non-fouling, self-cleaning surface that repels both debris and marine growth. Its low operational speed, rounded surfaces and minimal anchor cables provides the ultimate safety for wildlife. It has a minimum number of parts to reduce costs and breakdowns as well as maximizing the use of available parts. It minimizes internal, inertial/mass, the number of energy conversion stages and surface friction to offer high overall energy conversion efficiency. It is easy to install and to remove and from its operational site and service by automated means using remote controlled service craft. It is primarily made of recycled materials. It is mass producible at low cost. It produces no greenhouse gas (GHG) emissions, directly or indirectly. In addition, the depth of the cable allows many types of commercial and private river traffic to pass through the arrays 100 except for freighters. Where there are deep draft ships, the arrays 100 will use special anchoring systems to allow deep draft passage channel.

The following is a detailed description of illustrative embodiments of the present invention. As these embodiments of the present invention are described with reference to the aforementioned drawings, various modifications or adaptations of the methods or specific structures described may become apparent to those skilled in the art. All such modifications, adaptations, or variations that rely upon the teachings of the present invention and through these teachings have advanced the art, are considered to be within the spirit and scope of the present invention.

Mooring System

Figure 17:
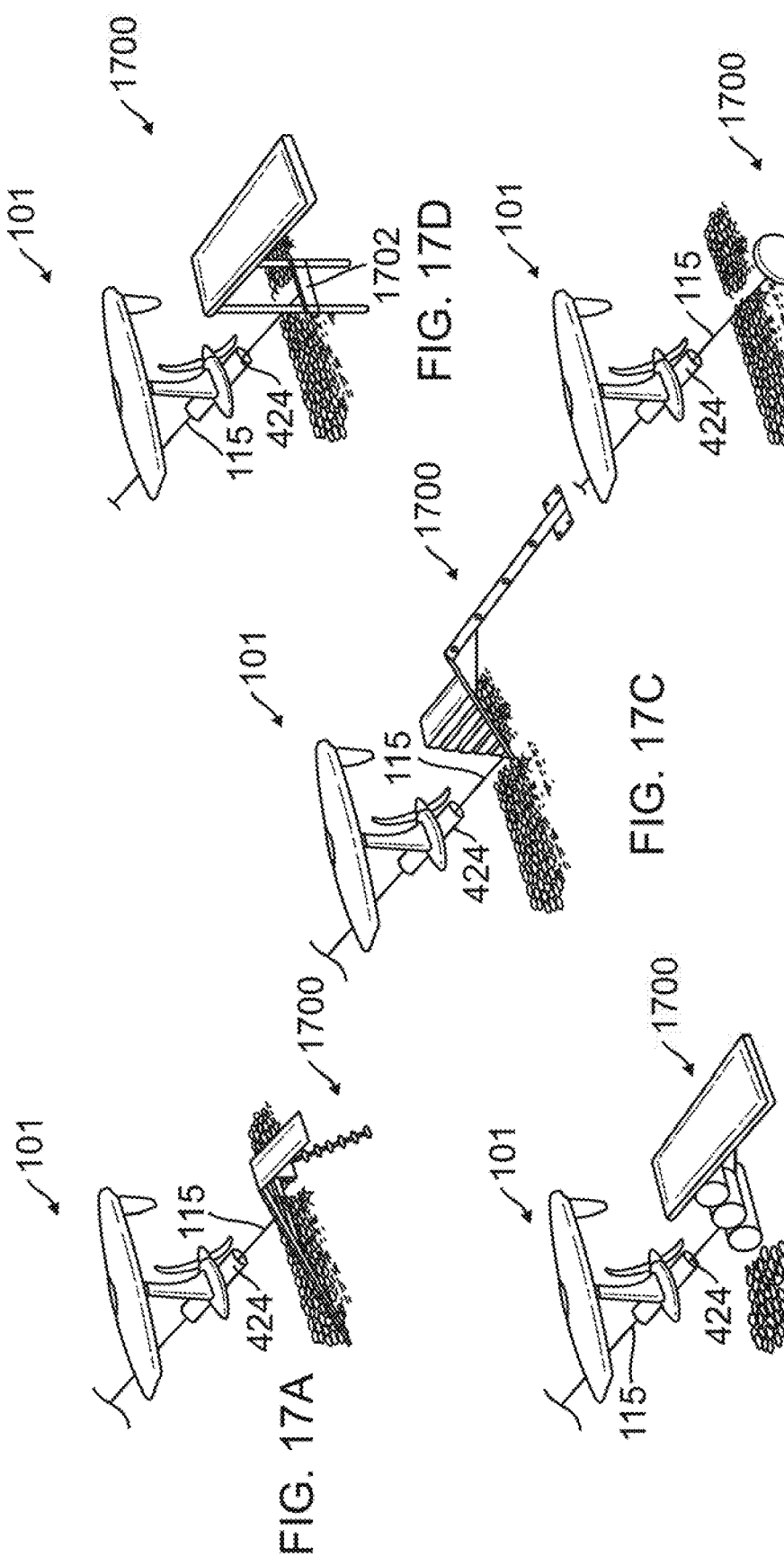
FIG. 17A-17E are perspective views of different embodiments of the mooring system anchored onshore.
Figure 18:
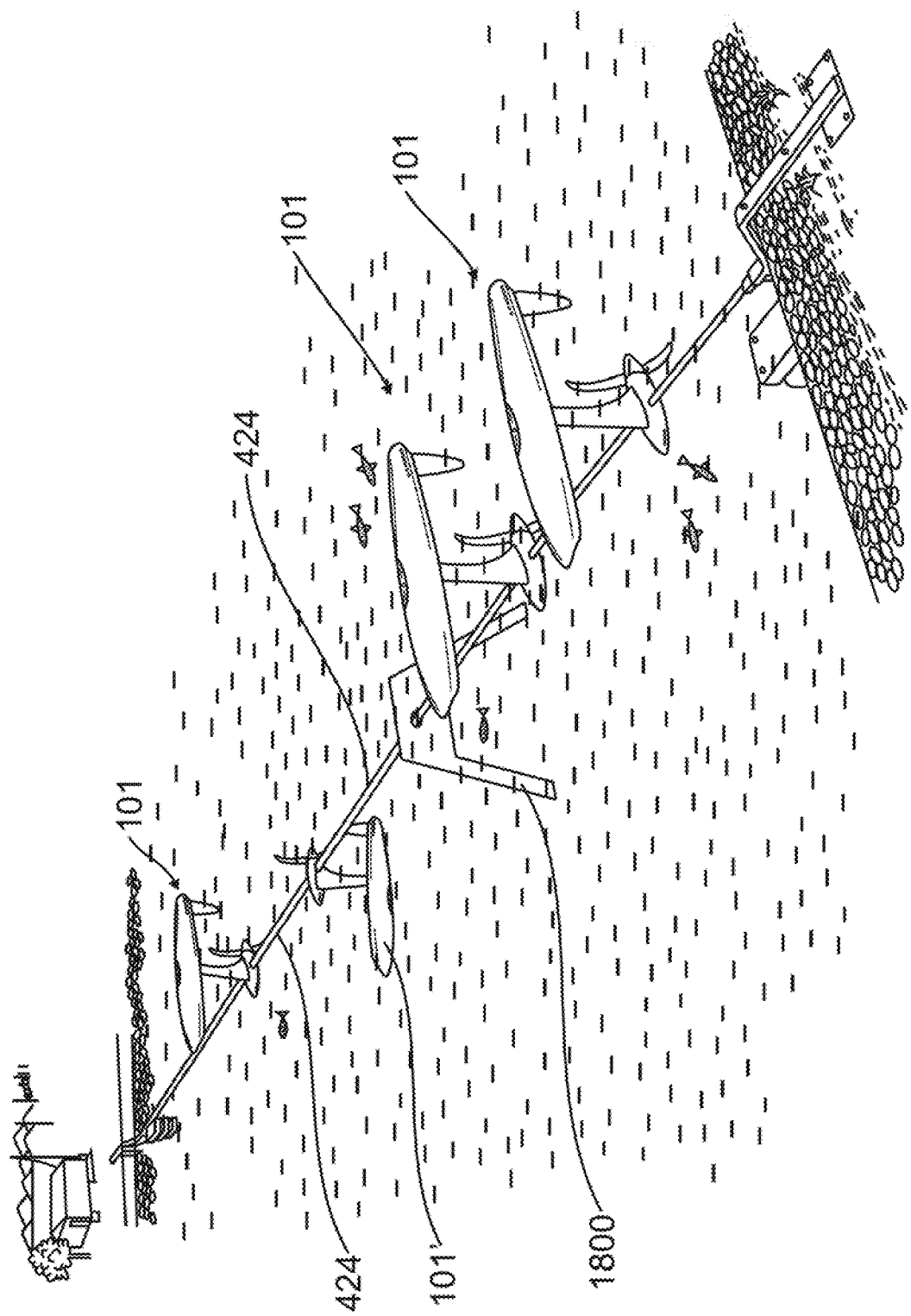
FIG. 18 is a perspective view of another embodiment of the array of energy modules.
Figure 20:
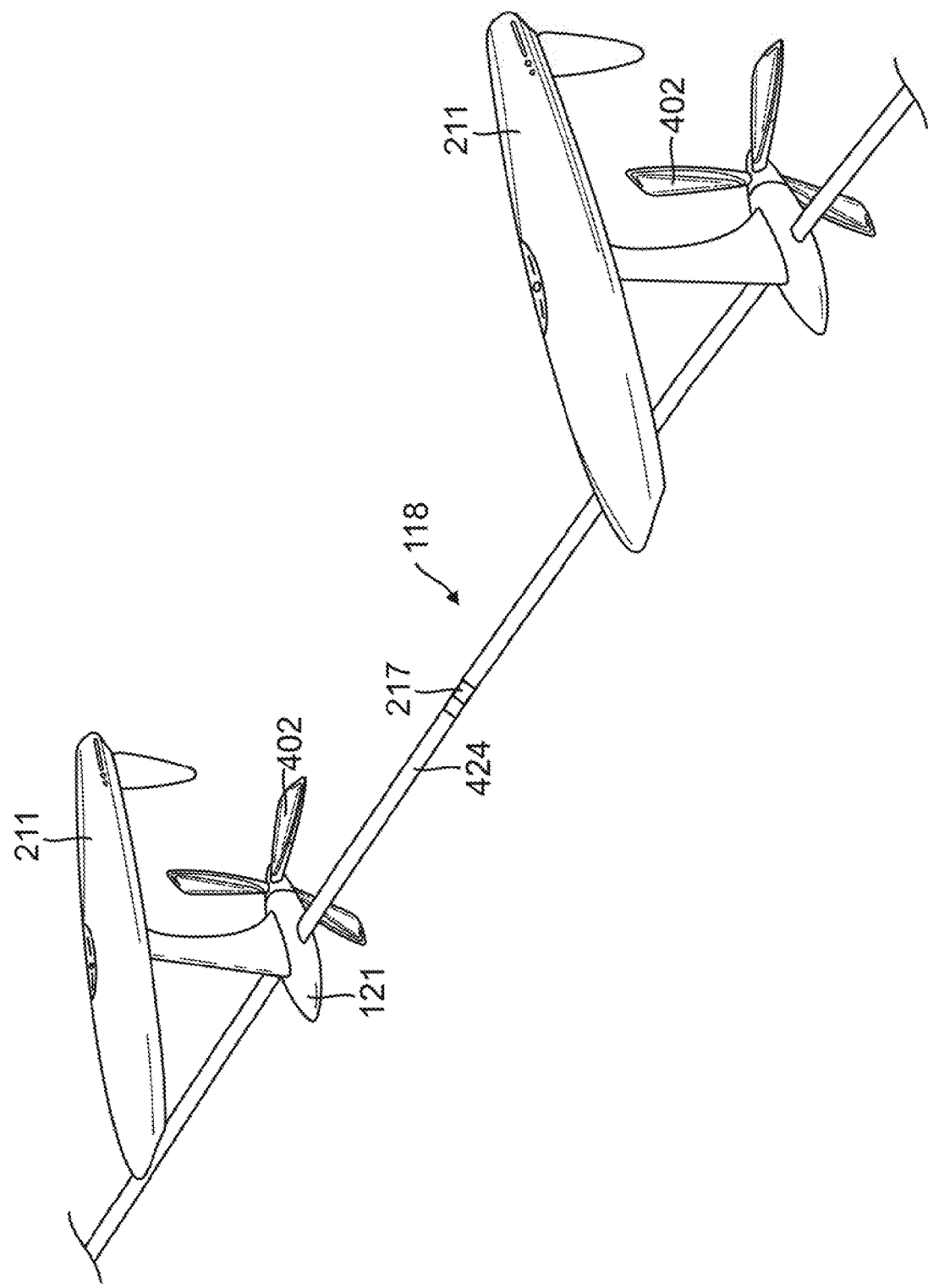
FIG. 20 is another embodiment of an array of energy modules.

An array 100 of the energy modules are deployed across a river site generally at right angles to the flow of water. Due to shifts in current and movement of the array in the river, exact orientations cannot be maintained. Each of the energy modules 101 is connected to the module 101 beside it by a horizontally orientated "suspension" mooring cable 115 attached to the center point of power cartridge 392 or nacelle 121. The mooring cable 115 is connected to each module 101 at a connection point in the middle of the nacelle 121 at a depth of approximately eleven feet. The stabilizer tube 211 supports the weight of the energy absorber 106 and the mooring system 118 while maintaining the approximate eleven-foot depth of the unit. This keeps the propeller 402 above the disturbed waters and rolling debris of the river bottom. The mooring system 118 includes a high-tension cable 115. The mooring system may further comprise an electric power cable 202 and/or a communication cable 203 all held together by a series of interlinked wing-shaped polymer shell sections 424, which have a cushioned leading edge for added safety. High strength cable 115 is well proven for long term, outdoor heavy load demands through their use for suspension bridges, offshore oil drilling, and ocean barge towing. As shown in FIG. 20, the mooring system 118 may have a pressure coupling 217 in between adjacent wing-shaped polymer shells 424 that is designed to decouple to protect the array 100 if an unusually high load is applied to the array 100. Preferably, the pressure coupling 217 is between the center two energy modules 101. The mooring system 118 can be ballasted to add stability. Mooring flaps on the mooring shroud may be used to add stability and negative lift, if needed. Mooring shell can also hold various optional tubes for water, and chemicals, control cables and aeration tubes. A number of shoreside mooring attachment systems 1700 can be used for the various shoreline layouts as shown in FIGS. 17A-17E. Mooring for rivers with considerable seasonal variation in depth has the ends of the mooring cable attached to a roller block sliding on a vertical rail or track 1702 as shown in FIG. 17D, connected to shore with various anchoring systems which provides means for the entire array 100 to move up and down. The array 100 can also be extended part way across the river using of special modular bottom mounted A-frame 1800 to support the open end of the array as shown in FIG. 18. This can be augmented by the use of self-mountable and extractable ultrasonic/sonic anchoring system comprising drill bit and a hammer mechanism which is both mountable and extractable using minimal axial load. Screw-in anchors can also be used.

In an array the wake of disturbed water trailing behind each river or tidal unit can affect the water up to 2,000 feet behind it. So each unit in the arrays behind can be offset to form a clear water path to disperse the effects of this vortex before the next unit. Placing the invention in arrays at angles to the direction of the current can create a dam effect redirecting half the river into the arrays.

High tension cable technology used by the river and tidal power systems for mooring has been used in the bridge industry for many years as well as marine towing. It is also been used in oil industry for 20 to 30 years in particular to stabilize ocean oil platforms where there are extreme loads. Two main designs exist: the tension leg platform and the spar buoy. The platform has horizontal legs attached to a buoyant central structure and secured by tensioned cables to gravity anchors on the ocean bottom. The tension, fighting against the buoyancy of the platform on top, keeps it stable even in storms or heavy waves. A spar buoy looks like a pencil floating in the water point down toward the bottom. Up to 300 feet long, and most submerged, the underwater section acts like a ship's keep to stabilize the structure which is anchored with mooring lines only. Offshore windpower is prototyping a tension leg design and a spar buoy type for wind generator platforms.

The standard river power system and tidal power system uses a single horizontal cable harness. In an alternative configuration two cables can be used in parallel leading to front and rear of the nacelle. Normally a fixed attachment of the horizontal mooring system to the shoreline below the surface of the river is good enough to deal with fluctuations in the river depth due to the length of mooring between shore and the first unit is a slight angle. But where there is a dramatic change the attachment at shoreline utilizes a pulley that slides up and down on a track of various configurations. This can be accomplished by attaching a cable from the block to a surface float to keep the block at proper depth to the surface if needed. For river power sites that suffer from variability of direction of current possibly due to an cross current from an adjoining stream or other cause, the river power invention may need two parallel horizontal mooring cable either inside a longer wing section or separated further apart. The forward cable could be attached as far forward as the nosecone of the nacelle. Another solution is to rake the blade angles back to allow some back and forth movement of unit without prop striking the cable.

Anchoring the Array

The array of energy modules can be in many configurations. In its normal configuration the array 100 is stretched from shore to shore. In some embodiments, the array 100 may be provided in short sections from the shore out into the river current for 100 to 200 feet to produce from approximately 200 kW to 400 kW. These short sections are attached to the shore at one end and to a modular underwater A-frame mooring anchor system 1800 at the other. In some embodiments, an inverted energy module 101' can also be used as an anchor where the mooring cable stops at the inverted, underwater device 101' and then angles down into a screw-in anchor thus creating an energy producing anchor as shown in FIG. 18. The is array of energy modules 100 can also be open ended where neither end of the array 100 is attached to the shore but moored at each end to the bottom using an A-frame unit 1800 or an inverted energy module 101'. In larger rivers with shallow draft pleasure craft traffic, the invention is capable of being placed in the deeper higher current speed areas letting the boat traffic use the shallower low river power areas. The invention can also be placed out of sight under bridges and behind dams.

The propellers 402 of each adjacent energy module 101 rotate in the opposite direction relative to the one beside it thereby counteracting the rotational forces placed on the entire array 100. The rotational forces of the propeller 402, the drag of the propeller 402, the forward and side loads of the mooring cable 115 and the vertical loads from the stabilizer tube 211 are all directed into the steel block of the gearbox 404. This centers the major stresses on one load point stabilizing the unit during operation reducing overall structural loads, thus limiting the need for overbuilding of parts, which reduces overall costs and weight. The energy module 101 is designed to be driven over by a large ship with no or limited damage.

The arrays 100 can be set up preferably with approximately 5-10 foot separation between each 20 ft diameter turbine 402. When more than one array 100 is being used their spacing is opened up to allow the river flow to average out in the array 100. The modules 101 in large arrays 100 are spaced 40 feet apart with the propeller 402 of each module 101 in the downstream array 100 lined up behind the center of the opening of the upstream array. In other words, rows of arrays 100 are aligned in a staggered fashion so that an upstream energy module 101 is not directly in front of the next adjacent downstream module 101. Preferably, these units can be placed from 100 to 500 feet behind each one depending on the speed of the river, the bottom depth and the density of each array. The optimum spacing for river and tidal current generators is site specific. Bryden & Couch (2004) suggest that up to 10% of the mean energy flux at a particular site could be intercepted by river and tidal current generators without significantly changing the resource. Salter (2005) argues that higher fractions could be extracted from relatively long channels where the power losses already incurred by river and tidal currents in overcoming bottom friction are comparable with the energy to be extracted. For the notional machine, a minimum spacing of 1 km was assumed. This gave an effective capacity of 15 MW per 1 km2 cell. Recent research (Bryden & Couch 2004) suggests that currents will only recombine after a long distance.

In some embodiments, the standard separation between modules 101 is twice the width of the energy module 101. For example, in modules 101 with 20 feet diameter propeller there would be approximately 40 feet for the separation between two propellers. Therefore, as an example, a river 1,000 feet wide of 30 feet depths with 50-feet offsets on both sides would have 15 units producing 750 kW. Preferably, when power arrays 100 are aligned one after the other down a river the distance between each array 100 is approximately 200 feet. A 1,000 ft section of river would produce 3.75 MW. A 1-mile section would produce 18.5 MW. On an annualized production basis this is approximately equal to 74 MW of wind power or twenty-seven 3 MW wind turbines.

The horizontal suspension mooring system 118 is a marked improvement upon conventional mooring systems used by other hydrokinetic companies that are based on vertical structures imbedded in the river bottom. This invention overcomes the difficult and expensive problem of installing these modules in moving water. The mooring system is also used for water and pressurized air conduit as well as a bubbler and aerator. Unlike other hydrokinetic systems that use vertical structures embedded in the bottom, the present invention can handle much more drag load thereby allowing the use of slow rpm turbines, which reduce debris build up and are safer in the case of collisions. For low rpm propellers, each propeller has a propeller positioned just behind it (2-6 inches) to maximize surface area and at the same time create a blunter edge to protect fish.

The Stabilizer Tube

In some embodiments, the stabilizer tube 211 is approximately 20 feet in length and 3 feet in diameter comprising a thinwall steel, aluminum, or composite materials. A longer tube version is used for river and tidal sites that have disturbed water and river and tidal site that have large variation of current speed as well as high current speed sites. The shape of the stabilizer 211 can be of aerodynamic shape and camouflaged in various ways. The design should maximize reserve buoyancy on both ends. The stabilizer 211 has an internal reinforcement crash bulkhead 212 and a support bulkhead 213 to support the strut 400 attachments. These bulkheads 212, 213 also define compartments for plug-in mission packages to slide in through hatches in the deck.

In some embodiments, two stabilizer tubes may be side-by-side with a horizontal strut connecting the two stabilizer tubes. In some embodiments, the bow 124 of the stabilizer 211 may have a streamlined negative lift shaped, soft-skinned nose section of thinwall steel filled with dense closed cell foam 254 that doubles as emergency floatation that is marine life friendly and repels debris. A collision bulkhead 213 may be positioned behind it. A combination handhold, bumper, or a cleat may be molded into the bow 124 and stern 126.

Navigation lights (LED) may also be incorporated into the bow, stern, or any other location on the stabilizer 211.

A debris diverter 251 is added for rivers with dense debris fields. The debris diverter 251 can be designed to shed debris, as well as fish. The debris diverter 251 may comprise a metal rod running straight down from the bow 124 about two to eleven feet below the surface of the water with a small round lip on the end to divert surface debris to the side but not catch it. An alternative configuration is a single curved steel rod attached to the bow 124 of the stabilizer 211 at the waterline and running down to a depth of two to eleven feet to divert the majority of debris away from the module 101. A securement cable 249 from the bow 124 connected to the nacelle 121 reduces collision with debris as well as help lift the structure forward in an alternative configuration allowing the turbine and strut to be brought above water at the bow rather than the stern of the unit. In some embodiments, the debris diverter 251 can flip up carrying large debris over the module 101. The debris diverter 251, can also be in a triangular V-shaped screen held in front of the strut 400 to protect the propeller 402 supported by a cable running from the Power Cartridge 392 to the bow of the stabilizer.

An alternative configuration uses clear engineering molded plastic for the stabilizer to reduce the visibility of the tidal and river systems. Heavily ribbed surface on the tidal and river units improves overall surface strength and impact resistance. A micro pump can be used to drip water from small holes along the back of the stabilizer to keep the surface of the unit wet and of similar finish to the surrounding river. Another version of the unit is short with a wider stabilizer that holds several strut and turbines in place, used in stable surface flows. A V-shaped float with screen can be used to divert fish around a long series of arrays.

Figure 13A:
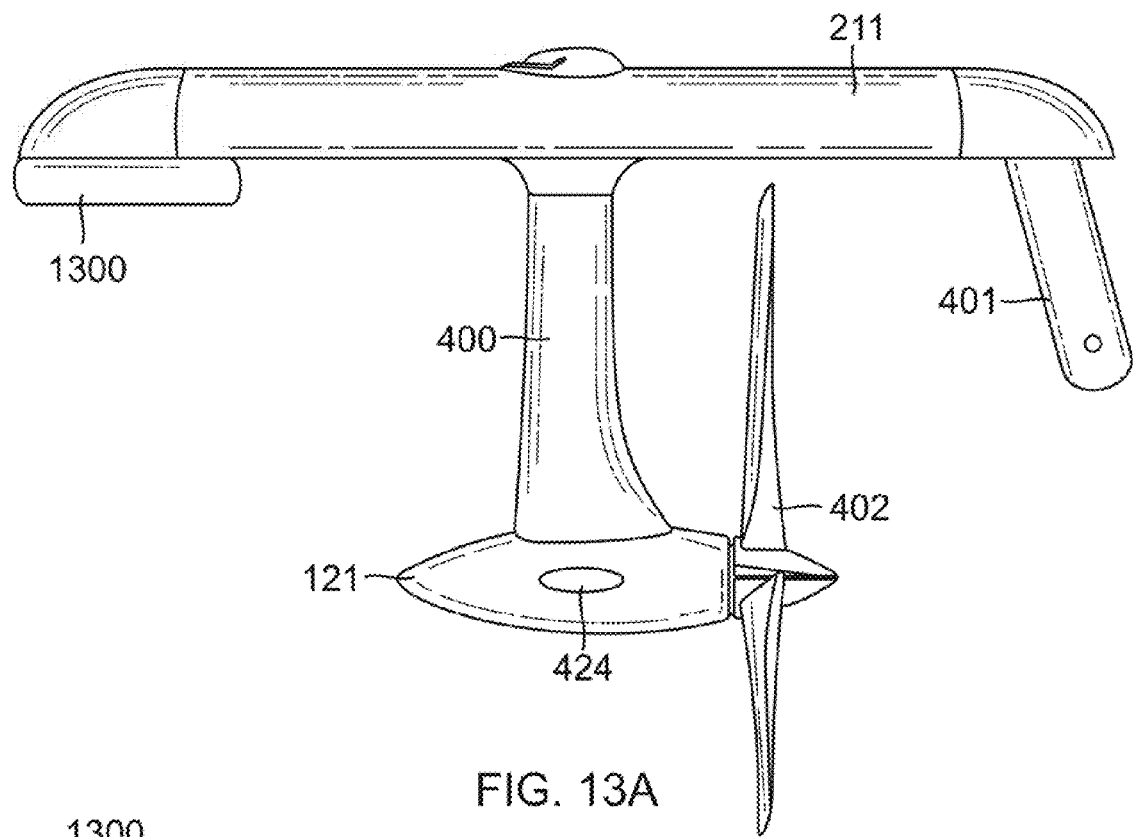
FIG. 13A is a side view of another embodiment of the energy module.
Figure 13B:
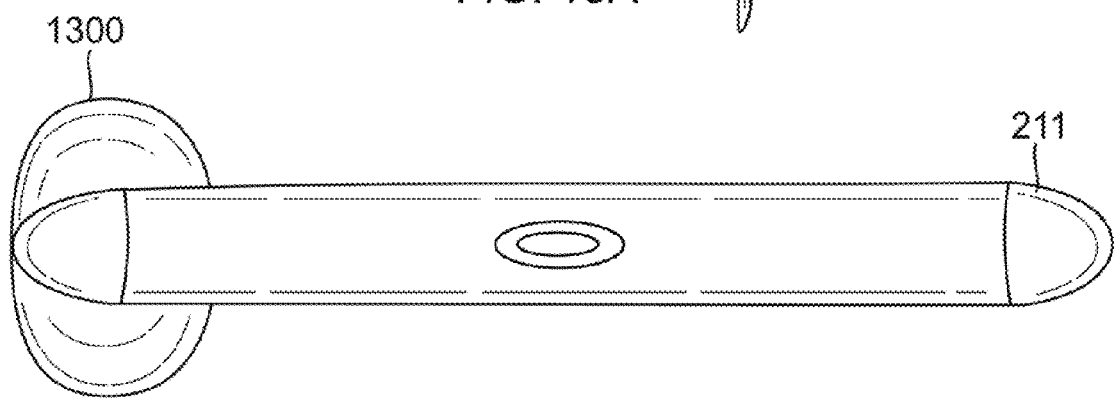
FIG. 13B is a top view of the energy module shown in FIG. 13A.
Figure 14:
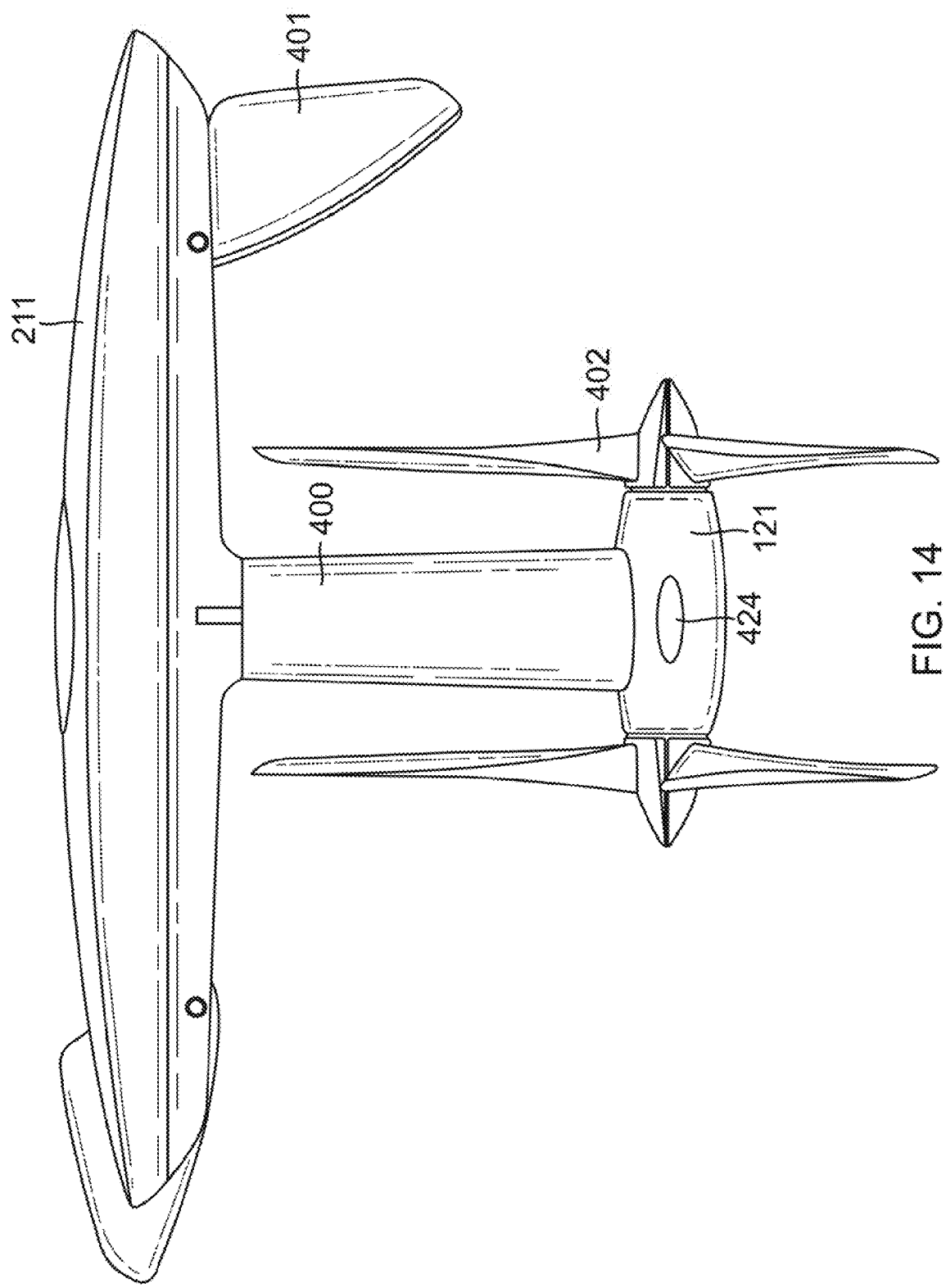
FIG. 14 is a side view of another embodiment of the energy module.

In some embodiments, the debris diverter 251 may be a bumper-type device 1300 that can bump the debris to flow in a different direction away from the module 101 as shown in FIGS. 13A and 13B.

Another configuration places the generator 394 in the stabilizer 211 rather than the Power Cartridge 392. This unit includes two opposing 25 kW generators 394 driven by a vertical driveshaft ending in the power cartridge. This configuration applies more weight over the turbine and makes the generator 394 more easily accessible.

The balance of the stabilizer tube 211 is controlled by the internal buoyancy tanks, flaps, prop angle, air pressure control, rotation and resistance.

The stabilizer tube 211 can also serve as a pressure accumulator for the compressed air version. The sleek and low profile design of the stabilizer tube 211 reduces wind resistance. In the inverted version the top of the stabilizer tube 211 is flat and has vertical studs for improved mooring. For the flip up version the strut can be pulled up into a deep groove 500 molded along the side or center of the stabilizer tube 211 or the strut 400 can be rotated up along either side on hinges or swivels placing the propellers behind the stabilization tube 211 and out of the water.

The Strut

The strut 400 attaches to the bottom of the stabilizer tube 211. The strut 400 may flip up from the center, the side, the front, or the rear of the stabilizer tube 211. As speed of the current increases the angle of the strut 400 can be adjusted to increase or decrease lift caused by increased propeller drag. In some embodiments, there is an extension and wheel on the bottom of the strut 400 for seasonal flow sites for grounding. In some embodiments, a double strut system connected to both sides of stabilizer 211 and nacelle 121 may be used.

The strut 400 can be mounted in the center of the hull, on either side, or in a small keel below. Flip up versions use short hollow keels 600 below the stabilizer tube 211 for the strut 400 to hinge from. Flip-up versions use offset flip up, strut 400 on one side and rudder on the other. The strut 400 can be water filled while the stabilizer tube 211 and the power cartridge 392 is sealed. In some embodiments, the length of the struts 400 may be adjustable using a telescoping tube. In some embodiments, air or water pressure or cable and winch system or a worm gear may turn cogs on the round edge of the strut 400 to rotate it to change length and angle. The strut 400 can automatically compensate for the small changes in river depth by lengthening and shortening while the shoreside mooring slider attachment 1702 compensates for large depth changes. The strut 400 can flip up automatically on computer feedback based on river debris saturation. For highly seasonal rivers where there are times when the river runs dry, a horizontal T-shaped extension strut can be attached to the bottom of the nacelle so the unit will rest upright when the water runs dry. Bumps can be added to the leading edge of the strut like those on the leading edge of whales to protect aquaculture and reduce the chances of cavitation.

In some embodiments for large-scale use, both the tidal and river power system use counter rotating propellers with two vertical driveshafts placed one inside the other and positioned in the strut. They connect the two propeller shafts in the nacelle to the two generators in the stabilizer and operate in a counter-rotating operation.

Alternative configurations include changing the single strut 400 and nacelle 121 into two struts 400, 400' and two nacelles 121, 121' placing one strut 400 and nacelle 121 inside the other strut 400' and nacelle, respectively, using the same hinge point on the stabilizer 211. The inner strut 400 and nacelle 121 houses the sealed power cartridge 392 comprising the generator, gearbox and control electronics, which support it. It is held in place by a key. The generator's electric output is connected to contact points along both sides of the unit.

The outer strut 400' and nacelle 121' may be shells serving as a partial covering or mask to attach to or mate with the inner strut 400 and nacelle 121 to help support and protect the inner strut 400 and nacelle 121. The outer strut 400' is hinged at the same point on the stabilizer 211 as the inner strut 400 and has an opening 602' at one end. The outer nacelle 121' is also connected to the mooring cables 115. This allows the inner strut 400 and nacelle 121 to be pulled out from the inner strut 400 and nacelle 121 through the opening to be flipped up for service and repair while the outer strut 400' and nacelle 121' remain connected to the cable 115 at wing-shaped polymer shell 424 stabilizing the entire unit 101.

In some embodiments, two cables lead from an electric winch in the bow of the stabilizer powering two side-by-side reels to directly connect to the bottom of the outer nacelle and the inner nacelle through an integrated pulley in the outer nacelle to the inner nacelle. This allows the inner strut to be released separately from the outer nacelle. In an alternative configuration, a dual strut configuration with either a single or two counter rotating props rotating using the nacelle as a hub which is connected to either end of the two struts. Inside the nacelle are two generators. In this configuration two horizontal mooring harnesses are used and connected to either side of the front of the nacelle and the rear of the nacelle and leading to the shore. These units can also be moored to the river bottom by and cable leading from and anchor it to the front of the nacelle and from rear anchor to rear of the nacelle.

Nacelle

The bottom of the strut 400 is connected to the nacelle 121 which is open ended front and back and supports the plug-in Power Cartridge 392. A nacelle 121 is attached to main stress extension members of the strut 400. This facilitates a quick replacement mechanism when the strut 400 is flipped up as well as easier method of breaking down of components for service/repair and for manufacturing.

Power Cartridge

The power cartridge 392 is a cylindrical metal casing tube 353 having a longitudinal axis with a rounded nose at one end and the hub and propellers at the other. Inside is a series of cylindrical parts that slide into a two-part sleeve (split lengthwise or longitudinally) that holds the cylindrical parts in place and electrically connects the individual parts (using painted on wiring) to the mooring/electrical cable. In some embodiments, the sleeve may be made of ceramic material. A small hole is fabricated on either side of the power cartridge where a flat copper pin insulated from the copper by a ring of plastic. The inner electrical sleeve conducts its power through this contact to the electrical cable of the mooring on the outside. This allows the non-conductive ceramic sleeve to simple be slid into place without any connectors as well as eliminating any through hull fittings. The ceramic liner has vent holes in it and a ribbed configuration along the outer surface to facilitate air movement and cooling from the surrounding metal casing. The sleeve supports and cools components. Wiring is painted on the inside and outside walls of sleeve to protect against moisture and shock which would normally affect a standard wiring harness over time. Circuit breakers are built in to protect installers and maintenance personnel from accidental shorting. The liner can be changed to allow locally produced parts. The cylindrical parts inside the power cartridge 392 include from front to back: a collision foam section, an electrical converter module, a dual micro air pump (to create positive pressure in the unit to prevent any leakage of moisture into cartridge), two identical 25 kW permanent magnet generators stacked in line, a planetary gearbox, two main bearings, an end cap, and driveshaft attached to the hub.

An alternative configuration places the electrical converter module and dual air pumps between the two main bearings with the drive shaft running through them with no contact. The power cartridge encompasses a gearbox that may comprise of planetary gears. Alternatively, in highly variable river currents, it can use a continuously variable transmission ("CVT") which allows for smooth and infinitely variable gearing which makes the CVT a natural fit for a power generator with unsteady input like a wind turbine. Another alternative is the use of a gearless friction drive. The power cartridge 392 casing is fabricated out of metal to dissipate heat. On the outside are attachments for the mooring cable and power. There are several ribbed anode rings that fit around the outside of the power cartridge that prevent corrosion and act as heat exchangers to dissipate heat from the internal gearbox and generators into the passing river water. The mooring harness/power cable attaches directly to the nacelle. All electricals are inside the power cartridge including power processor and automatic circuit breaker, and the wiring harness painted on the inserted sleeve. Some embodiments utilize a variable speed isosynchronous generator. Alternately, a mechanical shaft seal can be used composed of a dripless stuffing box and packing gland which uses a self-aligning carbon graphite stator. The carbon flange is held in contact against a stainless steel rotor which turns with the shaft. The carbon flange is attached by a nitrile bellow which, with the help of water pressure, produces a constant contact between the carbon and the stainless steel ring.

All major stresses: drag of the turbine, rotational load, mooring loads and stabilizer support, are concentrated at one stress point-at the center of the nacelle between the two main bearings which supports the plug-in power cartridge. Inside the power cartridge 392 there are two 25 kW generators, which reduces cost (two smaller generators are cheaper then one large one), and creates a backup if one fails, and it allows a small frontal area. It also allows the same power cartridge to be used for the tidal power version composed of a front and back counter-rotating props driving each generator. The propeller is attached to the driveshaft at the rear end of the power cartridge. Fixed wings can also be attached to the nacelle for added stability and more negative lift. A fixed wing leading from the nacelle on either side the width of the turbine and attached to the horizontal cable mooring system is designed to eliminate possible turbine to mooring cable contact in areas where the river or tidal current can vary in direction. It also serves to keep the unit lined up during the neutral point in the tidal flow.

In an alternative configuration the generator may be placed in the stabilizer tube 211 and driven by a chain drive or vertical driveshaft from the nacelle 121 which can be filled with water.

An alternate configuration includes one counter-rotating prop turns the rotor and the other turns the stator of the same generator. An alternate configuration uses molded polymer magnet technology. An alternate configuration uses an air pressure washer to keep the turbine aligned side to side. Another configuration is to use two identical plug in units comprising a turbine and generator unit plugged into cartridge support structure, one from the back and one from the front.

The turbines would be configured to rotate in opposing directions. Plugging in a "dummy" nose cartridge in front and generator/turbine in rear could easily shift this to a single turbine system. The cast end cap overlaps the power cartridge 392 and screws on to seal and support the power cartridge 392.

The Propeller

The propeller 402 is basically a larger and slower RPM version of the traditional propeller optimized for the four or more mph velocity of the major slow and wide rivers of the continental United States. The propeller 402 is designed to be cheap, strong, safe and highly adaptable to each river site. It can automatically reduce the angle relative to the ongoing river current when stressed. As speed of current increases the angle of the propeller 402 decreases keeping the RPM relatively constant. The propeller 402 is constructed of cheap flexible composite, molded plastic, metal or wood. To make it safe in rivers with aquaculture it has been designed to reduce the impact of the unit by reducing RPM and improving the crushability of the leading edge. It uses various sized and shaped leading edge bumps to reduce impact and cavitation. These bumps also reduce turbulence induced noise, increase the propeller's stability, and enable the propellers to capture more energy from the water. The propeller 402 has many more variations. A 20-foot diameter turbine, which is also made of composite or wood, has rubber bumper/blade tips. There are slow speed props and high-speed props. The use of riblets and wing tip fins and the bending of the blade at the tip slightly into the direction of the current can increase energy capture capabilities.

Other variations include lower aspect blades, lower attack angles which reduce stress if blades strikes debris and lower the chances of fouling. Thicker core section creates lift and strength. The propellers are also more stable, quiet, and durable than conventional propellers.

An alternative propeller design is to have two identical three bladed propellers on the same hub in line one after the other. In slow moving water the two propellers are rotated so they form a 6-sided propeller. When the river increases speed they can rotate back to a 3 bladed propeller. Vortex generators and stall fences can be attached to the leading edge of the propeller. Bumps can be molded into the leading edge of the propellers. Studies have shown that stall typically occurring at a 12-degree angle of attack is delayed by the use of leading edge bumps until the angle reaches 18 degrees. In these tests, drag was reduced by 32 percent and lift improved by 8 percent. This is estimated to delay stall and doubles the performance of the propellers allowing the propeller to capture more energy out of lower-speed currents.

The modified propellers generate the same amount of power at 4 knots that conventional turbines generate at 6 knots. The bumps effectively channel the flow of water across the blades and create swirling vortices that enhance lift. This affects the advantage of the angle of attack—the angle between the flow of water and the face of the blade. When the angle of attack of the blade becomes too steep, the result is a stall. There is not enough water flowing over the top surface of the blade. This causes a combination of increased drag and lost lift. The angle of attack of a bumpered blade can be up to 40 percent steeper than that of a smooth blade before stall occurs. The bumps change the distribution of pressure on the blades so that some parts of it stall before others. Since different parts of the blade stall at different angles of attack, abrupt stalling is easier to avoid.

This is particularly important for tidal energy absorbers, which must maintain themselves through a constantly increasing and decreasing range of current speeds. Another solution to mid-tide stability is the use of bow and stern electric thrusters using an internal battery pack and/or two horizontal mooring cables 115, 115' rather than one. In some embodiments, these thrusters may be positioned on or integrally formed with the wing-shaped polymer shells 424. For example, the bubblers 150 may further eject water to provide thrust action on the wing-shaped polymer shells 424.

Further alternative configurations include: the counter-rotating propellers, expandable blades, and/or three bladed propellers. Counter-rotating propellers may be separated by several feet to make it less vulnerable in a high density debris site. Controlling the shape of the leading edge of the blade with air pressure inside an expandable layer can improve the performance range of the propeller and at the same time make it more fish friendly. Using a three bladed propeller minimizes the number of leading edges while eliminating the unbalance stresses a two-blade propeller can place on the hub of the turbine. In addition, the three-bladed propeller reduces RPM to 8-16 RPM. Due to the low velocity, a thick, blunt, rounded leading edge can be used. Propeller safety is maximized by using low RPM, more surface area, lower aspect, lower impact speeds and inflated leading edge. The stall-regulated rotor can be designed for tip speed of 10 m/s or less to keep the tips clear of cavitations and the blade design suitably chunky because of the large loads (the blade root and hub proportions need to be equivalent to those of a wind turbine rotor of roughly twice the diameter). They have about four times the torque/power ratio of a comparable wind turbine design. A low or high frequency generating device can be imbedded into the moving prop to warn away fish over a short distance. An alternative configuration is a long, thin flexible blades that twist and stall creating flat surfaces when struck.

There are many alternative configurations. A movable layer over the leading edge with air pressure behind it. The use of centerboard type props fit inside each other and slide out for more surface area using air pressure. Hinged props using an integrated gear system. When the load is too high, pneumatic pressure powers a pump to drive props back.

Various blade designs range from thick cross-section low aspect blades to long half circle shaped blades. Offset blades can rotate in line to be a three blade or rotate out to 6 blades. Counter rotating props reduce frontal area, stabilizer rotational forces, cut structural weight cost, and reduce the need for rotational speed. Each blade is pinned to the hub so it can flex backwards. Air or water pressure can be injected into blades composed of a bladder inside two plastic shells which form the blade to make them thicker or thinner. The end of each blade can curve slightly forward into the direction of the current to reduce current flow running off the end of the blade. In some embodiments, a blade may have a cantilevered configuration where the blade is angled forward into the direction of the current and then at a point angled away from the current. In some embodiments, the blade may form a spiral as it twists back behind the turbine hub. Wing tips can also be added to the edge of each blade to eliminate vortices. If debris slows or stops the rotation of the propellers, the increased load on the prop will either bend it back or rotate it back to shed the debris or load. Then when the load declines, the blades rotate again back to their original angle.

The energy modules 101 use a rudder 401 to maximize the highly directional control of the module 101. A medium aspect rudder is attached to the aft section of the stabilizer tube 211. The rudder 401 uses the energy of the passing current to orientate the invention module directly into the current thus maximizing the power efficiency. The rudder 401 keeps the entire module 101 aimed up stream even if debris has disturbed the craft. A flip up rudder may also be implemented into the stern. The rudder 401 could also be in the form of a long low thin keel beginning at the strut 400 and leading aft. An alternative configuration replaces the rudder 401 altogether with a multidirectional stabilizer attached behind the propeller 402 and short stubby stabilizer. For the tidal power embodiment small flaps on the rudder 401 help flip up the strut 400 when the tide changes direction. Alternately, duel side-by-side rudders can be attached on either side of the stabilizer instead of using a deeper rudder when needed. The angle of attack of the rudder of the river and tidal power invention can be adjusted using an hydraulic or electric actuator to add resistance to possible increased rotation of the stabilizer. To further protect the turbine blades from striking the mooring cable, the cables could be connected to the rudder assembly in such a way to turn it to keep the device at right angles to the harness.

The energy modules 101 use various coatings which are bio-neutral. They can also have no coating on steel, make it thicker, and use anodes only. Portions above the waterline can be painted.

In terms of debris, for larger projects, the blade design is tuned to average speed, sediment and debris content. The propeller 402 is two feet below the surface of the water to avoid entanglement with most debris, it has slow RPM, is curved, and is designed to shed debris. The strut/propeller assemblies of the entire array are designed to flip up for service and annual maintenance. In dense debris sites the strut 400 can be lengthened submerging the propeller further below the surface debris field. Bow and strut debris deflectors can be added as needed.

The entire configuration is designed to be mass manufactured in the host country which makes its application much more widespread. This is essential if the invention is to become a utility scale renewable energy. The US produces 15 million cars per year. If only 1% of that production was converted to the manufacture of the invention units, 1,500 MW of new clean power would come online every year. Since 2005, the Big Three US automakers have closed plants capable of producing 2.2 million vehicles annually. An additional 1.8 million vehicles worth of cuts have already been announced. Two million inventions produce 100,000 MW increase in one year. Stampings are simplified and few. The stabilizer is a tube. The extendable strut are two box C-sections. The power cartridge is a tube. The rudder uses one stamping for both sides. The nose and aft stampings can be the same. It is also designed to use lower costs, materials and manufacturing systems to be able to be manufactured in the developing world. Changeable manufactured parts are used so locally produced parts can be used with adapter sleeves. As part of the manufacturing process, which is sited in country, a website is accessed and computer visuals (local and globally sourced artwork, photo realistic leaves, seagrass, and more which can be chosen by local residents who will see it) are downloaded to a printer that is designed to print on the inside surface of clear flexible weatherproof plastic that is then applied to the surface of the invention from just above the water line over to the other waterline. Alternatively, before the invention is placed in a river, a photo can be taken from various angles and a composite can be made and printed on a photorealistic adhesive plastic sheet that is applied to the unit to camouflage the unit, thereby making it appear just as the river looked before it was placed there-same color, shape of river water, or replicate a nearby shape. Black bottom paint is used to eliminate any reflection of light on the bottom.

There are a number of fail-safe systems used to reinforce each other. In some embodiments, the hub includes a built-in clutch to slip when torque is too high. In some embodiments, a free wheeling alternative is utilized. The blades can hinge back. The device can be self-feathering. Various over speed concepts include: 1) a valve that opens to inject air into the turbine blades to stall them and stall out blade with air brake concept; 2) flex based with bumper tips, fold back blades, flip ups, tortional loaded rotational hubs, flexible blades. A standard brake switch and brake can be used to stop turbine rotation before the strut is flipped up and serviced. Grounding options include one leg and long foot or flex steel grounding legs in tripod. A debris screen composed of a cable attached molded in nose hole runs down to the front of power cartridge. High fluctuation seasonal streams requires long pulley vertical traveler using railroad tracks.

The array of inventions can be in many configurations. In its normal configuration it is stretched from shore to shore. In short sections of the invention can also lead from the shore out into the river current for 100 to 200 feet to produce from approximately 200 kW to 400 kW. These short sections may be attached to the shore at one end and to a modular underwater A-frame mooring anchor system 1800 at the other. The inverted version 101' of the invention can also be used as an anchor where the mooring cable 115 stops at the inverted device and then angles down into a screw-in anchor thus creating an energy producing A-frame configuration. The array of inventions can also be open-ended where neither end of array is attached to the shore but moored at each end to the bottom using an A-frame unit.

In larger rivers with shallow draft pleasure craft traffic, the invention is capable of being placed in the deeper higher current speed areas letting the boat traffic use the shallower low river power areas. The invention can also be placed out of sight under bridges and behind dams. The propeller 402 of each adjacent invention may rotate in the opposite direction to the one beside it, thereby counteracting the rotational forces placed on the entire array 100. The rotational forces of the propeller 402, the drag of the propeller 402, the forward and side loads of the mooring cable 115 and the vertical loads from the stabilizer 211 are all directed into the steel block of the gearbox 404. This centers the major stresses on one load point stabilizing the unit during operation and reducing overall structural loads thus limiting the need for overbuilding of parts, which reduces overall costs and weight.

The invention is designed to be driven over by a large ship with no or limited damage. The arrays can be set up with approximately 5-10 foot separation between each 20 ft diameter propeller 402. When more than one array is being used their spacing is opened up to allow the river flow to average out in the array 100. The modules 101 in large arrays are spaced 40 feet apart with the propeller of each energy absorber in the array 100 behind it lined up behind the center of the opening and so on. These units can be placed from 100 to 500 feet behind each one depending on the speed of the river, the bottom depth and the density of each array.

When power arrays are constructed the standard separation between units is twice the width of the energy module 101. In some embodiments, that is 20 feet for the energy module and 40 feet for the separation between two propellers. Therefore, as an example, a river of 1,000 ft wide of 30+ depths with 50-foot offsets on both sides would have 15 units producing 750 kW. When power arrays are stacked one after the other down a river the distance between each is approximately 200 feet. Each module 101 of an array 100 is offset to be positioned between the two units forward of it. A 1,000 feet section of river would produce 3.75 MW. A 1-mile section would produce 18.5 MW. On an annualized production basis this is approximately equal to 74 MW of wind power or twenty-seven 3 MW wind turbines.

The entire configuration is designed to be mass manufactured in the host country which makes its application much more widespread. This is essential if the invention is to become a utility scale renewable energy. Two million inventions produce 100,000 MW increase in one year. Stampings are simplified and few. The stabilizer may be a tube. The extendable strut may be two box C-sections. The rudder may use one stamping for both sides. The nose and aft stampings can be the same. It is also designed to use lower costs materials and manufacturing systems to be able to be manufactured in the developing world. Changeable manufactured parts may be utilized so they can use locally produced parts using adapter sleeves. As part of the manufacturing process which is sited in country, a website may be accessed and computer visuals (local and globally sourced artwork, photo realistic leaves, seagrass, and more which can be chosen by local residents who will see it) may be downloaded to computer for printing on a printer, such as an industrial grade color printer that is designed to print on the inside surface of clear flexible weatherproof plastic that is then applied to the surface of the invention from just above water line over to the other waterline. Alternatively, before the invention is placed in river, a photo can be taken from various angles and a composite can be made and printed on a photorealistic adhesive plastic sheet that is applied to the unit—thereby making it appear just as the river looked before it was placed there-same color, shape of river water. Black bottom paint is used to eliminate any reflection of light on the bottom.

There are a number of fail-safe systems used to reinforce each other. The hub 358 includes a built-in clutch to slip when torque is too high. A free wheeling alternative may also be used. The blades can hinge back to dissipate a load. The device can be self-feathering. Various over speed concepts include: a valve that opens and injects air into turbine blades to stall them and stall out blade with air brake concept. Another overspeed fail-safe: flex based with bumper tips, fold back blades, flip ups, tortional loaded rotational hubs, flexible blades or fold back blades. A simple brake switch may be used for service or just flip up. Grounding options include one leg and long foot or flex steel grounding legs in tripod. A debris screen composed of a cable attached molded in nose hole runs down to the front of power cartridge. High fluctuation seasonal streams require long pulley vertical traveler using railroad tracks.

Figure 6D:
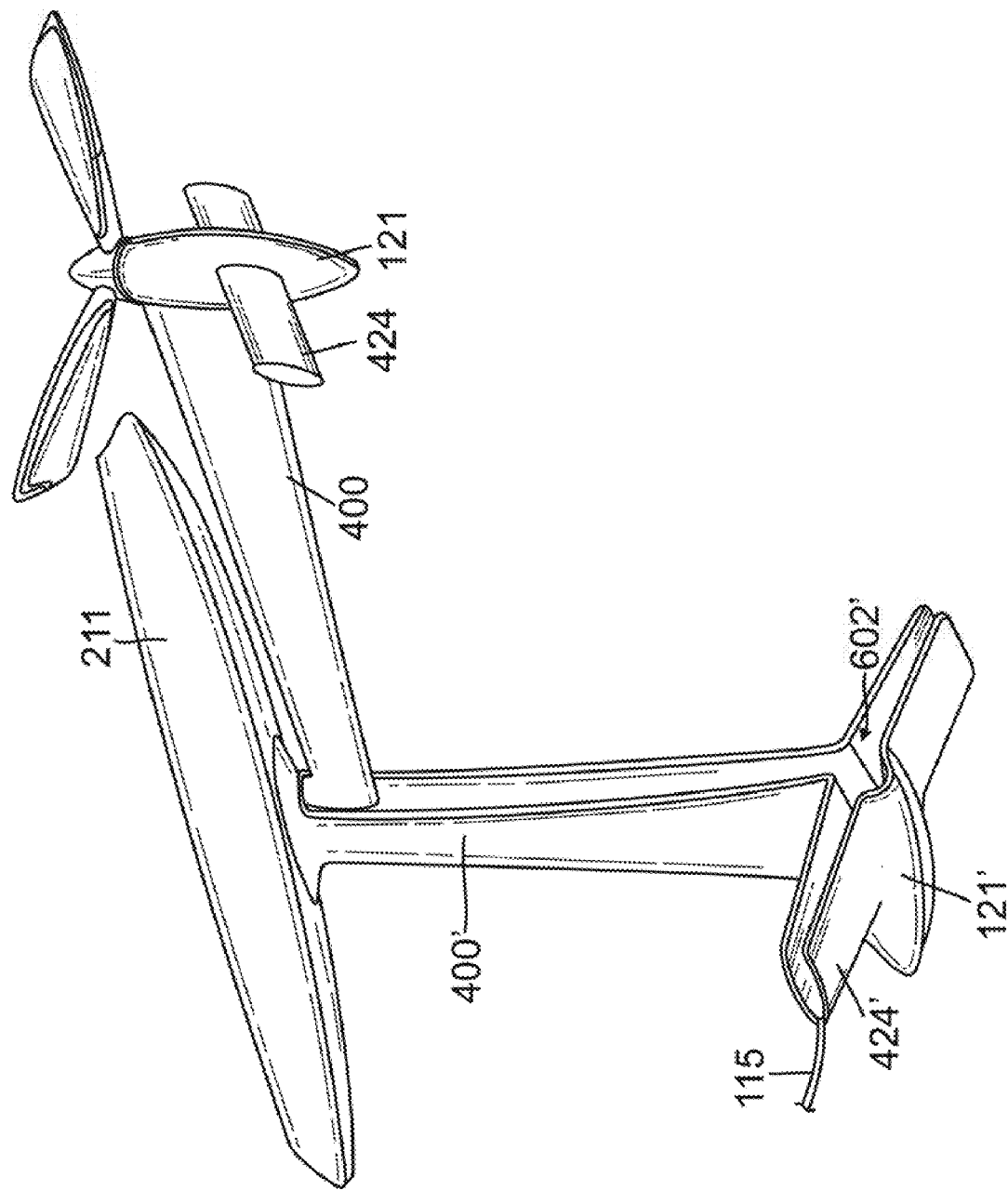
FIG. 6D is a perspective view of the energy module in FIG. 6C in a different configuration.
Figure 7A:
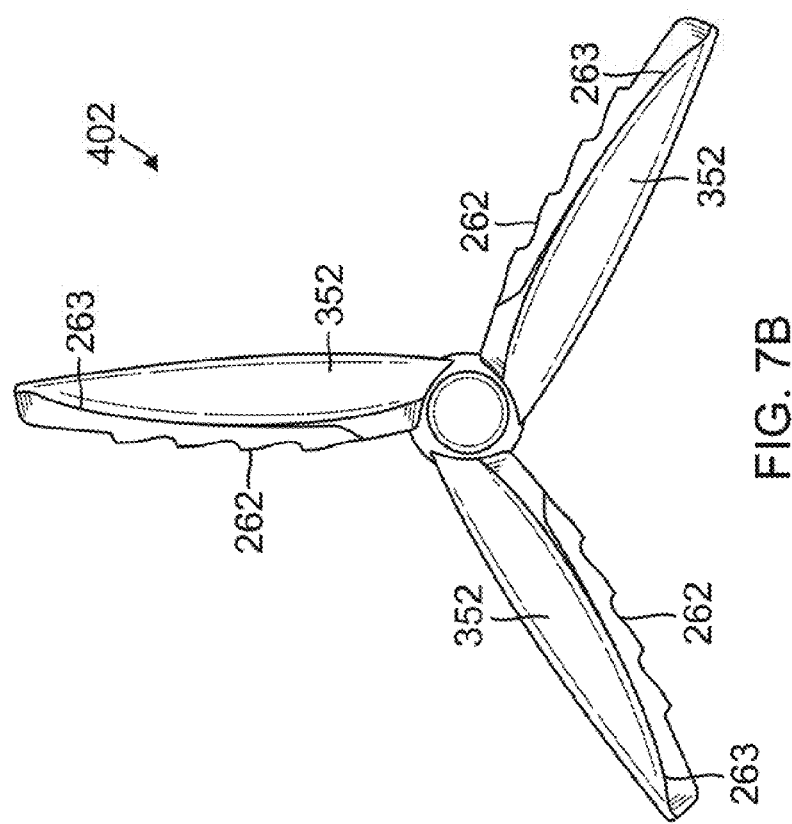
Figure 7B:
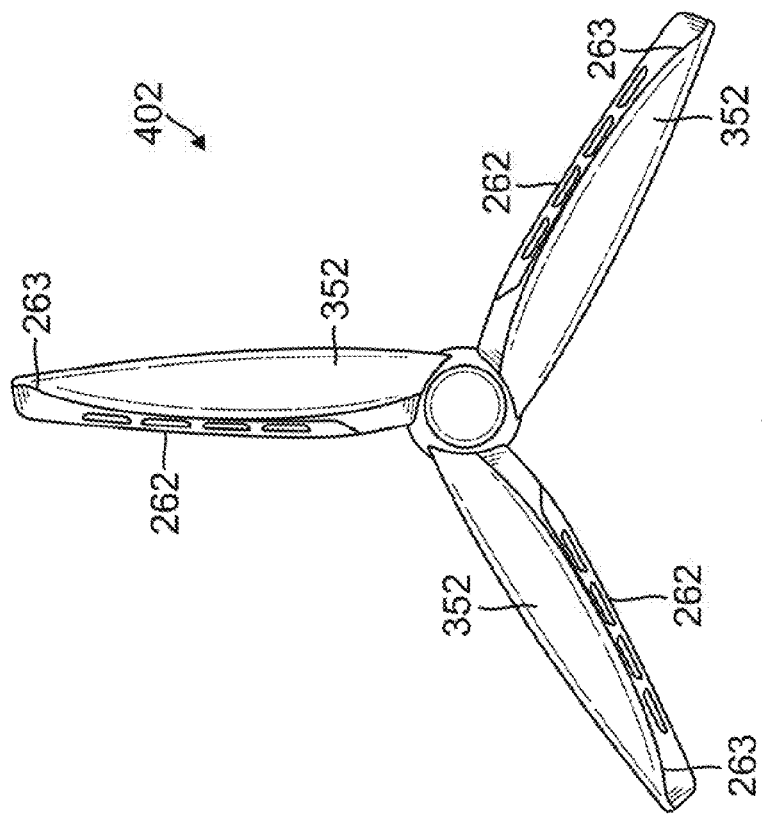

The invention can be modified for high debris sites. This version of the invention is designed for high debris density rivers such as the upper Amazon River, sections of remote African rivers that not only have a heavy incidence of debris but the debris is of large displacement. This embodiment is composed of an entirely redesigned stabilizer, strut, rudder and blade assemblies. The invention is designed to be adaptable to high debris areas by moving the strut forward and adding reserve buoyancy tanks forward to maintain proper buoyancy while reducing buoyancy aft as shown in FIG. 6A. When struck by large debris that is not repelled, this version of the invention is designed to rotate backward about the axis of the mooring cable with its bow section sinking until the large item of debris rolls over it. Then it will right itself and continue operation. This same version of the invention can be further modified to be used in ice covered rivers. This version of the invention has an ice proof hull using a bubbler system that runs the full length of the stabilizer as a tube with small holes running along the keel which bleeds compressed air forming a barrier of bubbles along the surface of the invention which keeps it free of the ice. A ballistic snorkel replaces the standard sensor module and is streamlined and several feet high so it is above the river ice. An alternative configuration pumps air through a tube in the mooring to each unit. The curved bow would suffice here to keep the ice from getting underneath the device as it forms.

The invention is modified for air and helicopter shipment by being lightweight. Replacing the steel stabilizer, rudder, strut, and power cartridge with a composite or aluminum materials is estimated to reduce overall weight by up to 50%.

The invention is modified for powerful highly seasonal rivers that cannot be harnessed by dams. These types of rivers are common in countries like Nepal, Afghanistan and India where the rivers may triple in size and depth during certain seasons. The invention uses the high debris version with an extended structural element extending from the bottom of the strut and connected to a long grounding plate leading back beneath the turbine.

The invention can be combined with structures to build floating docks, buildings, and bridges that produce power.

These floating structures are hinged at the shore and kept afloat by the invention. An array of the inventions can also be built as a pedestrian and small vehicle bridge, tourist serving lookouts and a power generating dock. This configuration can be built as floating self-contained and self-powered small factories, schools and medical clinic units ready to go with pre-installed tooling equipment and software. They can be towed upstream and placed in remote, difficult to reach areas. These units can add to their backup power with solar power and micro-wind power systems integrated into their roofs. The power dock format can be widened to create a floating powered, tennis courts/basketball court or even planted to create a floating park. This could also be used to be the last stage of wastewater treatment before returning it to the river. The powerdock and powerbuilding can replace the pole foundations with flexible moorings. Alternate configurations include fixed or flexible arrays used as power spurs which swing out into the flow of the river and can swing back for the passage of large ships, repair or flooding.

The invention can be configured as a bottom mounted version. Unlike other bottom mounted hydrokinetic systems it requires no bottom construction saving cost and time. There is less stress on the structure due to all loads absorbed at the same point by a horizontal cable mooring. A river bottom is a dangerous place where large debris like 55 gallon steel drums, cables, waterlogged materials move across the bottom pushed by the current. The mooring system 118 allows the use of higher drag, lower RPM turbines which allow lower debris strike loads. The bottom mounted version allows various strut length settings to deal with uneven bottom contours so all turbines remain at same depth. The invention can be modified for bottom mounting. The invention is designed for highly populated sites that require an entirely invisible system.

A modified version of the invention is designed so the normally floating stabilizers can be filled with water in stages so that the entire array of units rotate around the suspension mooring cable and eventually settle on the tidal flow bottom with the turbine upright. This underwater version can be refloated when annual maintenance is required. The unit not only can be stabilized using a float on the surface but also by filling the float thus turning the unit upside down and sitting on the bottom. Air pressure mooring lines may be used to repressure buoyancy areas. The air source comes from an air tube integrated into the mooring cable. Each unit has small studs on the bottom to dig into bottom when it settles.

The invention can be configured to capture and regenerate energy at the bottom of the outfall of hydropower dams. Like other energy regenerators it captures energy waste and reuses it. The regenerator version uses a special long waterline high-speed stabilizer. The outflow from dams is debris free, controllable, clean of sediment and high density power. The dam's outflow can be stopped so the invention can be installed quickly and serviced at any time. Depending on the output of the dam and the characteristics of the river below it, hundreds of meters to several kilometers of arrays of the invention could possibly be installed. For power companies that already own hydropower facilities, this version of the invention can offer a rapid build, cost-competitive alternative to increase capacity. This technology could also be applied to non-hydropower dams which have the right set of characteristics.

The invention can also operate as an in-dam version for non-hydropower overflow type dams. The unit has a wing attached to the bottom of the strut to help direct the flow of water through the turbines as well as hold the invention against the edge of the dam.

The invention can be configured as a secure energy source. A version of the invention is designed to fill the special need for a secure, zero imported oil, 100% capacity powerplant and/or watermaker. It will be designed for the military for offshore bases. The average American soldier in Iraq and Afghanistan consumes on a daily basis 16 gallons of oil through the use of Humvees, tanks, trucks and planes. That is up from 4 gallons per day during Operation Desert Storm. The total consumption of USD combat operations in the Middle East war zone is 3.5 million gallons of oil daily or 1.3 billion gallons annually. The Department of Defense's daily oil consumption is approximately 14 million gallons every day. The invention is also designed for large international corporations who need added security for their remote industrial sites. The unit uses light armor cladding technology with plug-in mission packages including infrared, acoustic, sonar and other sensor devices to scan intrusion areas. The unit can also double as a self-contained security checkpoint on a river site. The onshore control and watermaking systems can also be hardened. The invention can be air transported in and trucked or towed to site. It has a fast set up time requiring minimal site work. The anchoring system uses a foldable, lightweight anchor and pulley tightening system. Local railroad tracks can be used as the vertical mooring poles which are strong, available, and cheap.

The invention can be configured for replenishing the world's aquifers. Aquifers are being drained at an alarming rate. They are enormous in size stretching for hundreds of miles. The inventor's aquifer replenishment system uses arrays of river power invention water makers arrayed every few miles along rivers that pass over these aquifers. The arrays use the energy in the rivers moving water to purify the water and pump it ashore where it is injected into well holes drilled into the aquifers. The system is designed to operate for decades to replenish the aquifers.

The invention can be configured to protect the world's water supplies from terrorists. Today, domestic water supplies and systems are vulnerable to multiple security threats. This can come about in the form of cyber attacks on control facilities, microbial contamination and toxic chemical contamination, among others. The invention can operate as a security platform being placed in the current of a river to continuously sample the passing water for various forms of contamination. It is connected to a satellite grid, which uses it to monitor regional water sources for possible terrorists events affecting a nation's water resources.

The invention can be configured for developing world applications. A version for the Developing World can provide electricity and fresh water to many areas of the world. It is composed of several modified inventions which combine the standard power cartridge and a small reverse osmosis unit in the stabilizer that can be towed up river or trucked to a site and quickly set up to produce significant electricity for a remote village during the day and evening and then shift to refilling the village's freshwater tanks during the night. It can also be used to help in irrigating crops as well double as an emergency flood and fire pumping system. Alternate inventions can be mixed into the array such as a unit that can provide compressed air to power tools and farm equipment.

The invention can be configured to improve agriculture efficiency. The river power invention is designed to help assure the world's future food security. With water shortages emerging as a constraint on food production growth, the world needs an effort to raise water productivity similar to the one that nearly tripled land productivity during the last half of the twentieth century. Since it takes 1,000 tons of water to produce 1 ton of grain, it is not surprising that 70 percent of world water use is devoted to irrigation. Thus, raising irrigation efficiency is central to raising water productivity overall. Projections show global population growing to 9 billion by 2050. Most people may drink only two liters of water a day, but they consume about 3,000 liters a day if the water that goes into their food is taken into account.

As much as 70% of water used by farmers never gets to crops perhaps lost through leaky irrigation channels or by draining into rivers or groundwater. In surface water projects—that is, dams that deliver water to farmers through a network of canals-crop usage of irrigation water never reaches 100 percent simply because some irrigation water evaporates, some percolates downward, and some runs off. Water policy analysts Sandra Postel and Amy Vickers found that "surface water irrigation efficiency ranges between 25 and 40 percent in India, Mexico, Pakistan, the Philippines, and Thailand; between 40 and 45 percent in Malaysia and Morocco; and between 50 and 60 percent in Israel, Japan, and Taiwan." Irrigation water efficiency is affected not only by the type and condition of irrigation systems but also by soil type, temperature, and humidity. In hot arid regions, the evaporation of irrigation water is far higher than in cooler humid regions. Raising irrigation water efficiency typically means shifting from the less efficient flood or furrow system to overhead sprinklers or drip irrigation, the gold standard of irrigation efficiency. Switching from flood or furrow to low-pressure sprinkler systems reduces water use by an estimated 30 percent, while switching to drip irrigation typically cuts water use in half. A drip system also raises yields because it provides a steady supply of water with minimal losses to evaporation. Since drip systems are both labor-intensive and water-efficient, they are well suited to countries with a surplus of labor and a shortage of water. Large-scale drip systems using plastic lines that can be moved easily are also becoming popular. These simple systems can pay for themselves in one year. By reducing water costs and raising yields, they can dramatically raise incomes of smallholders. The replacement of agriculture irrigation dams with the inventor's river power irrigation system can cut water use more than 50%, improve water quality where needed, improve river biological and sedimentary balance, speed up installation and cut invested energy and cost. The invention can be placed at strategic sites along a river in 1 MW (1300 HP) 20 unit arrays where they pump water through easy to lay flexible tubing to farms where they fan in spiderlike arrays to drip irrigation systems. The use of river power invention can help prevent further top soil loss and reduce use of pesticides, promote use of direct irrigation, which reduces runoff and reduces use of pesticides. It can be part of a modular automated farming system that can be shipped to an area such as Africa, which has rich topsoils, but does not have the necessary infrastructure and organization to apply modern farming methods. The large scale worldwide application of river power inventions would have a systemic level effect such as increasing food supplies, replenishing water tables, electrifying poor areas and reducing global warming.

The invention can be configured to clean river water through natural processes. More than 70% of the water withdrawn from surface and groundwater sources returned to the receiving water after use. Approximately 40% of river and steams miles, 45% of lake acres, 50% of estuarine square miles and 80% of Great Lakes shoreline miles do not meet ambient water quality standards. Many Americans are concerned about water quality in the river basin they live in. Serious degradation in water quality has occurred in most rivers basins over the last 150 years due to significant changes in land use. Where most river basins were once dominated by forest, prairie and wetland landscape that supported a thriving population of birds and bison. As settlers moved in, they established many towns and cities, plowed the prairie, and drained the wetlands. This has radically altered the river basins. Many are now severely impacted by: Pathogens (bacteria and viruses) that cause disease. If people, especially children come in contact with pathogens, they may get sick. Sediment (suspended soil particles) that makes rivers look muddy and turbid, restricts the ability of fish to spawn, limits biological diversity, and carries phosphorus into the river. Phosphorus may stimulate the growth of algae. As algae die and decompose, oxygen levels in the water are lowered, which may kill fish and other aquatic organisms. Nitrogen that can affect drinking water. At high enough concentrations, nitrate-nitrogen can cause infants who drink the water to become sick.

The inventor designed an environmental remediation version, a self-contained river powered water management device capable of restoring river quality with a naturally based method while monitoring the river's water quality. The river's own hydropower drives an on-board air-compressor which oxygenates the water improving dissolved oxygen and pH levels while killing off anaerobic and pathogenic bacteria. This energy free water restoration process improves water quality promoting fish aquaculture, swimming, fishing and boating. At the same time on-board sensors monitor changing water quality helping to pinpoint locations of entry of industrial, agricultural and storm water runoff. Automated continuous water quality monitoring. The compressed air can be directed through bubbler tubes 150 integrated into the mooring system; through the tips of the spinning turbine, using the accelerator device, using an attachment to the strut and through a flexible tube to bubbler arrays on the bottom. In one embodiment, the mooring system 118 may comprise a row of bubblers 150 integrated into the edges of the wing-shaped polymer shell 424. An alternative system is designed for more problematic rivers where special chemicals in liquid form can be pumped from shoreside tanks or tanker trucks through a tube incorporated in the mooring system to each invention which disperses it through the passing water.

The invention designed for surface water cleaning by natural processes is designed to catch passing water and send it through a Reed bed water treatment systems incorporated in each invention. This bed is simply a thin layer of gravel planted with reeds. The water that flows out of the Reed bed is clean and can be discharged straight back into a river. The organic matter falls to the bottom of the bed or is eaten by bugs, and water is returned to nature. The small Reed beds are planted with reeds that release oxygen in the water and stimulate the growth of microorganisms. It will clear the water of any soluble material and pollutants. No need for expensive and polluting chemicals. The common Bulrush, this species is capable of removing large quantities of organic and inorganic substances from contaminated waters. The Bulrushes not only enrich the soil they grow in with bacteria and humus, but apparently exude antibiotics that kill mold fungi. They also take up large quantities of ballast substances including cobalt, copper, nickel, and manganese from sewage water, and that other higher plants, including the common reed, Phragmites conmunis Trin., are capable of drying out and mineralizing assorted sludge combinations which are normally difficult to remove. The almost water-free residues contain very little, if any, dangerous bacteria or worm eggs. Prior observations of natural waters had indicated that water was cleaner and fish healthier where rush populations existed. In the laboratory, it was shown clearly that an astonishingly fast alteration of bacterial populations occur in the region of the rushes, as well as of some higher plants. *E. coli*, coliform bacteria, *salmonella*, enterococci disappeared entirely within a day while healthy bacterial populations increased. Additionally viruses and worm eggs were eliminated. Other studies showed that up to 90% of *E. coli, enterococcus* and *salmonella* organisms could be eliminated in as little as two hours by a number of other plants, including water mint, water plantain, soft rush, yellow flag and the Bulrushes and reeds care planted.

The invention can also be configured for wastewater treatment. This version of the invention is designed to provide a renewable energy source for riverside municipal waste treatment facilities. Energy is a major cost for waste treatment systems. Power blackouts can cause these systems to fail and pollute rivers and lakes. Most municipalities in the developed world have some form of water treatment plants generally using similar process commencing with aerobic treatment stage in which naturally occurring microorganism in the wastewater are used to convert the biological components of the wastewater into inert matter through a biochemical oxidation process that includes the use of "blowers" for maintaining adequate levels of dissolved oxygen. The supply of oxygen is suspended biomass represents the largest single energy consumer in an activated sludge waste water treatment ("WWT") facility accounting for 40 to 90% of the total power demand.

The US has over 16,000 publicly owned treatment works ("POTW") in operating treating over 40 billion gallons of wastewater daily serving 190 million people. Canada has 2,000 WWT facilities. US POTWs consumed approximately 21 billion kWh of electricity in 2000. Privately operated facilities are estimated to consume twice that of POTWs. In 2002, emissions resulting from POTW operations excluding organic sludge degradation led to a global warming potential of 14.5 Teragrams $CO_2$. US wastewater treatment systems produce over 1% of total US green house gas ("GHG") emissions. WWTs account for approximately 3% of the electric load in the US. Opportunity is often disguised as confusion. Every wastewater treatment system is searching for ways to reduce costs and create a cleaner effluent, known as a "better economical effluent," but finding the opportunity may not be clear. Many believe that the largest opportunities for cost savings hide in the aeration phase of secondary treatment.

For example, the Water Environment Federation states up to 70% of a wastewater treatment plant's budget is allocated to energy for aeration. The second highest cost is disposing or dealing with solids leaving the facility. Both of these are best addressed within the secondary process. Also a river per system is not vulnerable to power grid failure reducing chances of raw effluent escape in environment. Water treatment systems are usually situated next to rivers, lakes and oceans to be able to return the treated water. Therefore they are also next to a new source of power. The invention also provides the compressed air used for oxidation by these systems. This version of the invention is a self-contained river powered water management device capable of restoring river quality with a naturally based method while at the same time monitoring the river's water quality. The river's own hydropower drives an on-board air-compressor, which oxygenates the water improving dissolved oxygen and pH levels while killing off anaerobic and pathogenic bacteria. This energy free water restoration process improves water quality promoting fish aquaculture, swimming, fishing and boating. At the same time on-board sensors monitor changing water quality helping to pinpoint locations of entry of industrial, agricultural and storm water runoff.

This configuration of the invention will open up even more untapped hydropower markets.

The invention can be modified to capture wasted energy from the outfall of dams. The concept of the dam is to store up potential energy in large reservoirs. Using the pressure of the dam's height, the water is driven a great pressure through massive generators to create electricity. But there is a lot of wasted energy in the outflow where massive amounts of water escape from the dams outflow down a river until it slows down. This outflow area is targeted by this configuration of the invention. Advantages include increasing dam power output without increasing reservoir or dam size, using in river power cables to connect the arrays to the dams established power grid, slows outflow speed, aerates water, reuses the concentrated outflow of the dam many times. The invention can also be used in same way to produce power for the many non-hydropower dams in the world.

The invention can be downsized to a man-portable size in the form of a mobile self-contained hydropower energy generator. This configuration of the invention meets battlefield power requirements for limited weight, low cost, small volume, high storage, continuous generation and exceptional performance. For military applications, a wide slightly curved ballistic shell is connected over the stabilizer which submerges just below the waterline to generate enough power to extend mission run time. By powering man-portable equipment over extended distances and through harsh terrain, the invention allows soldiers to operate independently of power grids.

Once sealed in the manufacturing process, the technology has to potential to operate in extreme conditions (environment, altitude, temperature, humidity, sand, salt, shock and vibration).

Figure 15A:
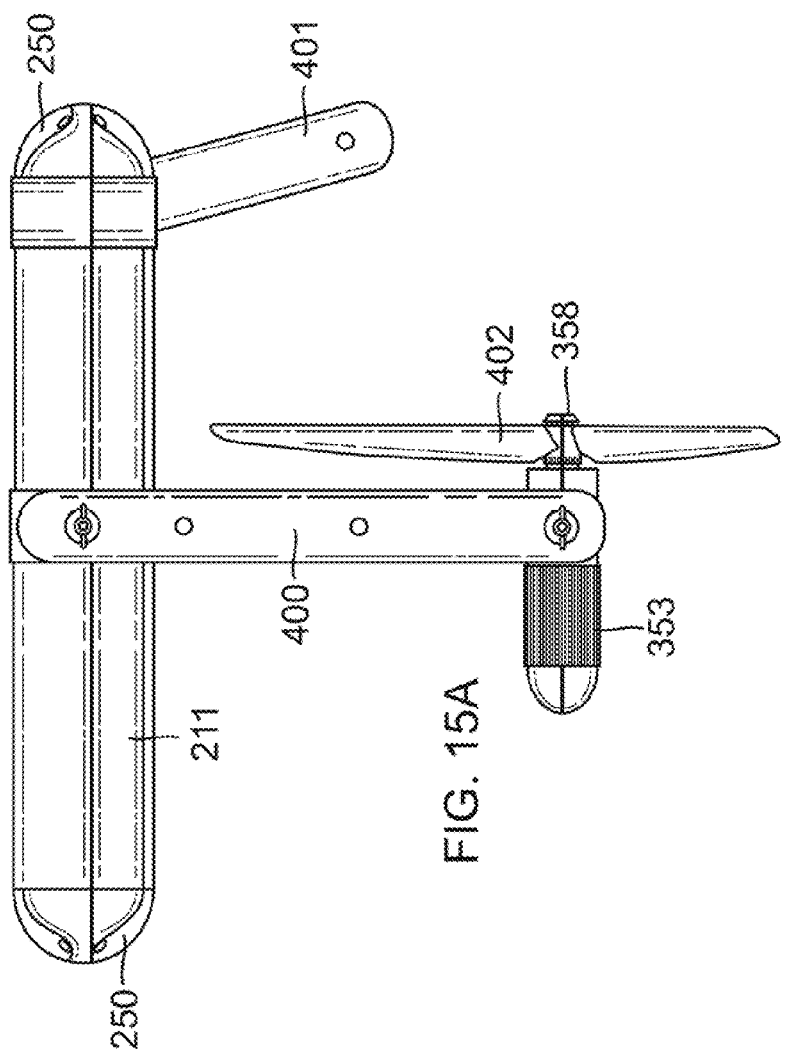
FIG. 15A is a side view of another embodiment of the energy module.
Figure 15B:
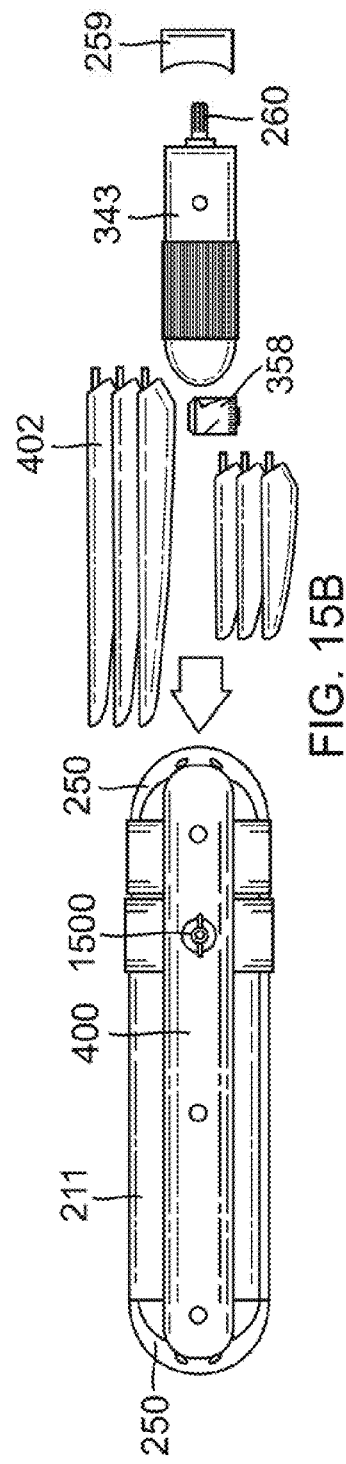
FIG. 15B is a side view of the energy module in FIG. 15A disassembled.

The modular design allows for future upgrades in technology and capability, and enables transition to Army Future Combat Systems interoperability (Plug in & Fight doctrine). In some embodiments, the invention is approximately 200-pound unit with an in-river footprint of approximately 6×5× 6.5 that collapses into a 5-foot long tube that is two man-portable as shown in FIGS. 15A and 15B. Each unit is self-contained with its own integrated power converter, cooling system, electrical safety system, sensors and security systems. The 5 kW and 10 kW versions can operate in small steady or seasonal streams. They can be adjusted quickly to deal with high debris areas by simply sliding strut 400 yoke forward and adding two half sphere shaped floats forward. Instructions for installation and operations are printed in local dialect on top of the stabilizer tube 211. The detached hand tightener is keyed and fits only into the lockable hinges so only those with the special wing nut 1500 can fold the unit down to collapsible size.

The invention can also be used to power individual riverside homes in the US and Europe, small remote riverside villages in Africa, Asia and South America and in canals and aqueducts.

The invention can be modified for watermaking which targets the coming global water shortages. One person out of three on the planet today lacks reliable access to freshwater, claims a recent report by the International Water Management Institute (IWMI). Every day more children die from dirty water than from HIV/AIDS, malaria, war and accidents all together. The World Health Organization (WHO) estimates some 2.6 billion people have inadequate sanitation. The water crisis does not only affect the developing world; France instituted water rationing last summer, London applied for a drought order, and Los Angeles is in its driest rainy season in more than 100 years. Add to that, the European Environment Agency reports that nitrates, toxins, heavy metals, or harmful microorganisms contaminate groundwater in nearly every European country and former Soviet Republic. By 2025 all of Africa, the Middle East, and almost all of South and Central America and Asia will either be running out of water or unable to afford its cost according to the IWMI.

The use of the invention will cut out the connection between rising fuels costs and rising freshwater making systems. The invention in another version is a river powered water-making system. RO water purification is expensive. Energy makes up on average 50% of the total cost of each gallon produced. The inventor's water unit is a self-contained hydrokinetic system combining a river power generator with a water maker module. This integrated system is designed for short arrays of a few units. Larger arrays, based upon the size of the river and the water needs in the area, will use river arrays to power a larger output shore side water-making unit. In a multi-functional array the water maker would be placed nearest to the rivers edge to reduce the length of the flexible tube integrated into the mooring line to reduce energy loss. One has dirty river water pulled in by turbine powered pump which pushes up strut in forward tube into RO systems where it is cleaned and then pushed down by rear tube in the strut and out to the streamlined mooring cable and water conduit to shore.

This invention may also be configured to power an onshore water making system. Both systems can be used to provide freshwater for villages, industrial and agricultural use. A modular water making system placed inside the stabilizer can be easily serviced or replaced and powered by the generator in the power cartridge. The water maker pumps water in at the nacelle 121 and sends it up to reverse osmosis unit 450 in the stabilizer and back down to the nacelle 121 where it is sent through a mooring hose to shoreside as shown in FIG. 4. The water unit is a 20-foot long self-contained hydrokinetic system combining a river power generator with a water maker module. This integrated system is designed for short arrays of a few units. Larger arrays, based upon the size of the river and the water needs in the area, will use river arrays to power a larger output shore side water-making unit. The cost of desalination has dropped dramatically to around four dollars per thousand gallons or as little as $1,200 per acre-foot. Energy makes up on average 50% of the total cost of each gallon produced. Hourly water production for a two-stage Sea Water Reverse Osmosis (SWRO system) with a capacity of 35 cubic meters/day has an approximate specific energy consumption is about 2.33 kW h/m$^3$. The use of a booster pump, energy recovery turbine and an appropriate membrane, allows the specific energy consumption to be decreased by about 70% compared to less efficient design without these features. The invention has approximate finished water costs of about 0.50 to $1.00/m$^3$. By international standards, for example, in China, these values are considered economically feasible.

The invention can be modified to produce compressed air. The invention provides a compressed air network for industrial users who commonly use compressed air to power their operations. It can also be utilized for newly developed compressed air motor technology to provide clean, local power for ground and marine transport systems. In rural sites, large numbers of arrays of the invention energy modules can be seeded across rivers to provide a new generation of farmers a clean energy alternative to fuel their operations. Farmers around the country who already grow corn for ethanol and soybeans for biodiesel while leasing their land for wind farms can soon harvest the power of rivers that border their property to power their tractors and other farm equipment. The unit replaces the generator with a air compressor or in an alternative configuration use the power cartridge to power a air compressor in the stabilizer which also serves as an accumulator for the compressed air.

Arrays of the invention can be used to support all forms of agricultural operations. The arrays include a water maker pump fresh water to a grid of underground drip irrigation arrays for low rain farming areas. A compressed air unit powers a simple all-purpose air powered farm tractor and farm tools. One or more inventions provide the electrical power.

These units can be used as solid backup power for important installation like nuclear reactors that are normally sited on rivers. They can also be brought in quickly to provide zero fuel emergency power. The river power invention generators can also be used as electric motors to power the array open and closed.

In use, an array 100 of the inventions is deployed across a river site at right angles to the flow of water. Each of the invention units is connected to the unit beside it by a horizontally orientated "suspension" mooring cable 115 attached to the center point of power cartridge. The mooring cable 115 is connected to each invention module 101 at a connection point in the middle of the nacelle 121 at a depth of approximately eleven feet. The stabilizer 211 supports the weight of the energy absorber 106 and the mooring system 118 while maintaining the approximate eleven-foot depth of the unit. This keeps the propeller above the disturbed waters and rolling debris of the river bottom. Each mooring system 118 includes a high-tension cable 115, an electric power cable 202 and communications cable 203 all held together by a series of interlinked wing-shaped polymer shell 424 sections which may have a cushioned leading edge for added safety. High strength cable 115 is well proven for long term, outdoor heavy load demands through their use for suspension bridges, offshore oil drilling and ocean barge towing. The mooring cable 115 has a pressure coupling 217 in the center of the array that is designed to decouple to protect the array if an unusually high load is applied to the array. The mooring system 118 can be ballasted to add stability. Use of mooring flaps on the mooring shroud may be provided to add stability and negative lift, if needed. Mooring shell can also hold various optional tubes for water, and chemicals, control cables and aeration tubes.

A number of shoreside mooring attachment systems can be used for the various shoreline layout. Mooring for rivers with considerable seasonal variation in depth has the ends of the mooring cable attached to a roller block sliding on a vertical track, such as a standard railroad track connected to shore with various anchoring systems which provides means for up and down movement of the entire array. The arrays can also be extended part way across the river using of special modular bottom mounted A-frame to support the open end of the array. That is augmented by the use of self-mountable and extractable ultrasonic/sonic anchor comprising drill bit, a hammer mechanism which is both mountable and extractable using minimal axial load. Screw-in anchors can also be used.

The horizontal suspension mooring cable system 118 is a marked improvement upon conventional mooring systems used by other hydrokinetic companies that are based on vertical structures imbedded in the river bottom. The inventor solves the difficult and expensive problem of installing in moving water, which opens up more possible projects possible. The mooring is also used for water and pressurized air conduit as well as a bubbler and aerator. Unlike other hydrokinetic system that use vertical structures embedded in the bottom, the invention can handle much more drag load—the larger loads of slow rpm turbines, debris and collisions. This creates a safer operation. High strength tension cable well proved for the long-term heavy load demands of suspension bridges, offshore oil drilling and ocean barge towing. Now it is used to support an array of submerged turbine generators components of a novel new river power system. It is attached to both sides of the river and held at a depth of eleven feet by small streamlined low profile floats.

The cable has a deep passover of 11 feet for invention allows all commercial and private river traffic to pass through the invention arrays except for freighters. Where there are deep draft ships the arrays will use special anchoring systems to allow deep draft passage channel.

The debris diverter 251 can also be in a triangular V-shaped screen held in front of the strut 400 to protect the propeller 402 supported by a cable running from the power cartridge 392 to the bow of the stabilizer 211. Another configuration places the generators 394a, 394b in the hull of the stabilizer 211 rather than the power cartridge 392. This unit includes two opposing 25 kW generators 394a, 394b driven by a vertical driveshaft ending in the power cartridge 392. This configuration applies more weight over the propeller 402 and makes the generator 394 more easily accessible. The balance of the stabilizer 211 is controlled by the internal buoyancy tanks, flaps, propangle, air pressure control, rotation and resistance. The stabilizer 211 can also serve as a pressure accumulator for the compressed air version. The sleek and low profile design of the stabilizer 211 reduces windage. In the bottom mounted version the top of the stabilizer 211 is flat and has vertical studs for improved mooring. For the flip up version the strut 400 can be pulled up into a deep groove molded down the center of the stabilizer 211 or the strut 400 can be pulled up along either side.

The invention is the right shape to be bullet proof for the high security military applications and key elements are below the surface. Security is a plug in option. A security system is built in so the entire system locks together and electric security will signal through the electric power current of a security or maintenance problem.

The invention is a flexible system. If the propeller 402 strikes large dense debris it can flex and gives reducing chances of fouling as well as reducing the initial loads on the blades and structure. Also if there is fouling the entire absorber 106 can be flipped up to repair. Also churning up the bottom sediments with a bottom mounted turbine has the potential of injecting covered up toxic materials long covered up on the bottom and mixing them into the river water. In high debris rivers debris deflectors 351 can be added at bow or further back. The strut/turbine assemblies of the entire array are designed to flip up for service and annual maintenance. In dense debris sites the strut 400 can be lengthened submerging the prop further below the surface debris field. Bow and strut debris deflectors can be added as needed. In terms of debris, for larger projects, the blade design is tuned to average speed, sediment and debris content. The recent failure of the Verdant hydro-kinetic system in New York underlines why the invention is not to be placed on the bottom where there is a lot of moving debris—55 gal drums, loose cable, industrial waste, and waterlogged debris sliding along the bottom. Also a fixed foundation does not allow any 3-axis flexibility when debris strikes it or the rotating turbines. Slow RPM high drag propellers 402 with shock absorbing edges are much more survivable than Verdant's turbines. Debris that is on the bottom of the river is much heavier and therefore more damaging than debris on the surface just for the fact that it cannot float. Industrial waste such as 55 gallon drums, metal cables as well as waterlogged trees, lumber and so on are pushed along the bottom by the currents needed for the turbines.

The ability to camouflage the device is very important to reduce or in many cases eliminate its intrusion upon local life. Many shapes can be added to the device using add on mouldings. Plastic layers using photo-realistic computer printing can be applied. The system can be applied to each river's environment, culture and commercial activities as seamlessly and invisibly as possible thus opening up vast untapped amounts of hydropower worldwide. In industrialized and populated river sites, the invention is designed to blend in as visually acceptable structures that offer dual-use functions such as docks, small boat marinas, wharfs, bridges, and floating buildings such as offices, restaurants and schools that produce power from river currents below the surface and solar or wind power on the roof. In rural sites, vast numbers of arrays of the invention energy modules can be seeded across rivers. Farmers around the country who already grow corn for ethanol and soybeans for biodiesel and lease their land for wind farms can soon harvest the power of rivers that border their property. These units can be added to floating self-contained and self powered small factories units ready to go with pre-installed equipment, software, etc., which can be towed upstream and placed in remote, difficult to reach areas.

These units can add to their backup power with solar power and micro-wind power systems integrated into their roofs.

Support systems for the service of the arrays of the invention use connected technology-watches, Iphone type systems to update a small group of local support people 2417 to the invention's condition. It includes specially designed service vessels.

Installation into rivers is easy. For example, a 25-100 foot trench is dug on both sides of river and cable laid in. The mooring brackets are installed on the shoreline. The cable is attached to the sliding block mooring module. The invention in collapsed form with strut flipped up and blades removed, can be shipped to site by truck or towed up river to site. The inventions are unloaded from truck and checked. A line from a point on the shoreline above the buried mooring anchor is attached to the front of each unit as they are led out into the river with their struts flipped up. The energy absorbers are connected to the mooring cables. Then the lead line is pulled across river and winched in or pulled by truck. Once it is attached to the sliding connection on the other riverbank and properly tightened the turbines are flipped down and the lead line is removed and the array is in operation. Then the units are checked and loaded into the water and moored. Then they are connected together by the mooring system and pulled across to other shore and tightened. They are then checked and hooked up to a grid. In an alternative configuration each invention could slide out on the cable and once in position be tightened and hooked up.

The use of the arrays can distribute hundreds of sensors throughout heavily polluted rivers, such as the Hudson River. These sensors attached to working inventions can be attached to the struts at various depths. Data can be sent ashore via mooring cable or wirelessly. This is a huge advancement in sensor networks. It allows a rapid response to changing conditions, such as sewage release or a drop in oxygen that could kill fish. This will safeguard the animal and plant life in river. It will continuously monitor flow rate and river conditions to warn of upcoming flooding.

The use of arrays of the inventions will help speed the rise of the super smart energy network. Replacing the grids architecture of power plants, transmissions towers, substations, poles and wires has changed little since first deployed in the late 1800s. The number of electrical outages is increasing. The Electric Power Research Institute (EPRI) estimates annual economic losses of 100 billion in the US due to poor reliability of the grid. A smart energy network is broadly defined as an integrated, self-healing, electronically controlled electricity supply system in contrast to today's 1950s mechanical-driven electric grid. The smart energy network will depart from previous generations by distributing control and electricity generation throughout the grid, rather than orienting it around central power plants. A smart grid will use smart meters, which facilitate two way communications over the grid, enabling managers to monitor the status of the network and price electricity according to demand. Micro-grids will be formed by tying two or more distributed generation sources including the invention together into one feeder line that links to the primary electric grid at one point. A microgrid can sell excess power back to the primary utility grid and can also protect itself from the grid during a disturbance. The electrical losses due to interconnection within a bottom mounted hydrokinetic tidal power farm are estimated to be 2% at production and 1% for river power farms. The invention has fewer losses due to its straight through electrical grid design. Large-scale storage can be used. Traditionally utilities try to keep at least 15% of their generation capacity as a reserve safety margin to meet peak demand periods, which occur, less than 1% of the time.

Each invention can be slightly differently shaped using a set of interconnecting modular shape foam sections that can offer hundreds of variations of shapes such as small islands so that the entire array will look more natural. These small islands will create a safe wild bird sanctuary. The invention can be part of greenbuild movement.

To make a major impact on the global energy mix, hundreds of thousands of these units must be built every year and placed all over the world. That is why the invention was designed to be fabricated using automotive manufacturing techniques. But these units can be further simplified to be produced in more limited manufacturing environments.

The invention is highly scalable as shown in Table 1.

TABLE 1

| Model | Length | Width | Depth | Area | Output | Weight |
|---|---|---|---|---|---|---|
| RS-100 | 80 | 80 | 82 | 7850 | 1 MW | |
| RS-50 | 20 | 20 | 22 | 314 | 50 kW | 5,000 |
| RS-40 | 20 | 17 | 19 | 227 | 40 kW | 4,000 |
| RS-30 | 15 | 14 | 16 | 154 | 30 kW | 3,000 |
| RS-20 | 10 | 11 | 13 | 95 | 20 kW | 1,800 |
| RS-10 | 5 | 8 | 10 | 50 | 10 kW | 750 |

Figure 1:
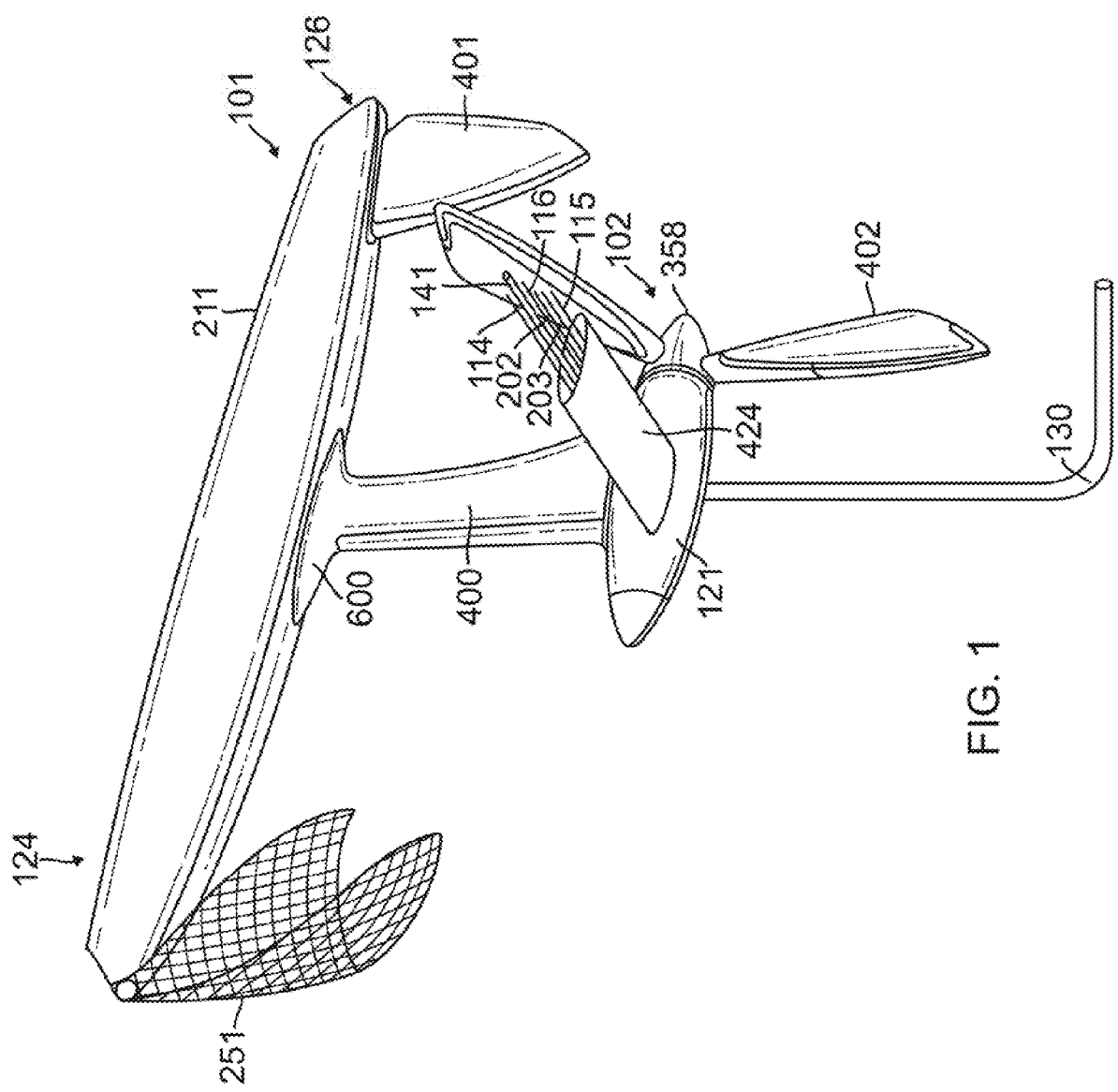
FIG. 1 is a perspective view of an embodiment of the energy module.

Referring to FIG. 1, the energy module 101 comprises an energy absorber 106 and a mooring system 118 connected to the energy absorber 106. The energy absorber 106 converts kinetic energy from river currents into compressed air, which is subsequently converted into electricity. The mooring system 118 stabilizes the energy absorber 106 in the river to improve the efficiency with which the energy absorber 106 converts the river current into compressed air.

Figure 2:
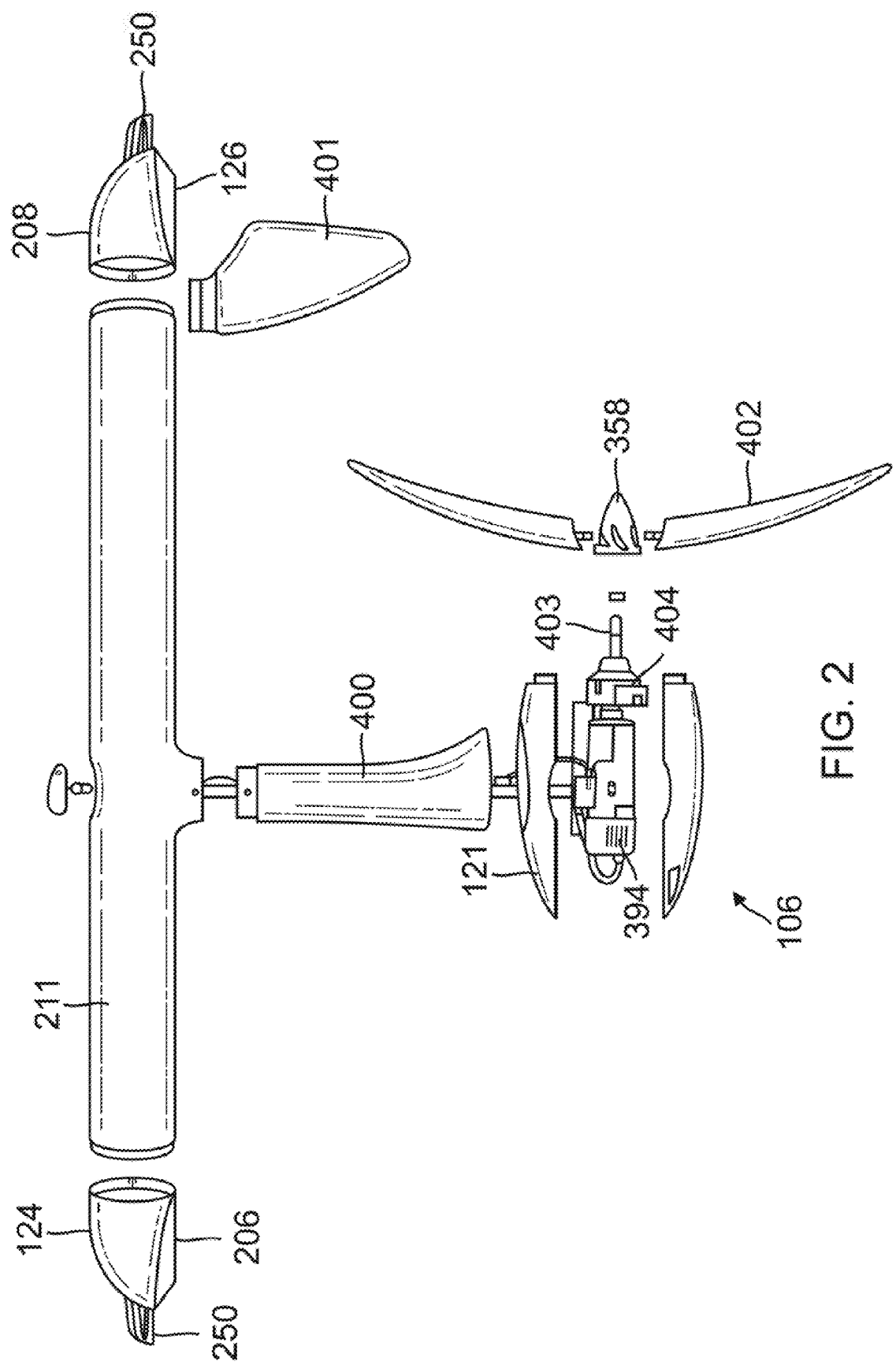
FIG. 2 is an exploded side view of an embodiment of the energy module.

The energy absorber 106 comprises a nacelle 121 and a propeller 402 having a plurality of blades attached to the nacelle 121 at a hub 358 to drive an air compressor 408, housed inside the nacelle 121, to compress air. As shown in FIG. 2, the propeller 402 and hub 358 are connected to a driveshaft 403 to turn a gearbox 404. The gearbox 404 drives the air compressor 408 to compress air. The compressed air is transferred out of the nacelle 121 through a high pressure hose 201 to an air turbine generator or electric generator plant 112 on shore for conversion into electricity. The compressed air may be transferred from the high pressure hose 201 to the air turbine generator 112 via an underwater pressure line 114.

Figure 3:
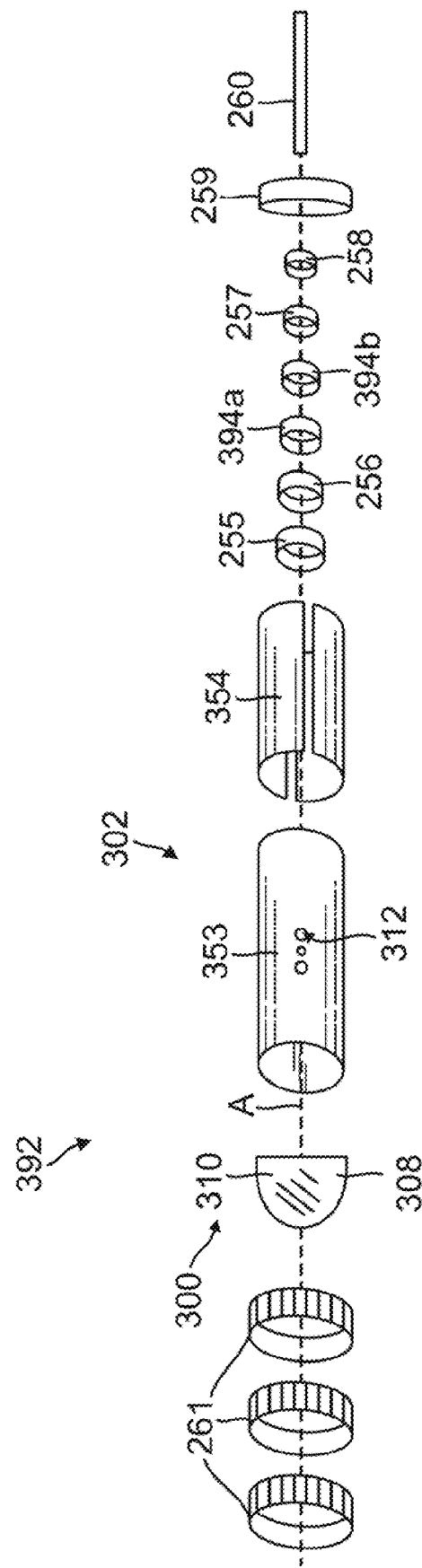
FIG. 3 is an exploded side view of an embodiment of the power cartridge.
Figures 5A, 5B:
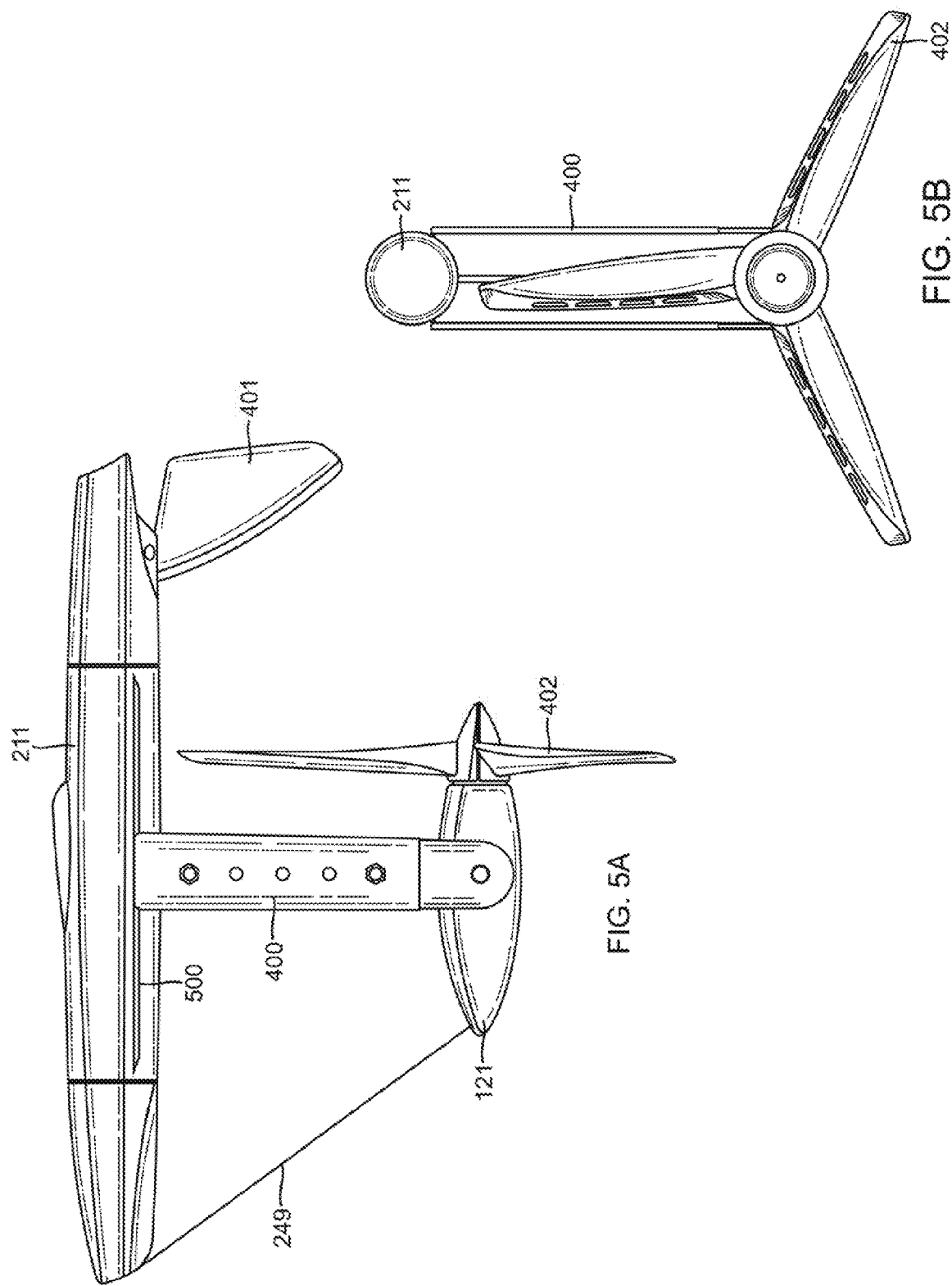
FIG. 5A is a side view of an embodiment of the energy module.
FIG. 5B is a front view of an embodiment of the energy module.

In some embodiments, the nacelle 121 may further comprise a power cartridge 392, as shown in FIG. 3. The power cartridge 392 drives the electrical components inside the nacelle 121. The power cartridge 392 may be a steel, cylindrical tube 353 having a longitudinal axis A that fits inside the nacelle 121. The cylindrical tube 353 comprises a first end 300; a second end 302; and a ceramic sleeve 354 split longitudinally in half comprising a painted on wiring to connect to the electrical line in between the first and second ends 300, 302. The first end 300 may have a rounded nose 310, which may comprise a collision foam section 308. Other suitable collision absorbing material includes cork, plastic, rubber, and the like. The second end 302 attaches to the hub 358 and propeller 402.

A small hole 312 is fabricated on either side of the power cartridge 392 where a flat copper pin is insulated from the copper by a ring of plastic. The inner electrical sleeve conducts its power through this contact to the electrical line of the mooring system 118 on the outside. This allows the non-conductive ceramic sleeve 354 to simply be slid into place without any connectors as well as eliminating any through hull fittings. The ceramic liner 354 has vent holes and a ribbed configuration along the outer surface to facilitate air movement and cooling from the surrounding metal casing. Therefore, the ceramic sleeve supports and cools the inner components.

Wiring painted on the inside and outside wall of the ceramic sleeve protects against moisture and shock. Built in circuit breaker protect installers against accidental short circuits during maintenance or installation. The liner can be changed to allow locally produced parts.

All electricals are inside the power cartridge 392 including power processor and automatic circuit breaker, and the wiring harness painted on the inserted sleeve 354. As shown in FIG. 3, the power cartridge 392 further comprises from front to back: a collision foam section 308, an electrical converter module 255, a dual micro air pump 256 (create positive pressure in the unit to prevent any leakage of moisture into cartridge), two identical 25 kW permanent magnet generators 394a, 394b stacked in line to provide a total of 50 kW of power, a planetary gearbox 257, two main bearings 258, an end cap 259, and a driveshaft 260 attached to the hub 358. Two generators 394a and 394b reduce cost because two smaller generators are cheaper then one large one. In addition, if one fails, the other serves as a backup. Also, it allows a small frontal area. Furthermore, it allows the same power cartridge 392 to be used for the tidal power version comprising front and back counter-rotating propellers driving each generator 394a and 394b.

The generators and rotors can be any size as long as they are matched to each other and to the water velocity. The magnitude of voltage generated is fixed by the speed of the rotors and the number of magnetic lines per pole. The more poles there are, the more lines of magnetic force. This also means that the more poles there are, the slower the revolutions required to produce the same amount of power at the same frequency.

Conventional wind-powered machines have compact generators that have 4 or 6 poles and use a rotor-gearbox generator drive train. Some wind machines, use large diameter ring generators with many poles (more than 80) and no gearbox. Rather than using a 4 or 6 pole generator, an adaptation of the Lagerway ring generator can be used to reduce the gearbox requirements.

Alternatively, a new type of generator (ExRO Technologies) which runs efficiently over a wider range of conditions than conventional generators do can be used, particularly for the tidal power applications. In this generator the individual coils can be turned on and off with electronic switches. At low wind speeds, only a few of the coils will switch on—just enough to efficiently harvest the small amount of energy in low-speed wind. (If more coils were active, they would provide more resistance to the revolving magnets.) At higher current speeds, more coils will turn on to convert more energy into electricity. The switches can be thrown quickly to adapt to fast-changing tidal current speeds which can improve overall output up to 50%.

An alternate configuration uses molded polymer magnet technology. Alternate configuration uses an air pressure washer to keep the energy absorber aligned side to side. Another configuration is to use two identical plug in units comprising a propeller and generator unit plugged into cartridge support structure, one from the back and one from the front. The propellers would be configured to rotate in opposing directions. Plugging in a dummy nose cartridge in front and generator/turbine in rear could easily shift this to a single turbine system. The cast end cap 259 overlaps the Power Cartridge and screws on to seal and support it.

An alternative configuration places the electrical converter module 255 and dual air pumps 256 between the two main bearings with the drive shaft 260 running through them with no contact. Alternatively, in highly variable river currents, the power cartridge 392 may use a continuously variable transmission ("CVT"), which allows for smooth and infinitely variable gearing making the CVT a natural fit for a power generator with unsteady input like a wind turbine. Another alternative is the use of a gearless friction drive.

Another alternative generator is the so-called three-phase asynchronous (cage wound) generator, also called an induction generator to generate alternating current. One reason for choosing this type of generator is that it is very reliable and tends to be comparatively inexpensive. The generator also has some mechanical properties, which are useful, such as generator "slip," and certain overload capability.

The power cartridge casing 353 is fabricated out of a metal to dissipate heat. On the outer surface are attachments for a mooring cable 115 and an electrical line 202. There are several ribbed anode rings 261 that fit around the outside of the power cartridge 392 that prevent corrosion and act as heat exchangers to dissipate heat from the internal gearbox and generators into the passing river water.

All major stresses: drag of the propeller, rotational load, mooring loads, stabilizer support, and the like, are taken at one point-at the nacelle 121 between the two main bearings which supports the plug-in power cartridge 392.

In some embodiments, a noise absorption liner may be built into the power cartridge 392 to isolate noise and vibration caused by the operation of invention.

The balance of the electrical components system situated with the generator comprises electricity conditioning and/or controlling device such as invertor or regulator and protection (surge protector for lightning).

The propeller 402 is basically a larger and slower revolution per minute ("RPM") version of traditional turbines. The propeller 402 is optimized for approximately four or more mph velocity of the major slow and wide rivers of the continental United States. The propeller 402 is designed to be cheap, strong, safe and highly adaptable to each river site.

To increase the RPMs and reduce the torque to manageable levels, the power from the hubs is transferred in either three or four stages. The first stage consists of a strongly built planetary gear system. A second planetary gear system is either attached to a third planetary gear system or to helical gears, depending on the revolutions and torque of the shaft coming from the first stage. The last stage consists of helical gears and, depending on the sizing of the gears in the first two or three stages, a fourth stage of helical gears might be required to increase the shaft speeds to the 1,200 to 1,800 RPMs required by the generators producing the 60 Hz current used in the U.S. In some embodiments, the propeller blades 352 are adjustable to change the angle of the surface of the blades 352 relative to the current flow. The propeller blades 352 may automatically reduce angle to the ongoing river current when stressed. For example, as speed of current increases the angle of the propeller blade 352 may decrease keeping the RPM relatively constant.

The propeller 402 may be constructed of cheap flexible composite, molded plastic, metal or wood. The propeller shaft can be sealed from water leakage by filling the generator/alternator body with non-toxic naturally based hydraulic fluid to eliminate corrosion and to equalize pressure changes caused by ambient temperatures. This would operate to depths of 30 feet.

To make it safe in rivers with aquaculture, the propeller 402 may be designed to reduce the impact of the unit by reducing RPM and improving the crushability of the leading edge 263. For example, as shown in FIGS. 7A-7E, in some embodiments, bumps 262 of various sizes and shapes may be applied or molded onto the leading edge 263 to reduce impact and cavitation. These bumps 262 may also reduce turbulence induced noise, increase propeller 402 stability, and enable the propeller 402 to capture more energy from the water. The propeller 402 has many more variations.

In some embodiments, the propeller 402 may have a 20-foot diameter, which is also made of composite or wood, with rubber bumper tips 262 on the blades. In terms of debris, for larger projects, the blade design is tuned to average speed, sediment and debris content. The propeller blade is 2 feet below the surface of the water to avoid entanglement with most debris, it is slow RPM, curved and designed to shed debris. The use of riblets and wing tip fins and the bending of the blade at the tip slightly into the direction of the current can increase energy capture capabilities. Other variations include: lower aspect blades, lower attack angles which reduce stress if blades strike debris and lower the chances of fouling. In some embodiments, the core section may be thicker to create lift and strength.

Figure 10:
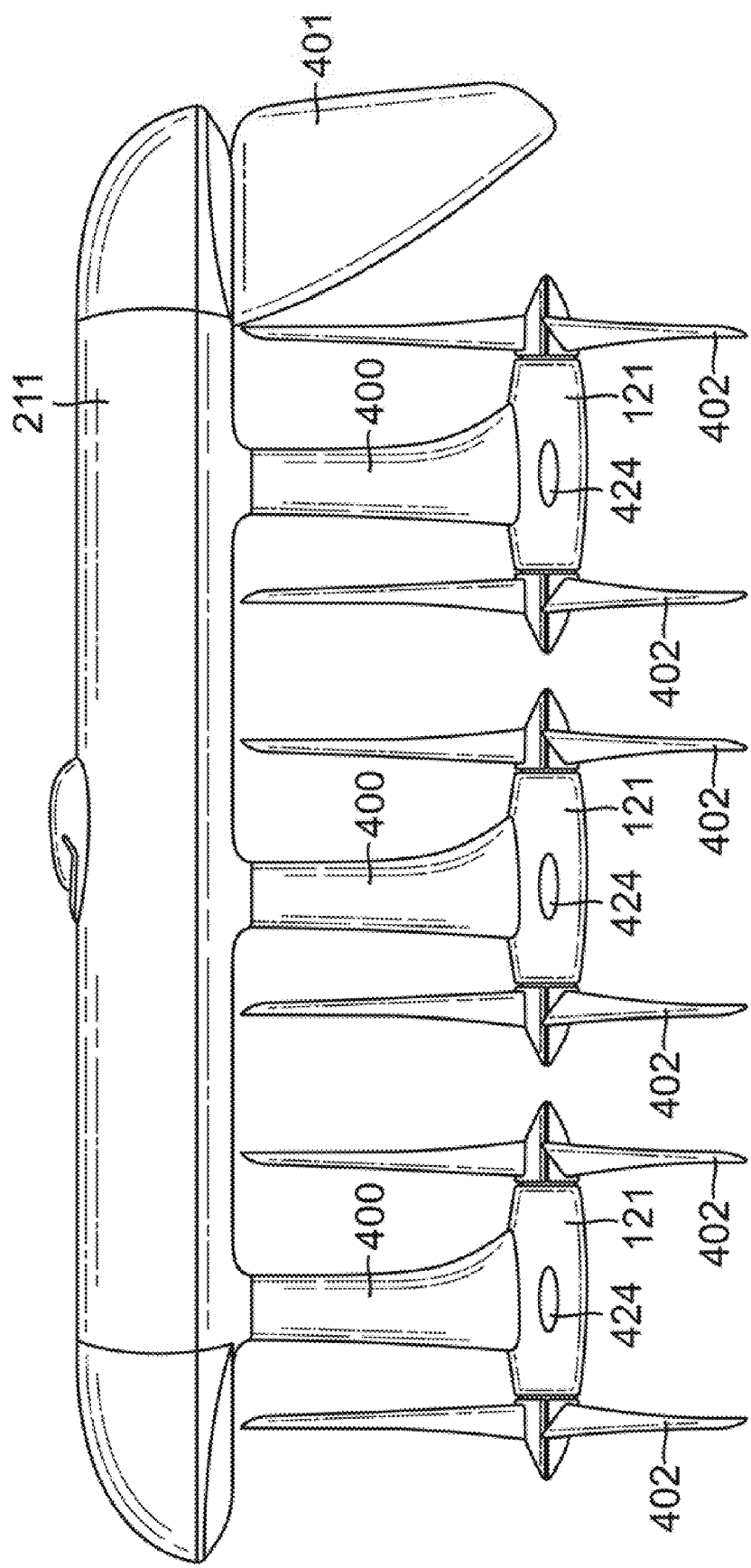
FIG. 10 is another embodiment of the energy module.

An alternative propeller 402 design is to have two identical three bladed propellers on two adjacent hubs in line one after the other as shown in FIG. 10. In slow moving water the two propellers may be rotated or offset so as to effectively form a 6-sided propeller. When the river increases speed they can rotate back or re-align so as to form a 3 bladed propeller.

In some embodiments, vortex generators and stall fences may be attached to the leading edge of the propellers. Studies have shown that stall typically occurring at a 12-degree angle of attack (the angle between the flow of water and the face of the blade) is delayed until the angle reaches approximately 18 degrees when utilizing vortex generators and stall fences. In these tests, drag was reduced by approximately 32 percent and lift improved by approximately 8 percent. This is estimated to delay stall and doubles the performance of the energy absorbers 106 allowing the energy absorbers 106 to capture more energy out of lower-speed currents. The modified energy absorbers 106 generate the same amount of power at 4 knots that conventional turbines generate at 6 knots. The bumps 262 effectively channel the flow of water across the blades 392 and create swirling vortices that enhance lift.

When the angle of attack of the blade becomes too steep (i.e., approaches 90 degrees relative to the current flow), the result is a stall. There is not enough water flowing over the top surface 700 of the blade. This causes a combination of increased drag and lost lift. The angle of attack of a bumpered blade can be up to 40 percent steeper than that of a smooth blade before stall occurs because the bumps change the distribution of pressure on the blades so that some parts of the blade stall before others. Since different parts of the blade stall at different angles of attack, abrupt stalling is easier to avoid. This is particularly important for tidal turbines which must maintain themselves through a constantly increasing and decreasing range of current speeds. These blades 392 are also more stable, quiet, and durable than conventional blades.

Further alternative configurations include: counter-rotating propellers separated by several feet, providing a debris-free format, controlling the shape of the leading edge of the blade with air, use of the three-bladed propeller which minimizes the number of leading edges while maintaining balance, reducing RPM to approximately 8 to approximately 16 RPM, and using a thick, blunt, rounded leading edge. Turbine safety is maximized by using low RPM, more surface area, lower aspect, lower impact speeds, and inflated leading edge.

Figure 8A:
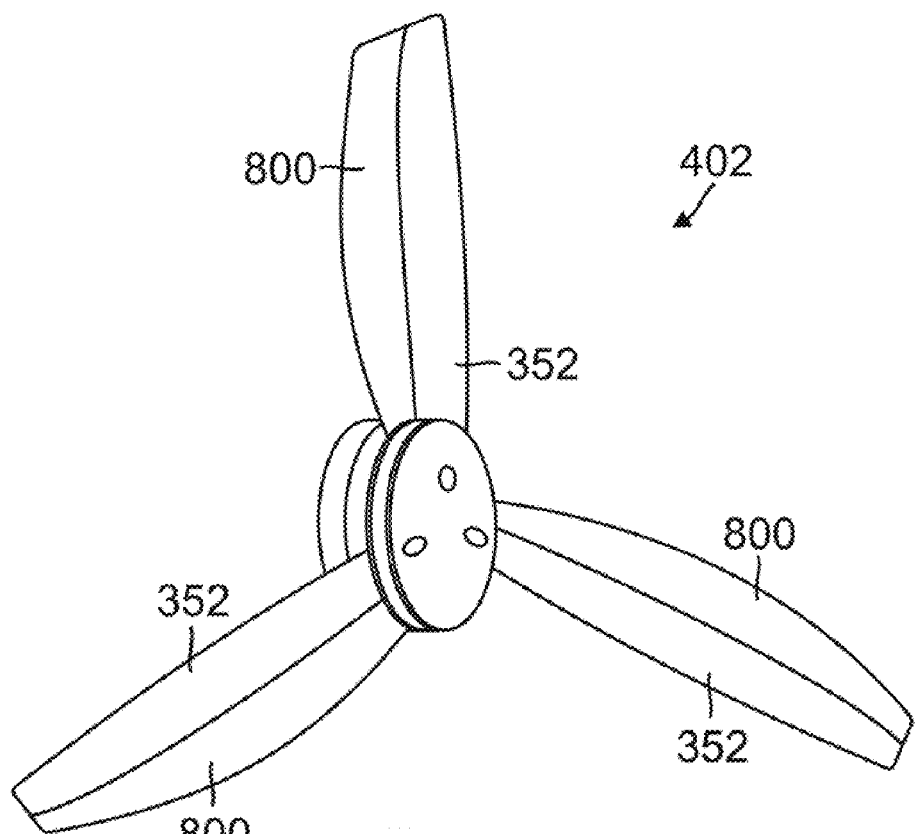
FIG. 8A is another embodiment of a propeller.
Figure 8B:
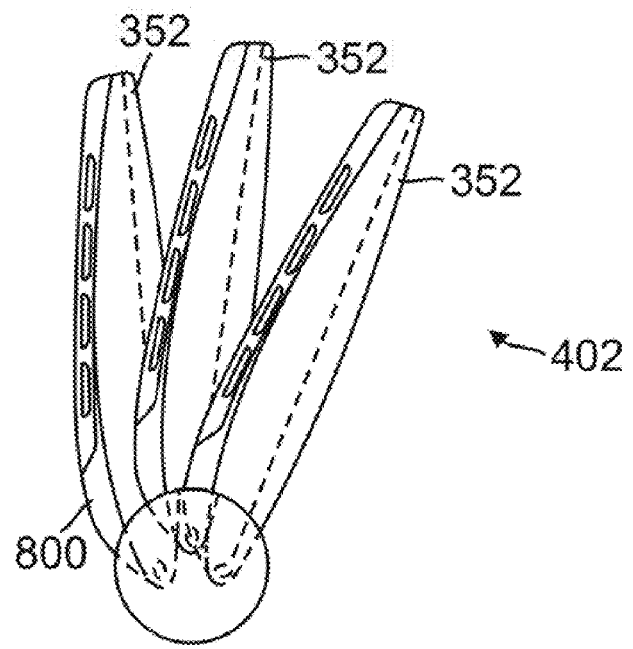
FIG. 8B is a front view of the propeller shown in FIG. 8A with the blades retracted.

Many other alternative configurations of the propeller 402 have been contemplated. For example some embodiments may comprise a movable layer 800 over leading edge with air pressure behind it. The use of centerboard type propellers fit inside each other and slides out for more surface area using air pressure. In some embodiments as shown in FIGS. 8A and 8B, propellers 402 may be hingedly connected to the hub 358 using an integrated gear system so that when the load is too high pneumatic pressure powers a pump to drive propellers together in a folded configuration.

The blades may have a variety of designs, from massive low aspect thick blade to long half circle blades. Multiple blades may be placed in series with the blades in line to effectively form a three bladed propeller or offset to effectively form a 6 bladed propeller. Counter rotating propellers may be used to reduce frontal area, stabilize rotational forces, cut structural weight cost, and reduce the need for rotational speed. Each blade may be pinned to the hub so it can flex backwards. If debris slows or stops the rotation of the propellers the increased load on the propeller will either bend it back or rotate it back to shed the debris or load. Then when the load declines the blades rotates again back in their original angle. Air or water pressure may be utilized to make the blades thicker or thinner, by using a bladder inside two shells. The end of each blade may curve into the current to reduce flow off end. The propellers may be cantilevered. The propellers may have spiral blade design as shown in FIG. 7F. Wing tips may be placed on the edges of each blade to eliminate vortices. Hammerhead shaped attachment may be affixed to the blades. Propellers may be slow speed propellers or high-speed propellers.

In some embodiments, a lightweight piezoelectric actuated bending flight control surfaces can be used to improve performance of props through their speed ranges.

Alternative propellers 402 resemble a brush composed of dozens of flexible micro width blades attached to a central hub. The "brush prop" can also use these micro blades at various angles to the hub.

In some embodiments, turbine blades are composed of a steel substructure with replaceable streamlined polyskin stretching over them, and a high impact rubberized leading edge.

Figure 16:
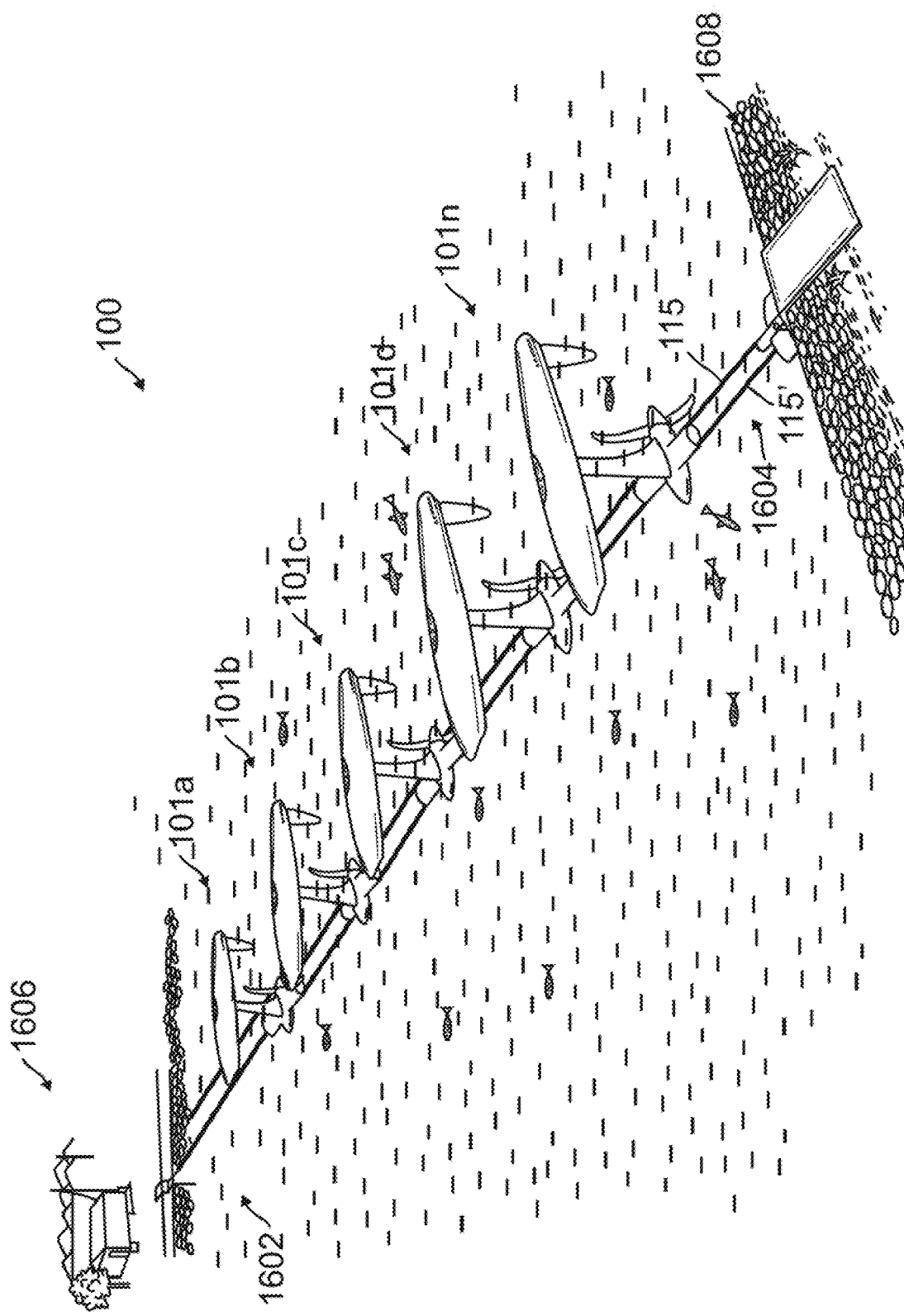
FIG. 16 is a perspective view of an array of energy modules in a river.

The mooring system 118 comprises a wing-shaped polymer shell 424 attached to the nacelle 121. Housed inside the wing-shaped polymer shell 424 is a "suspension" mooring cable 115. The mooring cable 115 attaches each energy module 101 to an adjacent module to create an array 100 of energy modules deployed across a river site at right angles to the flow of water as shown in FIG. 16 and FIG. 18. The mooring cable is stretched across the river site and then placed under high tension. Therefore, the mooring cable 115 may be a high-tension cable. High-tension cables are well proven for long term, outdoor heavy load demands, such as use in suspension bridges, offshore oil drilling, and ocean barge towing.

In general, the mooring cable 115 may be a horizontally orientated cable attached to the center point of the power cartridge 392 and/or nacelle 121, extending lengthwise through the wing-shaped polymer shell 424 and connecting the adjacent energy module 101 through its wing-shaped polymer shell 424. This configuration helps anchor the energy module 101 in a fore and aft and a side-to-side position to provide stability, and to negate a rotational force on the energy module. In some embodiments, the mooring cable 115 is connected to each module 101 at a connection point in the middle of the nacelle 121 at a depth of approximately eleven feet to allow all commercial and private river traffic to pass over the module. Where there are deep draft ships, the arrays 100 can use special anchoring systems to allow deep draft passage channel.

The horizontal suspension mooring cable system 118 is a marked improvement upon conventional mooring systems used by other hydrokinetic companies that are based on vertical structures imbedded in the river bottom. The difficult and expensive problem of installing in moving water has been overcome, which opens up more possible projects. The mooring system 118 can also be used for other purposes, such as a water and pressurized air conduit as well as a bubbler and aerator. Unlike other hydrokinetic systems that use vertical structures embedded in the bottom, the invention can handle much more drag load, such as those caused by slow RPM propellers, debris, and collisions. This creates a safer operation.

The mooring system 118 may further comprise the high pressure hose 201, an electric power cable 202 or electrical line, and communications cable 203 all held together by the series of interlinked wing-shaped polymer shell sections which may have a cushioned leading edge for added safety. The high pressure hose 201 housed inside the wing-shaped polymer shell 424 transfers the compressed air on shore for conversion into electricity. The electrical line 202 housed inside the wing-shaped polymer shell provides power to the energy module 101.

In some embodiments, the mooring cables 115 in between adjacent energy modules are connected via a pressure coupler 217. In some embodiments, the center two energy modules of an array of energy modules 100 are connected together via the pressure coupler 217. The pressure coupler 217 is designed to decouple and release two adjacent energy modules to protect the array if a predetermined load is applied to the array. A predetermined load may be any load that exceeds the force applied by the river current. Such loads can be created by large floating objects such as logs, boats, ships, and the like.

The wing-shaped polymer shell 424 attached to the nacelle 121 is designed to utilize the force of a passing current to create a downward force and thereby reduce any upward motion in the energy module 101. The mooring system 118 can be ballasted to add stability. Use of mooring flaps on the mooring shroud can add stability and negative lift, if needed. Wing shaped polymer shell 424, a nacelle 121, or stabilizer 211 can also hold various optional tubes 130 for water, and chemicals, control cables and aeration tubes.

As shown in FIGS. 17A-17E, a number of shoreside mooring attachment systems can be used for the various shoreline layout. Mooring attachment systems 1700 for rivers with considerable seasonal variation in depth has the ends of the mooring cable 115 attached to a vertical track 1702, which allows the entire array 100 to move up and down. The arrays 100 can also be extended part way across the river using a special modular bottom mounted A-frame 1800 to support the open end of the array 100 that is augmented by the use of self-mountable and extractable ultrasonic/sonic anchor comprising drill bit and a hammer mechanism, which is both mountable and extractable using minimal axial load. Screw-in anchors can also be used.

In some embodiments, the energy module may further comprise a strut 400 attached to the nacelle 121 and a stabilizer 211 to provide support for the energy absorber 101. The stabilizer 211 supports the weight of the energy absorber 101 and the mooring system 118 while maintaining the approximate eleven-foot depth of the energy absorber 101. This keeps the energy absorber 101 above the disturbed waters and rolling debris of the river bottom.

The stabilizer 211 comprises a bow end 124 and a stern end 126 opposite the bow end 124. The bow end 124 may comprise a nose filled with a collision absorbing material 254, such as a foam material. The stern end 221 may comprise a tail also filled with foam material 254 or any other shock-absorbing material. Other suitable material include cork, plastic, rubber, and the like.

In some embodiments, the stabilizer 211 may be a tube shaped structure approximately 20 feet in length and approximately 3 feet in diameter composed of thinwall steel, aluminum, or composite material. The energy module 101 may use various coatings which are bio-neutral. It can also have no coating on steel. Alternatively, the stabilizer 211 may be made thicker and use anode rings 261 only. Above the waterline, the stabilizer 211 can be painted.

A longer chassis or tube version is used for river and tidal sites that have disturbed water and river and tidal site that have large variation of current speed as well as high current speed sites. The shape of the stabilizer 211 can be of a shape to mimic the natural surroundings so as to be camouflaged in various ways. Preferably, the design maximizes reserve buoyancy on both ends.

The stabilizer 211 has internal reinforcement bulkheads 213 to support the strut 400 attachment. These bulkheads 213 also serve to form compartments for a variety of modular devices 140 or plug-in mission packages that can be slid in through hatches in the deck or top surface, for various applications, such as water purification, desalinization, hydrogen production, air compression, telecommunications, data storage, and the like.

In some embodiments, the bow 218 of the stabilizer 211 may have a streamlined negative lift shaped soft-skinned nose section 215 of thinwall steel, filled with dense closed cell foam 254 or other collision absorbing material that doubles as emergency floatation that is marine life friendly and repels debris. The collision bulkhead 213 may be positioned behind the foam. A combination handlehold, bumper, or cleat may be molded into the bow 124 and stern 126. Navigation lights 414 may also be incorporated into the stabilizer 211.

The stabilizer uses a rudder 401 to maximize the highly directional control of the stabilizer 211. A medium aspect rudder 401 is attached to the aft section 126 of the stabilizer 211. It uses the energy of the passing current to orientate the module 101 directly into the current thereby maximizing the power efficiency. The rudder 401 keeps the entire unit aimed up stream even if debris has disturbed the stabilizer 211. A second rudder may be placed at the bow 124 of the stabilizer 211. In some embodiments, the first and/or second rudders may be flip up rudders connected to the stabilizer via a hinge.

The rudder 401 could also be in the form of a long low thin keel beginning at the strut 400 and leading aft. An alternative configuration replaces the rudder altogether with a multidirectional stabilizer attached behind the turbine and short stubby stabilizer. For the tidal power version, small flaps on the rudder help flip up the strut when the tide changes direction.

In some embodiments, the generator may be placed in the stabilizer 211 and driven by a chain drive or vertical driveshaft from the nacelle which can be filled with water. An alternate configuration includes one counter-rotating propeller to turn the rotor and a second propeller to turn the stator of the same generator.

The balance of the stabilizer 211 is controlled by a variety of factors. For example, the internal buoyancy tanks, flaps, propeller angle, air pressure control, rotation, and resistance can each in any combination control the stabilizer 211.

The stabilizer 211 can also serve as a pressure accumulator for the compressed air.

The sleek and low profile design of the stabilizer 211 reduces wind resistance.

In the bottom mounted version the top of the stabilizer 211 is flat and has vertical studs for improved mooring. For the flip up version the strut 400 can be pulled up into a deep groove 500 molded down the side of the stabilizer 211 or the strut 400 can be pulled up along either side.

Figure 12A:
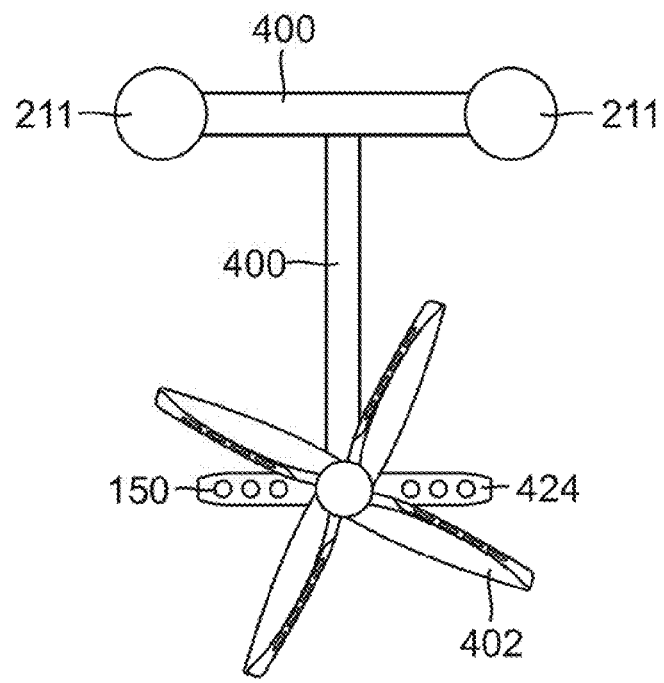
FIG. 12A is rear view of another embodiment of the energy module.
Figure 12B:
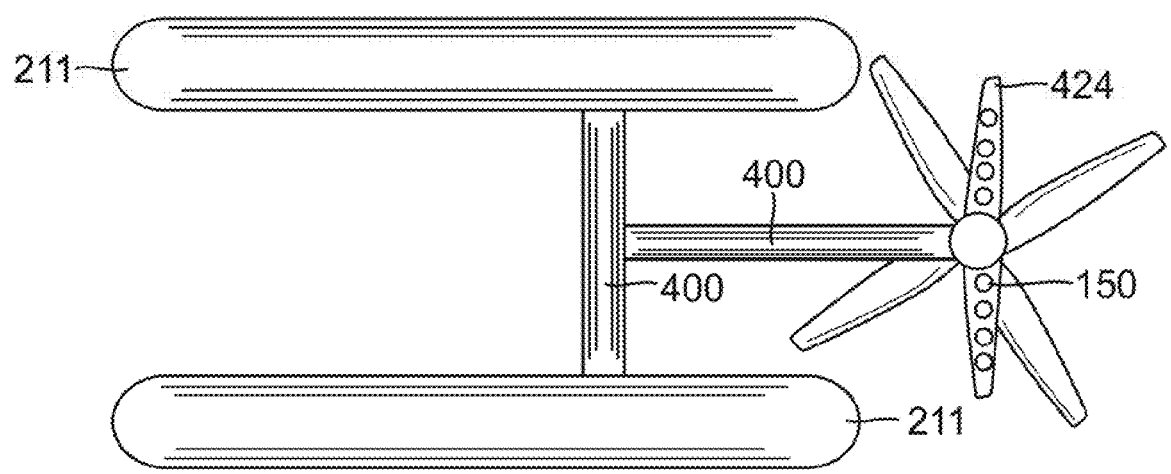
FIG. 12B is a top view of the energy module shown in FIG. 12A.

An alternate version uses side by side stabilizers 211 with strut 400 between as shown in FIGS. 12A and 12B.

In some embodiments, a debris diverter 251 may be added for rivers with dense debris fields. The debris diverter 251 can be designed to sheds debris, as well as fish. It is composed of a metal rod running straight down from the bow about two feet with a small round lip on end to divert surface debris to the side but not catch the debris. In some embodiments, the debris diverter 251 may be a single curved sheet of material attached to the bow of the stabilizer 211 at the waterline and running down to a depth of two to three feet to divert the majority of debris away from the energy absorber. The material may be made of metal, wood, plastic, or any other durable material that can be sustained in water. In some embodiments, the sheet of material may be perforated to allow the water to pass while deflecting debris. For example, the debris diverter 251 may be in a triangular V-shaped screen held in front of the strut 400 to protect the energy absorber 101, supported by a cable 115 running from the power cartridge 392 to the bow of the stabilizer 211. The debris diverter may also be any type of curved fence-like structure. A cable from the bow connected to the nacelle reduces debris as well as helps lift the structure forward.

In some embodiments, the energy module 101 may be configured to rotate in a backward direction so as to carry large debris over the module 101. For example, the strut 400 may be positioned in the front 124 as shown in FIG. 6A. When a large debris hits the front 124 of the module 101, the module 101 may rotate about the mooring cable 115 such that the stern 126 dips downward into the river. The debris is then allowed to pass over the module 101.

The energy module may further comprise a modular device 140, such as a reverse osmosis water making system to purify the river water and pump the purified river water shoreside via a water tube 141 via the mooring system 118. A direct drive reverse osmosis water making unit may have the reverse osmosis system inside the nacelle 121 with the pump driven directly by the invention's propeller 402 or through a gearbox 404. This can also be done by having the reverse osmosis unit situated inside the stabilizer 211 and driven by a vertical drive shaft from the nacelle 121. The portable version can also have this configuration to produce water or the reverse osmosis unit can be placed in the stabilizer 211 and powered by the generator in the nacelle 121.

In some embodiments, the module 101 uses the electric energy and water making capabilities of the standard river power generator and adds an electrolyzer or an electrolysis device as a modular device 140 to produce hydrogen. The stream of hydrogen gas is then 3D pumped via a tube 141 inside the mooring system 118 to a shoreside compressor. This unit can operate in both brackish and saltwater environments. The hydrogen is compressed and stored and later it is blended with diesel for fuel. The invention eliminates the high cost of fossil fuel.

In some embodiments, the stabilizer tube 211 comprises an inner chamber dimensioned to house a disassembled energy absorber, a disassembled mooring system, and the strut so as to be easily transportable.

In some embodiments, the generator is placed in the hull or stabilizer 211 rather than in the power cartridge 392. In this embodiment, the module includes two opposing 25 kW generators driven by a vertical driveshaft ending in the power cartridge. This configuration applies more weight over the turbine and makes the generator more easily accessible.

The strut 400 attaches to the stabilizer 211 and projects down into the water to support the energy absorber 101. Thus, the strut 400 may be connected to the stabilizer 211 at the center, the side, the front, or the rear. In some embodiments, the strut 400 may be adjustable. Air or water pressure or cable and winch system or a worm gear turns cogs on a round edge of strut to rotate it to change length and angle. For example, the strut 400 may be designed to flip up to bring the energy absorber 101 out of the water for service and/or maintenance. Flip up versions use short hollow keels near the bottom of the stabilizer 211 for the strut 400 to hinge from. The strut 400 can flip up automatically on computer feedback based on river debris saturation.

In some embodiments, when the device requires servicing, the rear 126 and middle ballast tanks are pumped dry leaving the full bow 124 ballast tank to act as a counterweight for the shifting of the center of mass of the strut 400 as it is rotated back and out of the water for service.

In some embodiments, the length of the strut 400 may be adjustable. In dense debris sites the strut 400 can be lengthened, thereby submerging the propeller 402 further below the surface debris field. The strut 400 can automatically compensate for the small changes in river depth by lengthening and shortening while the shoreside mooring slider attachment compensates for large depth changes. Another version can be variable length struts 400 using a telescoping tube in three sections. Additional deflectors at the bow 124 and strut 400 can be added as needed.

As the speed of the current increases, the angle of the strut 400 can be minutely or grossly adjusted to increase or decrease lift caused by increased propeller drag.

In an alternative design, a double strut system may be connected to both sides of stabilizer 211 and nacelle 121 wherein the first and second struts are positioned on opposite sides of the stabilizer tube with the stabilizer tube in between the first and second struts. The strut 400 can be mounted in the center of the hull, on either side or in a small keel below.

Bumps 262 can be added to the leading edge of the strut 400 like those on the leading edge of whales to protect aquaculture and reduce the chances of cavitation. The bottom of the strut 400 is connected strongly to the nacelle 121 which is open ended front and back and supports the plug-in power cartridge 392. A nacelle 121 is attached to main stress extension members of strut 400. This facilitates a quick replacement of mechanism when the strut 400 is flipped up as well as easier breakdown of components for service/repair and for manufacturing.

The strut 400 can be filled with water while the stabilizer and the power cartridge remain sealed.

In some embodiments, the strut is attached to the stabilizer tube 211 in a molded groove 500 so as to slideably adjust the strut in a fore or aft direction.

Various embodiments have been contemplated to improve the efficiency, productivity, and versatility of the energy absorber 101.

Figure 9:
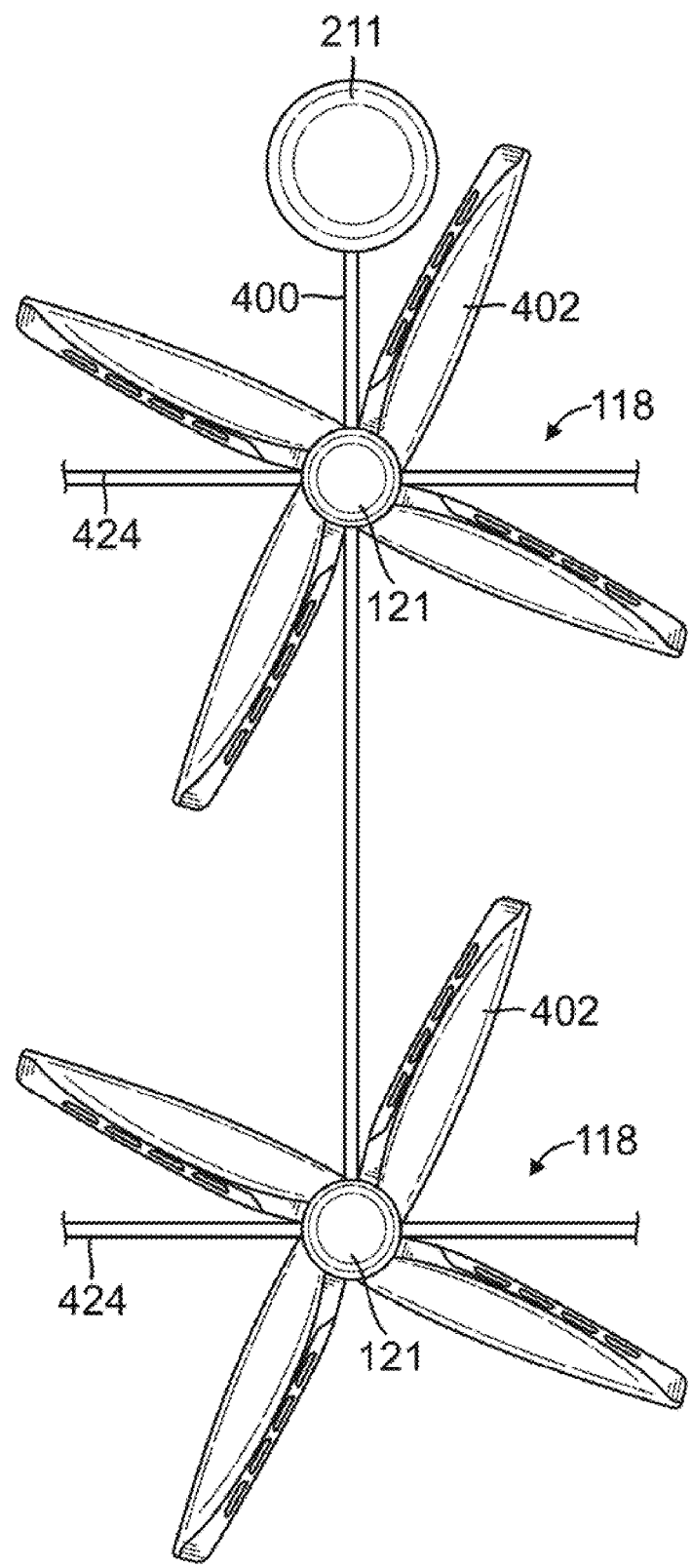
FIG. 9 is a front view of another embodiment of the energy module.

For example, the energy module 101 may further comprise a second energy absorber as shown in FIGS. 9 and 10. The second energy absorber may be attached below the first energy absorber via a second strut. In some embodiments, the second energy absorber is attached to the stabilizer tube via a second strut adjacent to the energy absorber, in parallel or in series.

Figure 11:
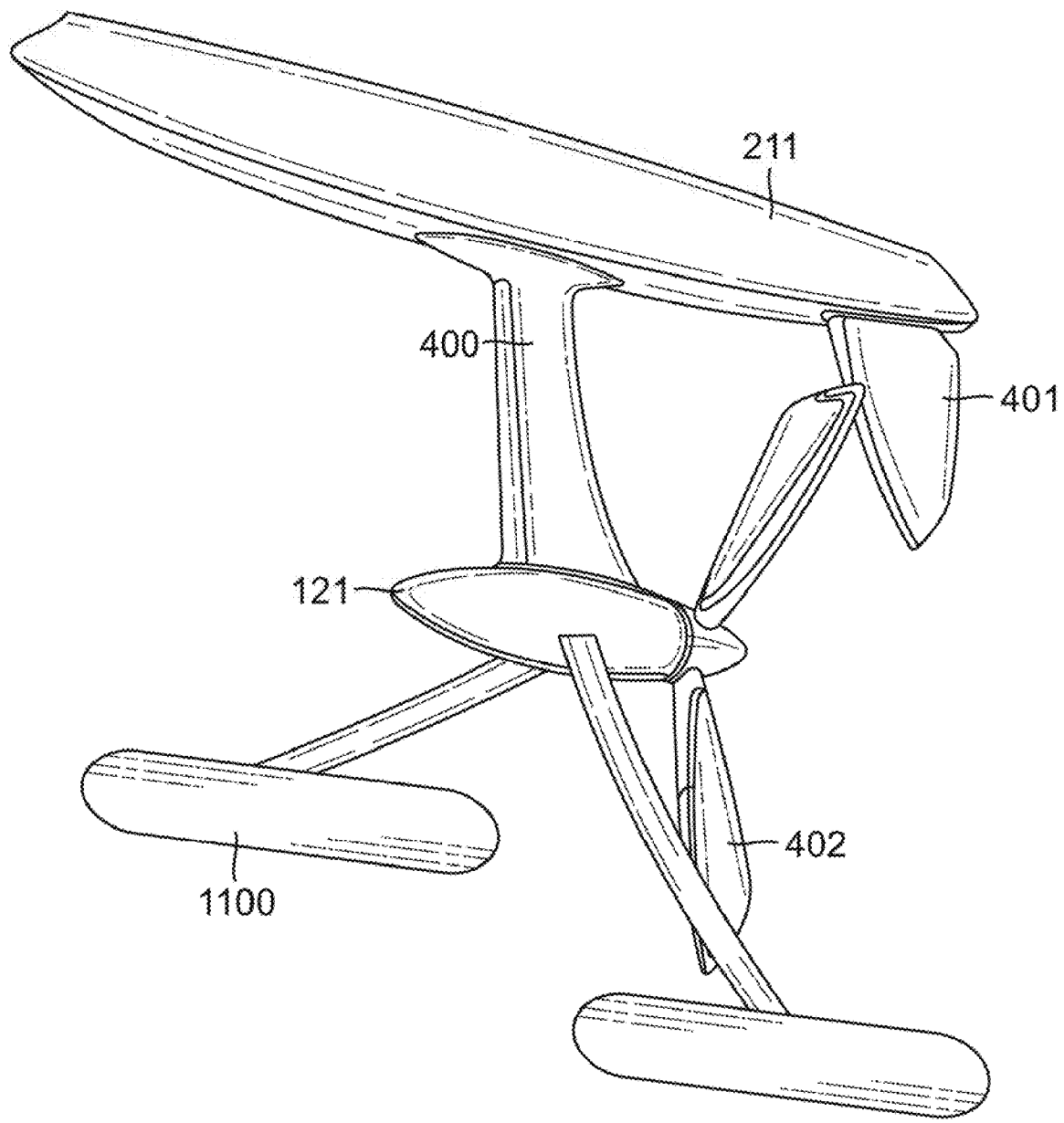
FIG. 11 is another embodiment of the energy module.

In some embodiments, the energy module 101 further comprises a landing pad 1100 attached to the nacelle 121 and protruding below the nacelle 421 sufficiently to create a clearance between the propeller 402 and the ground when the energy module 101 is docked on the ground as shown in FIG. 11. The landing pad 1100 may comprise an ambulatory means. An ambulatory means provides a mechanism to allow the energy module to move from one location to another. In some embodiments, the ambulatory means may be a wheel which will allow the energy module to be moved on land or in water. In some embodiments, the ambulatory means may be a buoyancy tank or a float that can be ballasted with water. In water, when necessary to move the energy module the water may be expelled from the floats causing the energy module to float. Once afloat, the energy module can be moved.

In an alternative design, there is an extension and wheel at the bottom of the landing pad 1100 for seasonal flow sites for grounding.

For highly seasonal rivers where there are times when the river runs dry, a horizontal T-shaped extension strut can be attached to bottom of the nacelle 121 so the unit will rest upright when the water runs dry.

In some embodiments, the energy module 101 may further comprise an aerator 130 to aerate surrounding water or a bubbler to create bubbles in the surrounding water. This may be used for environmental remediation.

Some energy modules 101 further comprise a warning system to signal a potential collision. The warning system may comprise a sensor selected from the group consisting of a motion detector and a sound detector.

The invention can be further automated by placing a sensor array several miles upstream and connecting it to the base arrays downstream by wireless. This sensor array would warn the main arrays of changes in water flow as well as unusual debris and other river changes as well as monitoring total water quality.

In use, the energy module 101 may be deployed as an array 100 of energy modules across a river bed. The array 100 of energy modules comprises a plurality of energy modules 101, each energy module 101 comprising the energy absorber 106 and the mooring system 118. The mooring system 118 comprises the wing-shaped polymer shell 424 attached to the nacelle 121 and the mooring cable 115 housed inside the wing-shaped polymer shell 424 and interconnects each energy module 101 to another and anchors a first energy module at a first end 1602 of the array 100 to a first side 1606 of the riverbank to maintain the array 100 of energy modules in a fore and aft and a side-to-side position, and to negate a rotational force on the array of energy modules 101. Each energy module 101 may further comprise the strut 400 attached to the nacelle 121; and the stabilizer tube 211 attached to the strut 400 to provide support for the energy absorber 101.

The second end 1604 of the array 100 of energy modules may be anchored to the second side 1608 of a riverbank opposite the first riverbank side 1606. Alternatively, the second end 1608 of the array of energy modules may be anchored to the bottom of the river. Various anchoring systems may be used in the array or in single energy module embodiments. Although, these anchoring systems have been described in terms of the array, each anchoring system may be used in single module embodiments.

For example, the array 100 of energy modules has a first end 1602 and a second end 1604. The first and second ends 1602, 1604 of the array 100 may be anchored onshore by a variety of means. In some embodiments, an anchoring platform 1700 is securely embedded onshore as shown in FIGS. 17a-17e. The mooring cable 115 can then be connected to the anchoring platform 1700. In some embodiments, the anchoring platform 1700 may comprise a slideable mount 1702. The slideable mount 1702 may be adjustable in a horizontal or a vertical direction. The vertical movement of the slideable mount can help adjust the depth of the energy module 101 in the river.

In some embodiments, the first and/or the second end 1602, 1604 of the array 100 may comprise an A-frame 1800 to anchor the array of energy modules to the bottom of the river. The A-frame 1800 may comprise an ambulatory means 1802 to move the array 100 of energy modules as shown in FIG. 18. In some embodiments, the ambulatory means 1802 may be a wheel that allows one or both ends of the array 100 to move, for example, towards the riverbank to clear a path for various watercraft to pass through. In some embodiments, the ambulatory means 1802 may be floats. The floats may be ballasted with water. When necessary to move the array 100 of energy modules the water may be expelled from the floats causing the anchor to float. With a first end 1602 of the array anchored to the shore, the current of the river would push the second end 1604 of the array 100 towards the shore, thereby clearing a path. To restore the array 100, the second end of the array 1604 can be push or pulled to position and the floats filled with water to anchor the second end to the bottom of the river.

In some embodiments, one of the energy modules 101' may be inverted with the stabilizer tube 211 ballasted with water to sink the energy module 101 and anchor the stabilizer tube 211 at the bottom of the river, thereby allowing the last energy module to harness the river's energy while serving as an anchor as shown in FIG. 18. Inversion may be accomplished, for example, by having one end of the stabilizer tube 211 fill with water. For example, the stern 126 may fill with water first causing the stern 126 to sink while the bow 124 continues to stay afloat. This creates a rotation about the bow 124. Once the stern 126 is completely filled, the bow 124 may begin filling with water. The momentum of the sinking stern 126 continues the rotation and as the bow 124 begins to fill, it sinks and flips the module 101 upside down. The energy absorber 106 is now on top and the top of the stabilizer tube 211 rests on the bottom. The energy absorber 106 may be rotated 180° or the propellers 402 may be removed and reattached to the nacelle 121 on the opposite side.

Alternative mooring system include attachment to a dock, pier, or shore comprising one steel pole attached by a flexible coupling to an underwater point on the shoreline and to the standard mooring point on the turbine and two cables, one forward and one aft forming an A-frame. Thus the lead cable can be slackened to allow the unit to be brought into the shore for service. This configuration also allows for changes in river height.

Figure 19:
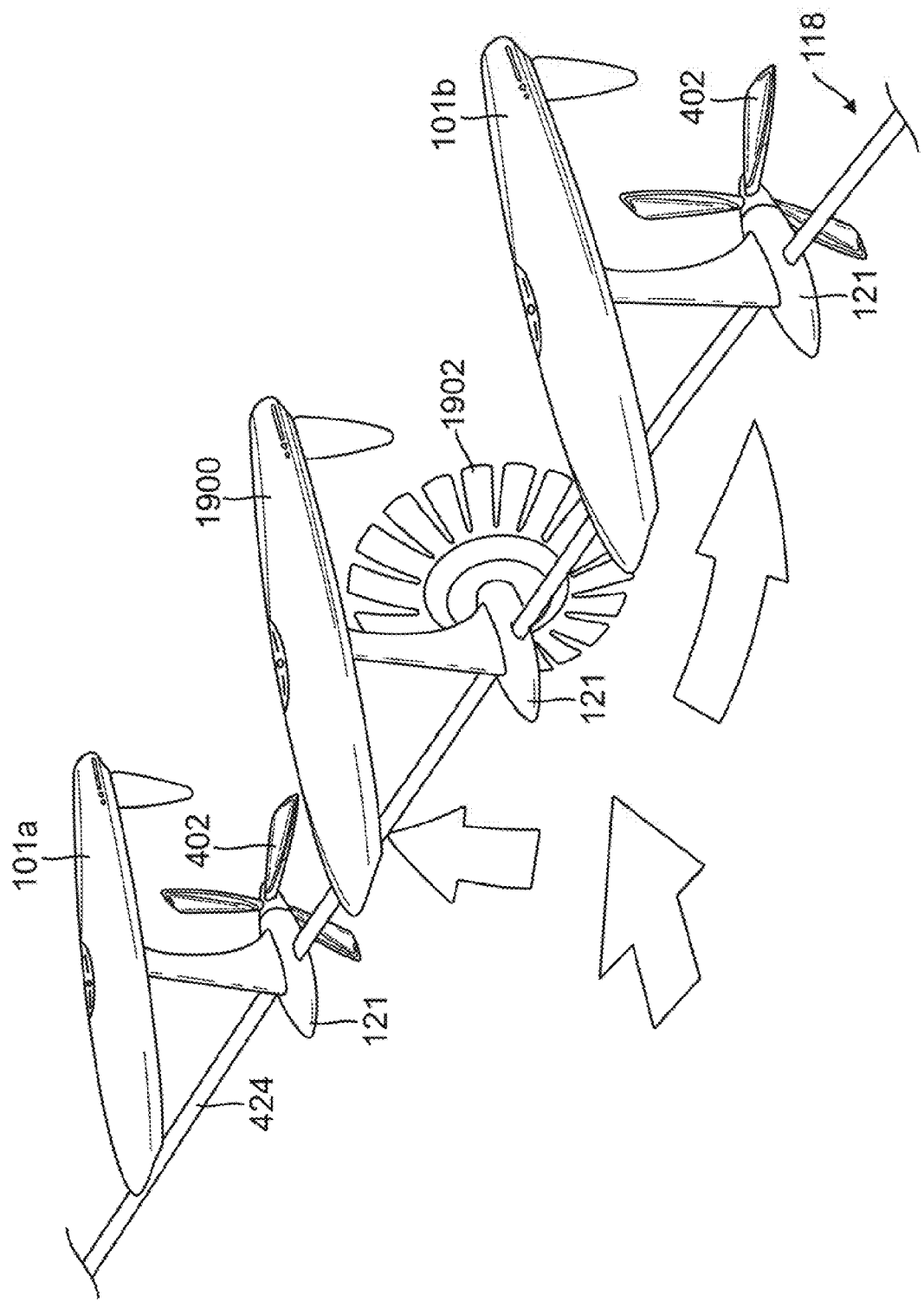
FIG. 19 is a perspective view of another embodiment of the array of energy modules.

To improve the efficiency of energy absorption, the array 100 of energy modules may further comprise a water diverter 1900 in between two energy modules 101a, 101b as shown in FIG. 19. In some embodiments, the water diverter 1900 comprises a series of flexible neutral lift blades 1902 to speed up and divert river flow (arrows) into the adjacent energy modules 101a, 101b. The neutral life blades 1902 may be flat flexible blades forming a convex shape and grooved for strength and to shed debris. The blades are connected via a universal joint to a dummy nacelle. This version is used to slow the oncoming current thereby directing more river flow through the adjacent unit's operating turbine blades. It can be used on either end of the array or to replace every other unit in the array. The unit is designed to create a stabilized drag as well as minimizing flow disturbance for maximum stability and efficiency for adjacent active units. When river flows and the unit is not needed the blades can be rotated to fit one behind the other.

In some embodiments, the water diverter 1900 may be a large water-repelling material such as a tarp placed at the bow end of the stabilizer tube 211 or nacelle 121 to divert water to the adjacent energy modules 101.

In some embodiments, two arrays of energy modules may be connected together across the river bed via a decoupler 217 as shown in FIG. 20. The decoupler 217 allows two arrays to disconnect in response to a predetermined load. For example, if a large piece of debris, such as a log, impacts the array 100, the mooring system would release at the decoupler 217 and allow the energy module 101 to move towards the shoreline to avoid damage to the energy absorbers 106.

The present invention may be used in a variety of application. For example, the module 114 may be used as a river powered industrial wastewater treatment system; a river powered filtering system designed to recover metals in mining waste streams; nitrate removal system from groundwater; a powering ultra-filtration systems. Wind turbines also require complex onsite construction and manpower. Due to their complex mechanisms they also use large number of suppliers unlike the invention.

In some embodiments, the module 101 may be configured to be placed in the ocean to utilize ocean waves and current to generate electricity. These embodiments may be much larger than the river embodiments. For example, large 300 foot versions of the invention may be designed to harness ocean currents. These embodiments may have two decks with a collision bulkhead forward, crew cabins on the second floor leading to public area, the kitchen, and aft deck. Below is storage forward, generators and auxiliary equipment, and storage below the aft deck with built in floatation. The center of the array could be left open with a passover depth of over 100 feet for ships to pass.

The lower deck directly above the strut is the generator room which has two 2 MW generators attached to the vertical driveshaft leading up from the nacelle. It also includes water/electrical support systems for the crew. On the top floor sleeping quarters are forward while aft a day room leads to a deck on the rear section whose sides fold down to create a helicopter pad. The nacelle would be small and not have to be watertight because the turbine(s) would drive a long vertical driveshaft leading to a large 4 MW generator situated below decks which would connect to power cable leading down the strut to the horizontal mooring cable leading shoreside. A mile long system would produce 27 MW steady output. A ten-mile long unit would produce 270 MW. Like other configurations of the invention the oversized version can be stacked one array after another. A 10 mile by 10 mile section could produce approximately 13,500 MW. The unit could also produce clean water. Horizontal stabilizer fins can be added to the nacelle to further stabilize the unit when crew quarters are added. A vertical axis wind generator of 100-300 feet can be added to the center of the invention to add more power production in windy sites. The rudder is enlarged when a wind generator is added.

This very large unit could easily double as a self-sustaining coast guard station, lighthouse, environmental research center, ship docks/service area for pleasure and fishing vessels, security/surveillance, safety area and even tourist hotel.

The invention can be built on a very large scale and used to harness large, deep draft tidal flows, river currents and ocean currents. At 100 feet long the invention has a 100 to foot diameter turbine producing approximately 1 MW in a 4.5 mph current. The invention would have a 110 foot draft and 12 foot beam.

In some embodiments, the module 101 may be combined with other types of energy generating devices, such as solar and wind power. Mixing the water based invention with solar and/or wind power installations adds overall capacity, improves overall utilization rate, and lowers overall operating costs.

Other applications of the module include use as a cooling system designed to reduce operating costs for data centers, factories and office buildings. Data centers are the factories for the information economy. But the tech industry is facing an energy crisis. Every company in the business is looking to squeeze expenses in hopes of becoming the low cost producer ion the digital age. The cost of power consumption by data centers doubled between 2000 and 2006 to $4.5 billion in the U.S. The invention uses the river to produce power for these data centers and also to replace the electric generators in the invention's nacelles with water pumps which send cool river water through larger streamlined tubes built into the mooring to the building's air chillers which send frigid air through floor vents into racks of computers in the data centers which cool the buildings and then flow to decorative cooling ponds outside around the buildings and return to the river. The ponds could also have reed beds and other natural water reclaiming plants to actually improve the quality of the water. In addition, cross-country communication can introduce latency to communications—both because of increased distances, and because of the increased chance of losing and retransmitting packets that are sent through many routers and through long distances. Thus, it can be beneficial to distribute computing power closer to users. As such, data centers may be moved closer to users, with relevant content sent from a central facility out to regional data centers only once, and further transmissions occurring over shorter regional links. As a result, every request from a user need not result in a transmission cross-country and through the Internet backbone—network activity may be more evenly balanced and confined to local areas. Also, transient needs for computing power may arise in a particular area. For example, a natural disaster may bring a need for computing or telecommunication presence in an area until the natural infrastructure can be repaired or rebuilt, and certain events may draw thousands of people who may put a load on the local computing infrastructure. Often, such transient events occur near water, such as a river or an ocean. However, it can be expensive to build and locate data centers, and it is not always easy to find access to necessary (and inexpensive) electrical power, high-bandwidth data connections, and cooling water for such data centers.

The invention may beneficially permit for more ready deployment of data centers to areas in particular need of computing or telecommunications power. The inventor's data centers may be quickly and inexpensively constructed on land, as in modular units, folded and stored as shipping containers. They may then be hauled, on trucks, rail or plane to tidal and river side sites. Then these energy modules may be quickly deployed to an area in need of assistance where there is enough hydrokinetic energy sufficiently strong or large so as to permit electrical generation and pumping power. The system 100 may be more readily transported and implemented without significant or specialized training. In addition, old modules may be easily replaced with newer modules, as new technologies develop or as old units wear out.

The inventor's river and tidal powered data center power and cooling system utilizes an alternative design. The round cross section of the stabilizer 211 may be replaced by a rectangular cross section. For example, a typical stabilizer 211 may have dimensions of approximately 20 ft×3 ft×3 ft. In the data center power version or the cooling system version, the stabilizer may have a rectangular cross-sectional dimension of approximately 20 ft×6 ft×6 ft for the increased buoyancy needed to support the added weight of the racks of data storage equipment. The rear rounded end of the unit hinges open with a watertight seal. A roll-on conveyance is used allowing multiple racks of data center equipment to be quickly loaded or unloaded. The bottom of the unit has a combination ribbed anode/cooling fins which keeps the inside floor cool. An alternative configuration includes a heat exchanger and pump that can be integrated into the ribbed anode/cooling fins to pump coolant through the equipment racks. Each 20 ft×6 ft×6 ft unit can power 50 kW of data center storage. Each unit is interconnected through the horizontal mooring system with the adjacent self-contained data storage units to form large self-powered data storage grids.

The invention may be used as a mobile network. The energy modules 101 may have a modular next generation wireless network that can be placed in the stabilizer 211. The wireless network can be combined with a small, integrated data center and the power generator. It would serve the area and connect to satellite. This unit would include a server to store data. This allows the use of small mobile computers in remote areas using a browser like Chrome which allows most of the computer storage to be kept in the server. This brings the concept of cloud computing to the deepest darkest areas of the world. This will bring instant weather, news, communications, security, health data, online education and medicine to remote areas. Now small cheap laptop computers working as "netbooks" like the Eee and others can be used. Worldwide interoperability for microwave access "WiMAX" technology can be used for wireless access to the internet. These devices also offer locals a mapping locator device, instant access to medical and other essential data. Now operating systems and applications will run on virtual machine in one of these river powered data centers that can be accessed remotely. User will be able to use their applications and data on whichever gadget they have at hand. This new systems provides "live application" services that responds in real time to information provided either by their users or by non-human sensors. This will create regional search engines, like Google and Yahoo that will harvest information provided by the web users to improve the quality of life for the area residents.

The invention can be used to power wastewater treatment system of all sizes with electricity and compressed air. This reduces one of the major costs of wastewater treatment systems: energy. Dr Glen Daigger, senior vice-president of the International Water Association, indicated there was growing evidence that spending on clean water and sanitation was the single greatest contribution to reducing disease and death. "Water and sanitation is clearly a better investment than medical intervention, but it's not sexy," he added.

The invention can be used in an even smaller scale man-portable version. For example, a suitcase size version of the invention can produce 500-600 watts of continuous power with zero emissions. One embodiment weighs in at only 30 lbs and with the dimensions of approximately 36 inches by approximately 9 inches. The "suitcase power plant" may come in two small suitcases. One acts as the stabilizer of the unit with folding rudder and strut attached. The other stores the propeller blades, power cartridge and mooring system. Uses include power for camping, remote cabins, emergency and military. These units can be easily connected to form outputs up to 5 kW.

The invention can also be used to power wastewater treatment plants without risk of power failures, thereby, preventing the possibility of river contamination due to wastewater treatment system failure. By replacing riverside power plants it reduces hot water input from said power plants and reduces water evaporation from power plants. It can also use the alternative configuration of the invention that aerates the water. It also produces freshwater with no energy use. It monitors and cleans water by distributing hundreds of sensors throughout polluted rivers by having sensors attached to the inventions strut at various depths with data sent ashore via the mooring cable or wirelessly. This is a huge advancement in sensor networks. One goal is to rapidly respond to changing conditions, such as sewage or industrial waste release or a drop in oxygen that could kill fish. These sensors can also continuously monitors flow rate and river conditions to warn of upcoming flooding.

This configuration will be custom designed for each river. One example would be a river with an average width of 800 feet, depth of 30 feet and current speed of 4 knots with a length of 900 miles. The module 101, could for example place 2,000 foot long bands of arrays producing 3 MW in low or no population areas on average every 10 miles producing a total of 270 MW baseline power while at the same time monitoring and improving river water quality.

The invention may also play an important role in the ongoing phase of the major technological revolution which was launched in the beginning of the 21st century—decentralized and locally produced renewable energy resources such as solar and wind power. Decentralized and alternative energy systems eliminate the need for investing and extending power lines to remote and isolated locations and/or supplement the conventional power grids. This invention will also play a key role in the next phase of technological revolution—how we produce our water supplies and how we dispose of the used water. The process of urbanization—emerging population centers and water intensive societal development—begun in the 19th century and was significantly accelerated during the 20th century. Sub-urbanization in the form of urban sprawl caused deforestation, declined groundwater tables and intensified flow of high volume/low quality urban storm water runoff to streams and rivers. In addition, urbanization disturbed natural environments by installing thousands of miles of water distribution pipes and wastewater discharge networks. The pipe and pump network are energy intensive and today these infrastructure in our major and minor urban areas are deteriorating—the infrastructure replacement and repair cost is estimated to be in billion of dollars.

In the 21st century, decentralized water systems—small to medium scale operations will gradually replace or supplement conventional large systems. Advantages of decentralized systems include reduced need for establishing long distance water distribution and wastewater discharge networks, reduced water loss through pipe leakage, reduced urban storm water runoff and increased groundwater recharge, and lower energy demand and consumption. Furthermore, decentralized systems will augment security by reducing the possibility that accidental or deliberate (i.e., terrorist) interruptions in the water distribution networks would terminate essential services.

Decentralized water systems will contribute to increasing sustainability of infrastructural services in a world that views water as the lifeblood of society. Decentralized water systems when combined with decentralized energy systems will enhance our living environment and promote sustainable development. These systems do not disturb the landscape and the ecosystem and will be a positive force for reversing the trend toward global warming and climate change. A pipe-less society is the inventor's vision for the 21st century.

The foregoing description of the preferred embodiment of the invention has been presented for the purposes of illustration and description. It is not intended to be exhaustive or to limit the invention to the precise form disclosed. Many modifications and variations are possible in light of the above teaching. It is not intended that the scope of the invention be limited by this detailed description, but by the claims and the equivalents to the claims appended hereto.

What is claimed is:

1. An energy module comprising:
 a) an energy absorber comprising
  i) a nacelle; and
  ii) a propeller comprising a plurality of blades attached to the nacelle at a hub to drive an air compressor to compress air; and
 b) a mooring system, comprising:
  i) a wing-shaped polymer shell attached to the nacelle, the wing-shaped polymer shell designed to utilize the force of a passing current to create a downward force and thereby reduce any upward motion in the energy module;
  ii) a mooring cable housed inside the wing-shaped polymer shell and anchored to maintain the energy module in a fore and aft and a side-to-side position to provide stability, and to negate a rotational force on the energy module; and
  iii) a high pressure hose housed inside the wing-shaped polymer shell to transfer the compressed air to an air turbine generator for conversion into electricity,
  iv) an electrical line housed inside the wing-shaped polymer shell to provide power to the energy module;
 c) a strut attached to the nacelle; and
 d) a stabilizer tube attached to the strut to provide support for the energy absorber, the stabilizer tube comprising a bow end and a stern end opposite the bow end.

2. An energy module comprising:
 a) an energy absorber;
 b) a mooring system, comprising:
  i) a wing-shaped polymer shell attached to the energy absorber, the wing-shaped polymer shell designed to utilize the force of a passing current to create a downward force and thereby reduce any upward motion in the energy module; and
  ii) a mooring cable housed inside the wing-shaped polymer shell and anchored to maintain the energy module in a fore and aft and a side-to-side position to provide stability, and to negate a rotational force on the energy module; and
 c) an aerator to aerate surrounding water.

3. An energy module comprising:
 a) an energy absorber, comprising
  i) a nacelle to support the mooring system; and
  ii) a propeller attached to the at least one nacelle comprising a plurality of blades attached to the at least one nacelle at a hub to drive an air compressor to compress air; and
 b) a mooring system, comprising:
  i) a wing-shaped polymer shell attached to the energy absorber, the wing-shaped polymer shell designed to utilize the force of a passing current to create a downward force and thereby reduce any upward motion in the energy module;
  ii) a mooring cable housed inside the wing-shaped polymer shell and anchored to maintain the energy module in a fore and aft and a side-to-side position to provide stability, and to negate a rotational force on the energy module; and
  iii) a high pressure hose housed inside the wing-shaped polymer shell to transfer the compressed air to an air turbine generator for conversion into electricity.

4. An energy module comprising:
 a) an energy absorber, comprising
  i) a nacelle to support the mooring system; and
  ii) a propeller attached to the at least one nacelle comprising a plurality of blades attached to the at least one nacelle at a hub to drive an air compressor to compress air and a movable flap to adjust the dimensions of the propeller; and
 b) a mooring system, comprising:
  i) a wing-shaped polymer shell attached to the energy absorber, the wing-shaped polymer shell designed to utilize the force of a passing current to create a downward force and thereby reduce any upward motion in the energy module; and
  ii) a mooring cable housed inside the wing-shaped polymer shell and anchored to maintain the energy module in a fore and aft and a side-to-side position to provide stability, and to negate a rotational force on the energy module.

5. An energy module comprising:
 a) an energy absorber, comprising
  i) a nacelle to support the mooring system; and
  ii) a propeller attached to the at least one nacelle comprising a plurality of blades attached to the at least one nacelle at a hub to drive an air compressor to compress air; and
 b) a mooring system, comprising:
  i) a wing-shaped polymer shell attached to the energy absorber, the wing-shaped polymer shell designed to utilize the force of a passing current to create a downward force and thereby reduce any upward motion in the energy module; and
  ii) a mooring cable housed inside the wing-shaped polymer shell and anchored to maintain the energy module in a fore and aft and a side-to-side position to provide stability, and to negate a rotational force on the energy module;
 c) a landing pad attached to the nacelle and protruding below the nacelle sufficiently to create a clearance between the propeller and the ground when the energy module is docked on the ground.

6. The energy module of claim 5, wherein the landing pad comprises an ambulatory means.

7. An energy module comprising:
 a) an energy absorber, comprising
  i) a nacelle to support the mooring system; and
  ii) a propeller attached to the at least one nacelle comprising a plurality of blades attached to the at least one nacelle at a hub to drive an air compressor to compress air; and
 b) a mooring system, comprising:
  i) a wing-shaped polymer shell attached to the energy absorber, the wing-shaped polymer shell designed to utilize the force of a passing current to create a downward force and thereby reduce any upward motion in the energy module; and
  ii) a mooring cable housed inside the wing-shaped polymer shell and anchored to maintain the energy module in a fore and aft and a side-to-side position to provide stability, and to negate a rotational force on the energy module;
 c) at least one strut attached to the at least one nacelle; and
 d) a stabilizer tube attached to the at least one strut to provide support for the energy absorber, the stabilizer tube comprising a bow end and a stern end opposite the bow end.

8. The energy module of claim 7, wherein the stabilizer tube comprises:
 a) a nose at the bow end, the nose filled with a first collision absorbing material; and
 b) a tail at the aft end, the tail filled with a second collision absorbing material.

9. The energy module of claim 7, further comprising a debris diverter attached to the bow end of the stabilizer tube and projecting into the water to divert debris away from the energy module.

10. The energy module of claim 7, wherein the stabilizer further comprises a compartment configured to operatively receive a modular device that can be plugged in for ready use.

11. The energy module of claim 10, wherein the modular device is selected from the group consisting of a water making system, a water purifier, an electrolyzer, an air compressor, a desalinizer, a data storage device, a wireless network system, a computer system.

12. The energy module of claim 11, further comprising a tube to transport water collected by the energy module to an onshore facility.

13. The energy module of claim 7, wherein the stabilizer tube comprises an inner chamber dimensioned to house a disassembled energy absorber, a disassembled mooring system, and the strut so as to be easily transportable.

14. An energy module comprising:
 a) an energy absorber;
 b) a mooring system, comprising:
  i) a wing-shaped polymer shell attached to the energy absorber, the wing-shaped polymer shell designed to utilize the force of a passing current to create a downward force and thereby reduce any upward motion in the energy module; and
  ii) a mooring cable housed inside the wing-shaped polymer shell and anchored to maintain the energy module in a fore and aft and a side-to-side position to provide stability, and to negate a rotational force on the energy module; and
 c) a generator to produce electricity for use by the energy module;
 wherein the generator comprises a power cartridge, comprising:
 a) a first end and a second end;
 b) a ceramic sleeve split longitudinally in half comprising a painted on wiring to connect to the electrical line in between the first and second ends;
 c) a rounded nose at the first end comprising a collision foam section;
 d) a hub and the propeller at the second end; and
 e) wherein the ceramic sleeve houses
  i) an electrical converter module,
  ii) a dual micro air pump to create positive pressure in the unit to prevent any leakage of moisture into cartridge,
  iii) two identical 25 kW permanent magnet generators stacked in line,
  iv) a planetary gearbox,
  v) two main bearings,
  vi) an end cap, and
  vii) a driveshaft attached to the hub, wherein, the ceramic sleeve conducts its power through the painted wires to the electrical cable of the mooring on the outside allowing the ceramic sleeve to simply be slid into place without any connectors and eliminating any through hull fittings.

15. An energy module comprising:
 a) an energy absorber, and
 b) a mooring system, comprising:
  i) a wing-shaped polymer shell attached to the energy absorber, the wing-shaped polymer shell designed to utilize the force of a passing current to create a downward force and thereby reduce any upward motion in the energy module, and
  ii) a mooring cable housed inside the wing-shaped polymer shell and anchored to maintain the energy module in a fore and aft and a side-to-side position to provide stability, and to negate a rotational force on the energy module,
 c) a warning system,
 d) a sonar,
 e) a video, and
 f) a water sampling system to monitor the water.

16. An energy module comprising:
 a) an energy absorber; and
 b) a mooring system, comprising:
  i) a wing-shaped polymer shell attached to the energy absorber, the wing-shaped polymer shell designed to utilize the force of a passing current to create a downward force and thereby reduce any upward motion in the energy module;
  ii) a mooring cable housed inside the wing-shaped polymer shell and anchored to maintain the energy module in a fore and aft and a side-to-side position to provide stability, and to negate a rotational force on the energy module; and
 a tube to transfer water collected by the energy module to an onshore facility for use as a coolant.

17. An array of energy modules having a first end and a second end opposite the first end, the array of energy modules comprising a plurality of energy modules, each energy module comprising:
 a) an energy absorber; and
 b) a mooring system, comprising:
  i) a wing-shaped polymer shell attached to the energy absorber, the wing-shaped polymer shell designed to utilize the force of a passing current to create a negative lift to eliminate any upward motion in the energy module, and
  ii) a mooring cable housed inside the wing-shaped polymer shell and interconnecting each energy module to another and anchoring a first energy module at the first end to a first side of a riverbank to maintain the array of energy modules in a fore and aft and a side-to-side position, and to negate a rotational force on the array of energy modules;
 wherein the second end of the array of energy modules is anchored to the bottom of the river.

18. The array of energy modules of claim 17, further comprising an A-frame attached to the second end of the array of energy modules to anchor the array of energy modules to the bottom of the river.

19. The array of energy modules of claim 18, wherein the A-frame comprises an ambulatory means to move the array of energy modules.

20. An array of energy modules having a first end and a second end opposite the first end, the array of energy modules comprising a plurality of energy modules, each energy module comprising:
 a) an energy absorber, comprising
  i) a nacelle; and
  ii) a propeller comprising a plurality of blades attached to the nacelle at a hub to drive an air compressor to compress air; and
 b) a mooring system, comprising:
  i) a wing-shaped polymer shell attached to the energy absorber, the wing-shaped polymer shell designed to utilize the force of a passing current to create a negative lift to eliminate any upward motion in the energy module, and ii) a mooring cable housed inside the wing-shaped polymer shell and interconnecting each energy module to another and anchoring a first energy module at the first end to a first side of a riverbank to maintain the array of energy modules in a fore and aft and a side-to-side position, and to negate a rotational force on the array of energy modules.

21. The array of energy modules of claim 20 further comprising
   a) a strut attached to the nacelle; and
   b) a stabilizer tube attached to the strut to provide support for the energy absorber, the stabilizer tube comprising a bow end and a stern end opposite the bow end.

22. The array of energy modules of claim 21, wherein a last energy module at the second end of the array is inverted with the stabilizer tube ballasted with water to sink the last energy module and anchor the last energy module at the bottom of the river, thereby allowing the last energy module to harness the river's energy while anchoring the array of energy modules.

23. The array of energy modules of claim 21, wherein each energy module further comprises:
   a) a first strut operatively connected to a first nacelle having the propeller driving the air compressor, each having an outer surface; and
   b) a second strut operatively connected to a second nacelle, wherein the second strut and the second nacelle are hollow shells each having an inner surface conforming to the outer surface of the first strut and first nacelle, respectively, so as to mate with the outer surfaces of the first strut and the first nacelle, respectively, so that the second strut and the second nacelle house and support the first strut and the first nacelle,
   c) wherein the first strut is hingedly connected to the stabilizer, and
   d) wherein the mooring system is attached to the second nacelle.

24. An array of energy modules having a first end and a second end opposite the first end, the array of energy modules comprising a plurality of energy modules, each energy module comprising:
   a) an energy absorber;
   b) a mooring system, comprising:
      i) a wing-shaped polymer shell attached to the energy absorber, the wing-shaped polymer shell designed to utilize the force of a passing current to create a negative lift to eliminate any upward motion in the energy module, and
      ii) a mooring cable housed inside the wing-shaped polymer shell and interconnecting each energy module to another and anchoring a first energy module at the first end to a first side of a riverbank to maintain the array of energy modules in a fore and aft and a side-to-side position, and to negate a rotational force on the array of energy modules;
   c) a first array of energy modules;
   d) a second array of energy modules adjacent to the first array of energy modules; and
   e) a decoupler detachably connecting the first array of energy modules with the second array of energy modules between two adjacent energy modules to disconnect the first and second array of energy modules in response to a predetermined load.

25. An array of energy modules having a first end and a second end opposite the first end, the array of energy modules comprising a plurality of energy modules, each energy module comprising:
   a) an energy absorber;
   b) a mooring system, comprising:
      i) a wing-shaped polymer shell attached to the energy absorber, the wing-shaped polymer shell designed to utilize the force of a passing current to create a negative lift to eliminate any upward motion in the energy module, and
      ii) a mooring cable housed inside the wing-shaped polymer shell and interconnecting each energy module to another and anchoring a first energy module at the first end to a first side of a riverbank to maintain the array of energy modules in a fore and aft and a side-to-side position, and to negate a rotational force on the array of energy modules; and
   c) a water diverter in between a first energy module and a second energy module to speed up and divert river flow into the first and second energy modules.

* * * * *